(12) United States Patent
Hattori et al.

(10) Patent No.: US 9,350,972 B2
(45) Date of Patent: May 24, 2016

(54) ENCODING DEVICE AND ENCODING METHOD, AND DECODING DEVICE AND DECODING METHOD

(75) Inventors: Shinobu Hattori, Tokyo (JP); Yoshitomo Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 403 days.

(21) Appl. No.: 14/110,483

(22) PCT Filed: Apr. 19, 2012

(86) PCT No.: PCT/JP2012/060615
§ 371 (c)(1),
(2), (4) Date: Oct. 8, 2013

(87) PCT Pub. No.: WO2012/147621
PCT Pub. Date: Nov. 1, 2012

(65) Prior Publication Data
US 2014/0028797 A1 Jan. 30, 2014

(30) Foreign Application Priority Data
Apr. 28, 2011 (JP) .................................. 2011-101797

(51) Int. Cl.
*H04N 7/32* (2006.01)
*H04N 13/00* (2006.01)
(Continued)

(52) U.S. Cl.
CPC ......... *H04N 13/0029* (2013.01); *H04N 19/107* (2014.11); *H04N 19/139* (2014.11);
(Continued)

(58) Field of Classification Search
CPC combination set(s) only.
See application file for complete search history.

(56) References Cited

U.S. PATENT DOCUMENTS

| | | | |
|---|---|---|---|
| 2006/0072790 A1* | 4/2006 | Wittebrood | H04N 5/145 382/107 |
| 2009/0103616 A1 | 4/2009 | Ho et al. | |

(Continued)

FOREIGN PATENT DOCUMENTS

| | | |
|---|---|---|
| JP | 2009-105894 | 5/2009 |
| JP | 2010-525724 | 7/2010 |

(Continued)

OTHER PUBLICATIONS

International Search Report issued Jul. 24, 2012, in International Application No. PCT/JP2012/060615.

(Continued)

*Primary Examiner* — Christopher S Kelley
*Assistant Examiner* — Asmamaw G Tarko
(74) *Attorney, Agent, or Firm* — Chip Law Group

(57) ABSTRACT

The present technology relates to an encoding device and encoding method, and a decoding device and a decoding method whereby the data amount of encoded data of images of multiple viewpoints can be reduced. A low-resolution reference image generating unit performs, in the event of encoding a color image of a viewpoint B having lower resolution than the resolution of a color image of a viewpoint A, different from the viewpoint A, resolution reduction processing to reduce resolution on the image of the viewpoint A so that the resolution of the color image of the viewpoint A agrees with the resolution of the color image of the viewpoint B. An inter prediction unit generates a prediction image of the color image of the viewpoint B with reference to the color image of the viewpoint A after resolution reduction processing. A computing unit and so forth encode the color image of the viewpoint B using the prediction image. The present technology may be applied to a 3D-image encoding device, for example.

15 Claims, 55 Drawing Sheets

(51) Int. Cl.
*H04N 19/597* (2014.01)
*H04N 19/52* (2014.01)
*H04N 19/139* (2014.01)
*H04N 19/176* (2014.01)
*H04N 19/107* (2014.01)
*H04N 19/59* (2014.01)
*H04N 21/218* (2011.01)
*H04N 21/2365* (2011.01)
*H04N 19/46* (2014.01)
*H04N 19/91* (2014.01)
*H04N 19/86* (2014.01)

(52) U.S. Cl.
CPC .............. *H04N19/176* (2014.11); *H04N 19/52* (2014.11); *H04N 19/59* (2014.11); *H04N 19/597* (2014.11); *H04N 21/21805* (2013.01); *H04N 21/2365* (2013.01); *H04N 19/46* (2014.11); *H04N 19/86* (2014.11); *H04N 19/91* (2014.11)

(56) References Cited

U.S. PATENT DOCUMENTS

| | | | | |
|---|---|---|---|---|
| 2010/0034260 | A1* | 2/2010 | Shimizu | H04N 19/597 375/240.12 |
| 2010/0111183 | A1 | 5/2010 | Jeon et al. | |
| 2010/0128792 | A1* | 5/2010 | Saito | H04N 19/105 375/240.16 |
| 2010/0217785 | A1 | 8/2010 | Yun et al. | |
| 2010/0284466 | A1 | 11/2010 | Pandit et al. | |
| 2011/0211638 | A1* | 9/2011 | Sohn | H04N 19/597 375/240.16 |
| 2011/0255796 | A1* | 10/2011 | Nakamura | H04N 19/597 382/232 |
| 2013/0335527 | A1* | 12/2013 | Takahashi | H04N 19/597 348/43 |

FOREIGN PATENT DOCUMENTS

| | | |
|---|---|---|
| JP | 2010-232878 | 10/2010 |
| JP | 2011-502375 | 1/2011 |
| JP | 2011-509631 | 3/2011 |

OTHER PUBLICATIONS

"International Organisation for Standardisation Organisation Internationale De Normalisation ISO/IEC JTC1/SC29/WG11 Coding of Moving Pictures and Audio", "Draft Call for Proposals on 3D Video Coding Technology", Video and Requirement, MPEG2010/N11679, Oct. 2010, 18 pages.

\* cited by examiner

ENCODING DEVICE AND ENCODING METHOD, AND DECODING DEVICE AND DECODING METHOD

TECHNICAL FIELD

The present technology relate to an encoding device and encoding method, and a decoding device and decoding method, and specifically relates to an encoding device and encoding method, and a decoding device and decoding method, whereby the data amount of encoded data of images of multiple viewpoints can be reduced.

BACKGROUND ART

Examples of encoding formats to encode images with multiple viewpoints, such as 3D (Dimension) images and the like include the MVC (Multiview video Coding) format which is an extension of the AVC (Advanced Video Coding) (H.264/AVC) format, and so forth.

With the MVC format, images to be encoded are color images having values corresponding to light from a subject, as pixel values, with each color image of the multiple viewpoints being encoded, referencing color images of other viewpoints as appropriate as well as to the color images of those viewpoints.

That is to say, with the MVC format, of the color images of the multiple viewpoints, the color image of one viewpoint is taken as a base view (Base View) image, and the color images of the other viewpoints are taken as dependent view (Dependent View) images.

The base view image (color image) is then encoded referencing only that base view color image itself, while the dependent view images (color images) are encoded referencing images of other dependent views as appropriate, besides the image of that dependent view.

Also, a method for separately encoding a color image and a disparity information image has been proposed as a method for encoding the color images of multiple viewpoints, and a disparity information image having disparity information (depth information) regarding disparity for each pixel of the color image of each viewpoint as a pixel value (e.g., see NPL 1).

CITATION LIST

Non Patent Literature

NPL 1: "Draft Call for Proposals on 3D Video Coding Technology", INTERNATIONAL ORGANISATION FOR STANDARDISATION ORGANISATION INTERNATIONALE DE NORMALISATION ISO/IEC JTC1/SC29/WG11 CODING OF MOVING PICTURES AND AUDIO, MPEG2010/N11679 Guangzhou, China, October 2010

SUMMARY OF INVENTION

Technical Problem

Incidentally, with the MVC format or the like, it is necessary for all images to be encoded to have the same resolution. That is to say, with the MVC format, it is impossible to reference images having different resolution. Accordingly, in the event that images of multiple viewpoints are encoded with the MVC format, the data amount of encoded data is equal to the data amount of encoded data of images having the same resolution of which the number is the same as the viewpoints, and accordingly increases.

The present technology has been made in light of such a situation, and aims to enable the data amount of encoded data of images of multiple viewpoints to be reduced.

Solution to Problem

An encoding device according to a first aspect of the present technology is an encoding device including: a first viewpoint resolution reduction processing unit configured to subject, in the event of encoding an image of a second viewpoint different from the first viewpoint, having lower resolution than the resolution of an image of a first viewpoint, the image of the first viewpoint to resolution reduction processing to reduce resolution so that the resolution of the image of the first viewpoint agrees with the resolution of the image of the second viewpoint; a prediction unit configured to generate a prediction image of the image of the second viewpoint with reference to the image of the first viewpoint after resolution reduction processing by the first viewpoint resolution reduction processing unit; and an encoding unit configured to encode the image of the second viewpoint using the prediction image generated by the prediction unit.

An encoding method and program according to the first aspect of the present technology corresponds to the encoding device according to the first aspect of the present technology.

With the first aspect of the present technology, in the event of encoding an image of a second viewpoint different from the first viewpoint, having lower resolution than the resolution of an image of a first viewpoint, the image of the first viewpoint is subjected to resolution reduction processing to reduce resolution so that the resolution of the image of the first viewpoint agrees with the resolution of the image of the second viewpoint, a prediction image of the image of the second viewpoint is generated with reference to the image of the first viewpoint after resolution reduction processing, and the image of the second viewpoint is encoded using the prediction image.

A decoding device according to a second aspect of the present technology is a decoding device including: a first viewpoint resolution reduction processing unit configured to subject, in the event of decoding encoded data of an image of a second viewpoint different from the first viewpoint, having lower resolution than the resolution of an image of a first viewpoint, the image of the first viewpoint to resolution reduction processing to reduce resolution so that the resolution of the image of the first viewpoint agrees with the resolution of the image of the second viewpoint; a prediction unit configured to generate a prediction image of the image of the second viewpoint with reference to the image of the first viewpoint after resolution reduction processing by the first viewpoint resolution reduction processing unit; and a decoding unit configured to decode encoded data of the image of the second viewpoint using the prediction image generated by the prediction unit.

A decoding method and program according to the second aspect of the present technology corresponds to the decoding device according to the second aspect of the present technology.

With the second aspect of the present technology, in the event of decoding encoded data of an image of a second viewpoint different from the first viewpoint, having lower resolution than the resolution of an image of a first viewpoint, the image of the first viewpoint is subjected to resolution reduction processing to reduce resolution so that the resolution of the image of the first viewpoint agrees with the resolution of the image of the second viewpoint, a prediction image of the second viewpoint is generated with reference to the image of the first viewpoint after resolution reduction processing, and encoded data of the image of the second viewpoint is decoded using the prediction image.

Note that the encoding device according to the first aspect and the decoding device according to the second aspect may be realized by causing a computer to execute a program.

Also, in order to realize the encoding device according to the first aspect and the decoding device according to the second aspect, the program to be executed by the computer may be provided by being transmitted via a transmission medium, or by being recorded in a recording medium.

Advantageous Effects of Invention

According to the first aspect of the present technology, the data amount of encoded data of images of multiple viewpoints may be reduced.

Also, according to the second aspect of the present technology, encoded data encoded so as to reduce the data amount of encoded data of images of multiple viewpoints may be decoded.

DESCRIPTION OF EMBODIMENTS

Figure 50:
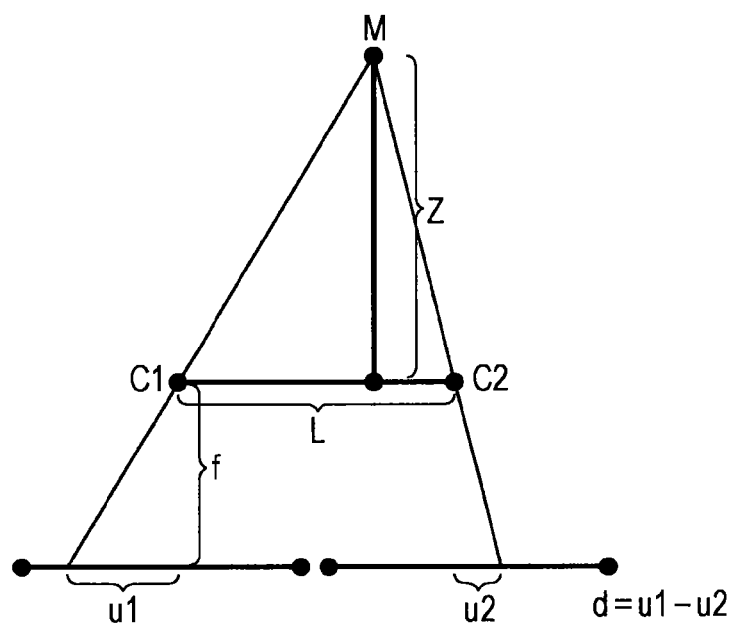
FIG. 50 is a diagram for describing disparity and depth.

Description of Depth Image (Disparity Information Image) in Present Specification FIG. 50 is a diagram for describing disparity and depth.

As illustrated in FIG. 50, in the event that a color image of a subject M is to be shot by a camera c1 situated at a position C1 and a camera c2 situated at a position C2, depth Z which is the distance in the depth direction from the camera c1 (camera c2) of the subject M is defined with the following Expression (a).

$$Z = (L/d) \times f \quad (a)$$

Note that L is the distance between the position C1 and position C2 in the horizontal direction (hereinafter referred to as inter-camera distance). Also, d is a value obtained by subtracting a distance u2 of the position of the subject M on the color image shot by the camera c2, in the horizontal direction from the center of the color image, from a distance u1 of the position of the subject M on the color image shot by the camera c1, in the horizontal direction from the center of the color image, that is, disparity. Further, f is the focal distance of the camera c1, with Expression (a) assuming that the focal distance of camera c1 and camera c2 are the same.

As illustrated in Expression (a), the disparity d and depth Z are uniquely convertible. Accordingly, with the Present Specification, an image representing disparity d of the two-viewpoint color image shot by camera c1 and camera c2, and an image representing depth Z, will be collectively referred to as depth image (disparity information image).

Note that it is sufficient for the depth image (disparity information image) to be an image representing disparity d or depth Z, and a value where disparity d has been normalized, a value where the inverse of depth Z, 1/Z, has been normalized, etc., may be used for pixel values of the depth image (disparity information image), rather than disparity d or depth Z themselves.

A value I where disparity d has been normalized at 8 bits (0 through 255) can be obtained by the following Expression (b). Note that the number of bits for normalization of disparity d is not restricted to 8 bits, and may be another number of bits such as 10 bits, 12 bits, or the like.

[Math. 4]

$$I = \frac{255 \times (d - D_{min})}{D_{max} - D_{min}} \quad (b)$$

Note that in Expression (b), $D_{max}$ is the maximal value of disparity d, and $D_{min}$ is the minimal value of disparity d. The maximal value $D_{max}$ and the minimal value $D_{min}$ may be set in increments of single screens, or may be set in increments of multiple screens.

Also, a value y obtained by normalization of the inverse 1/Z of depth Z, at 8 bits (0 through 255) can be obtained by the following Expression (c). Note that the number of bits for normalization of the inverse 1/Z of the depth Z is not restricted to 8 bits, and may be another number of bits such as 10 bits, 12 bits, or the like.

[Math. 5]

$$y = 255 \times \frac{\frac{1}{Z} - \frac{1}{Z_{far}}}{\frac{1}{Z_{near}} - \frac{1}{Z_{far}}} \quad (c)$$

Note that in Expression (c), $Z_{far}$ is the maximal value of depth Z, and $Z_{near}$ is the minimal value of depth Z. The maximal value $Z_{far}$ and the minimal value $Z_{near}$ may be set in increments of single screens, or may be set in increments of multiple screens.

In this manner, with the Present Specification, taking into consideration that disparity d and depth Z are uniquely convertible, an image having as the pixel value thereof the value I where disparity d has been normalized, and an image having as the pixel value thereof the a value y where 1/Z which is the inverse of depth Z has been normalized, will be collectively referred to as depth image (disparity information image). Here, we will say that the color format of the depth image (disparity information image) is YUV420 or YUV400, but those may be another color format.

Note that in the event of looking at the information of the value I or value y itself rather than the pixel value of the depth image (disparity information image), the value I or value y is taken as the depth information (disparity information). Further the value I or value y mapped is taken as a depth map.

First Embodiment

Configuration Example of First Embodiment of Image Processing System

Figure 1:
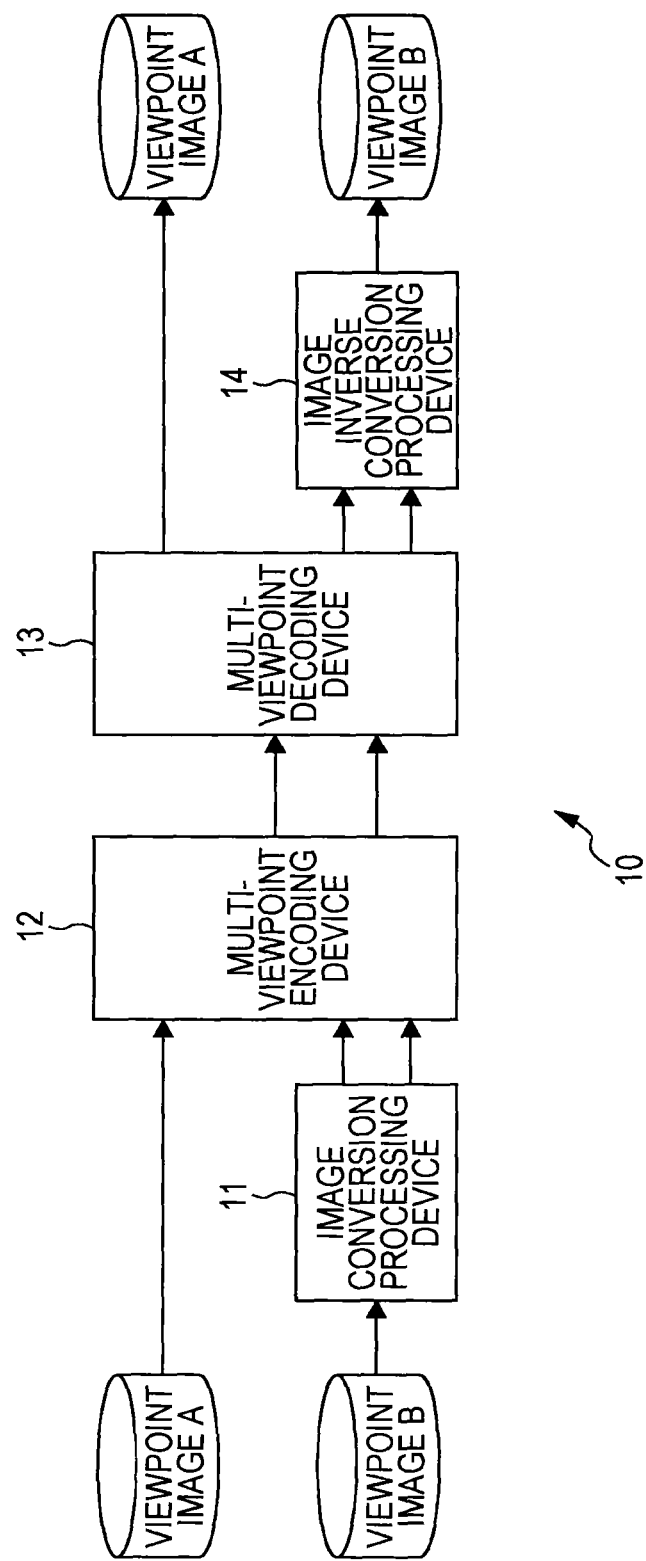
FIG. 1 is a block diagram illustrating a configuration example of a first embodiment of an image processing system to which the present technology has been applied.

FIG. 1 is a block diagram illustrating a configuration example of a first embodiment of an image processing system to which the present technology has been applied.

In FIG. 1, an image processing system 10 includes an image conversion processing device 11, a multi-viewpoint image encoding device 12, a multi-viewpoint image decoding device 13, and an image inverse conversion processing device 14. The image processing system 10 decreases, of a color image and a disparity information image of two viewpoints to be externally input as objects to be encoded, the resolution of a color image and a disparity information image of one viewpoint other than a viewpoint serving as a base point as compared to the resolution of a color image and a disparity information of the base point to perform encoding and decoding.

Specifically, the image conversion processing device 11 of the image processing system 10 performs resolution reduction processing to reduce resolution on a color image and a disparity information image of a viewpoint B serving as one viewpoint other than the base point to be externally input as objects to be encoded. Note that, hereinafter, in the event that there is no need to specifically distinguish a color image and a disparity information image, these will be referred to as viewpoint images together, and a viewpoint image of a viewpoint B will be referred to as viewpoint image B.

The image conversion processing device 11 supplies a viewpoint image B after resolution reduction processing to the multi-viewpoint image encoding device 12. Also, the image conversion processing device 11 generates information that represents the type of resolution reduction processing such as the number of taps of filter processing to be performed as resolution reduction processing of the viewpoint image B, as viewpoint B low-resolution conversion information, and supplies to the multi-viewpoint image encoding device 12.

Now, an arrangement may be made wherein the image conversion processing device 11 does not supply the viewpoint B low-resolution conversion information to the multi-viewpoint image encoding device 12 but transmits to the image inverse conversion processing device 14 directly. Also, an arrangement may be made wherein the image conversion processing device 11 does not generate viewpoint B low-resolution conversion information, and filter processing set beforehand between the image conversion processing device 11 and the image inverse conversion processing device 14 is performed.

The multi-viewpoint image encoding device 12 obtains a viewpoint image A having the same resolution as the viewpoint B, which is a viewpoint image of a viewpoint A serving as the base point to be externally input as an object to be encoded. The multi-viewpoint image encoding device 12 subjects the viewpoint image A, and the viewpoint image B after resolution reduction processing to be supplied from the image conversion processing device 11 to encoding. At this time, the multi-viewpoint image encoding device 12 subjects the viewpoint image A to resolution reduction processing so that the resolution of the viewpoint image A agrees with the resolution of the viewpoint image B after resolution reduction processing, and at the time of encoding the viewpoint image B, references the viewpoint image A after resolution reduction processing.

The multi-viewpoint encoding device 12 multiplexes encoded data of the viewpoint image A and viewpoint image B after resolution reduction processing obtained as encoding results, and the viewpoint B low-resolution conversion information supplied from the image conversion processing device 11 to generate a bitstream. The multi-viewpoint image encoding device 12 transmits the generated bitstream to the multi-viewpoint image decoding device 13. Also, the multi-viewpoint image encoding device 12 generates information that represents the type of resolution reduction processing such as the number of taps of filter processing to be performed the resolution reduction processing of the viewpoint image A, or the like, as viewpoint A low-resolution conversion information, and transmits to the multi-viewpoint image decoding device 13.

The multi-viewpoint image decoding device 13 receives the bitstream transmitted from the multi-viewpoint image encoding device 12. The multi-viewpoint image decoding device 13 extracts the viewpoint B low-resolution conversion information from the received bitstream, and supplies to the image inverse conversion processing device 14. Also, the multi-viewpoint image decoding device 13 decodes, of the bitstream, the encoded data of the viewpoint image A, and the viewpoint image B after resolution reduction processing.

At this time, the multi-viewpoint image decoding device 13 performs, based on the viewpoint A low-resolution conversion information from the multi-viewpoint image encoding device 12, resolution reduction processing on the decoded viewpoint image A so that the resolution of the viewpoint image A agrees with the resolution of the viewpoint image B after resolution reduction processing. The multi-viewpoint image decoding device 13 references, at the time of decoding the encoded data of the viewpoint image B after resolution reduction processing, the viewpoint image A after resolution reduction processing. The multi-viewpoint image decoding device 13 outputs the viewpoint image A obtained as a decoding result, and supplies the viewpoint image B after resolution reduction processing to the image inverse conversion processing device 14.

The image inverse conversion processing device 14 serves as a resolution increase processing unit, and performs, based on the viewpoint B low-resolution conversion information supplied from the multi-viewpoint image decoding device 13, resolution increase processing to increase resolution on the viewpoint image B after resolution reduction processing supplied from the multi-viewpoint image decoding device 13. Thus, the image inverse conversion processing device 14 generates, as a viewpoint image B after resolution increase processing, the viewpoint image B having the same resolution as with the viewpoint image A, that is, resolution at the time of being externally input as an object to be encoded. The image inverse conversion processing device 14 outputs the generated viewpoint image B.

Overview of Encoding and Decoding of Viewpoint Image B

Figure 2:
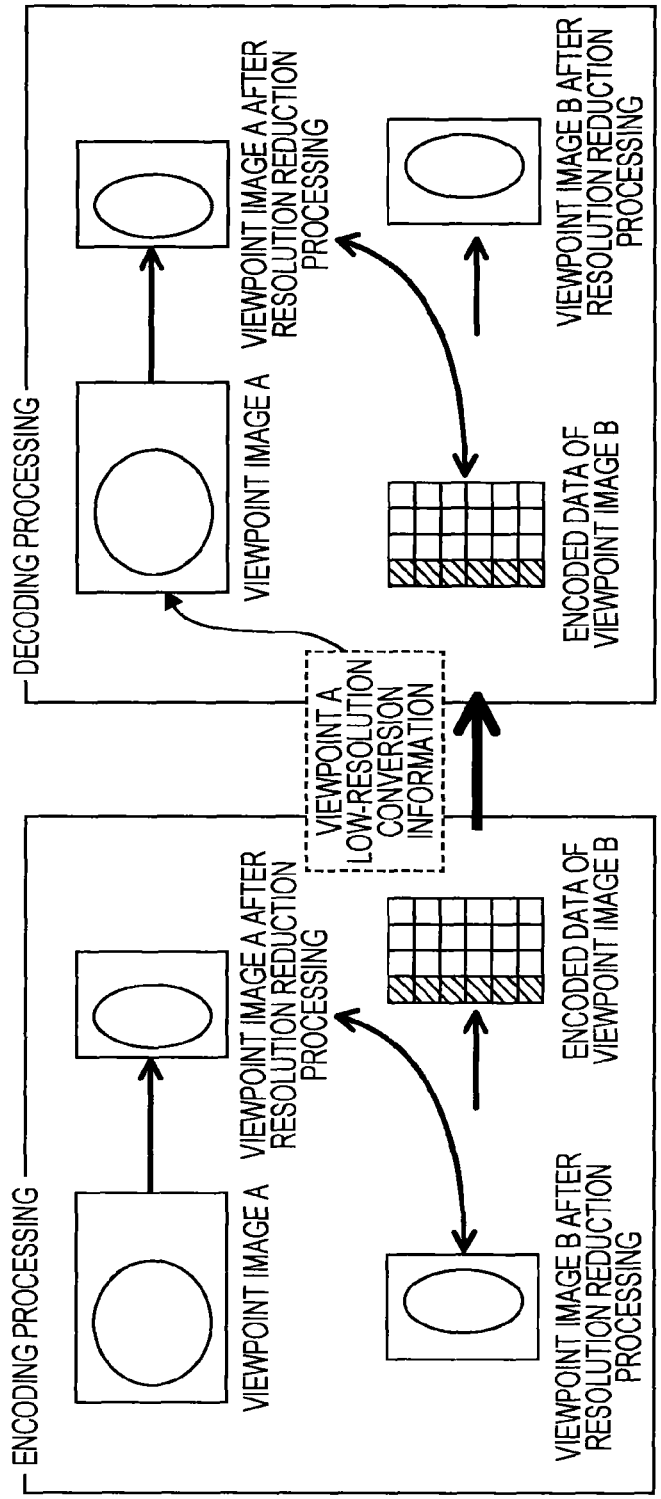
FIG. 2 is a diagram for describing overview of encoding and decoding of a viewpoint image B after resolution reduction processing.

FIG. 2 is a diagram for describing overview of encoding by the multi-viewpoint image encoding device 12 in FIG. 1 and decoding by the multi-viewpoint image decoding device 13 of the viewpoint image B after resolution reduction processing.

As illustrated in the left side of FIG. 2, with the multi-viewpoint image encoding device 12, the viewpoint image A is subjected to resolution reduction processing so that the resolution of the viewpoint image A agrees with the resolution of the viewpoint image B after resolution reduction processing. At the time of encoding the viewpoint image B after resolution reduction processing, the viewpoint image A after resolution reduction processing is referenced. Accordingly, an object to be encoded, and an image to be referenced at the time of encoding have the same resolution, and accordingly, encoding may be performed with a method employing the MVC format or the like.

The encoded data of the viewpoint image B after resolution reduction processing obtained as an encoding result is transmitted to the multi-viewpoint image decoding device 13 along with the viewpoint A low-resolution conversion information.

Note that, in FIG. 2, of squares of 4×6 that represent the encoded data of the viewpoint image B, shaded squares represent skip macroblocks where information regarding residual and encoding is not encoded. Also, non-shaded squares represent macroblocks where information regarding residual and encoding is encoded. These are true in later-described FIG. 17, FIG. 38, and FIG. 39.

Also, as illustrated in the right side of FIG. 2, with the multi-viewpoint image decoding device 13, the viewpoint image A encoded by the multi-viewpoint image encoding device 12 and decoded by the multi-viewpoint image decoding device 13 is subjected to resolution reduction processing based on the viewpoint A low-resolution conversion information. Thus, the resolution of the viewpoint image A is set to the same resolution as with the viewpoint image B after resolution reduction processing. At the time of decoding of the encoded data of the viewpoint image B after resolution reduction processing transmitted from the multi-viewpoint image encoding device 12, the viewpoint image A after resolution reduction processing is referenced. Accordingly, an object to be decoded, and an image to be referenced at the time of decoding have the same resolution, and accordingly, decoding may be performed with a method employing the MVC format or the like.

Description of Processing of Image Processing System

Figure 3:
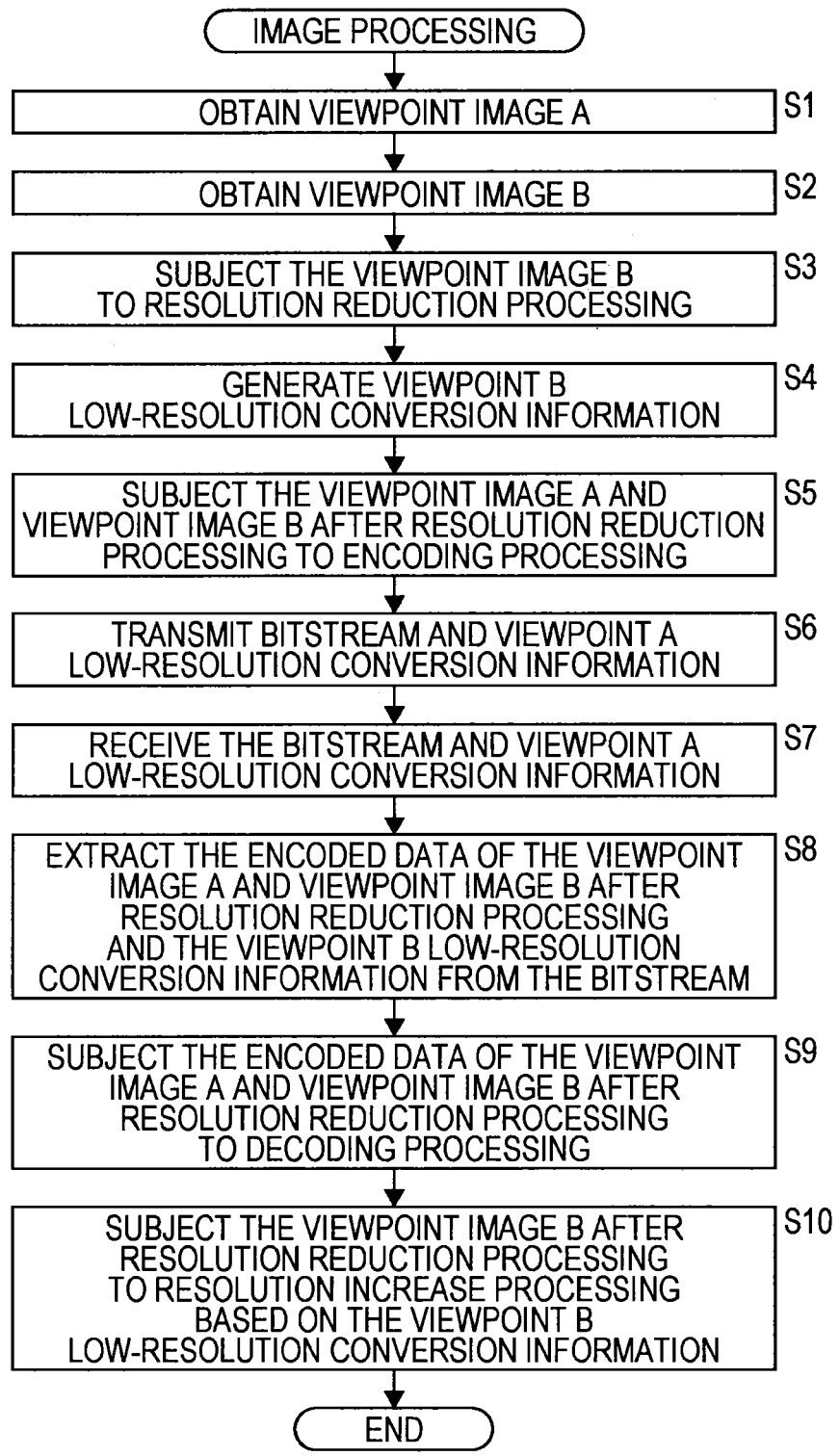
FIG. 3 is a flowchart for describing image processing to be performed by the image processing system in FIG. 1.

FIG. 3 is a flowchart for describing image processing to encode and decode the viewpoint image A and viewpoint image B to be performed by the image processing system 10 in FIG. 1.

In step S1, the multi-viewpoint image encoding device 12 of the image processing system 10 obtains the viewpoint image A to be externally input as an object to be encoded, and the processing proceeds to step S2.

In step S2, the image conversion processing device 11 obtains the viewpoint image B to be externally input as an object to be encoded, and the processing proceeds to step S3.

In step S3, the image conversion processing device 11 subjects the viewpoint image B to resolution reduction processing, supplies the viewpoint image B after resolution reduction processing to the multi-viewpoint image encoding device 12, and the processing proceeds to step S4.

In step S4, the image conversion processing device 11 generates viewpoint B low-resolution conversion information, supplies to the multi-viewpoint image encoding device 12, and the processing proceeds to step S5.

In step S5, the multi-viewpoint image encoding device 12 subjects the viewpoint image A and the viewpoint image B after resolution reduction processing to be supplied from the image conversion processing device 11 to encoding processing.

Specifically, the multi-viewpoint image encoding device 12 encodes the viewpoint image A. Also, the multi-viewpoint image encoding device 12 generates the viewpoint image A having the same resolution as the resolution of the viewpoint image B after resolution reduction processing by subjecting the viewpoint image A to resolution reduction processing, and encodes the viewpoint image B after resolution reduction processing with reference to the viewpoint image A thereof. The multi-viewpoint image encoding device 12 then multiplexes the encoded data of the viewpoint image A and viewpoint image B after resolution reduction processing obtained as encoding results, and the viewpoint B low-resolution conversion information supplied from the image conversion processing device 11 to generate a bitstream. Also, the multi-viewpoint image encoding device 12 generates viewpoint A low-resolution conversion information. The processing then proceeds to step S6.

In step S6, the multi-viewpoint image encoding device 12 transmits the bitstream and viewpoint A low-resolution conversion information to the multi-viewpoint image decoding device 13, and the processing proceeds to step S7.

In step S7, the multi-viewpoint image decoding device 13 receives the bitstream and viewpoint A low-resolution conversion information transmitted from the multi-viewpoint image encoding device 12, and the processing proceeds to step S8.

In step S8, the multi-viewpoint image decoding device 13 extracts, from the received bitstream, the encoded data of the viewpoint image A and viewpoint image B after resolution reduction processing, and viewpoint B low-resolution conversion information. The multi-viewpoint image decoding device 13 then supplies the viewpoint B low-resolution conversion information to the image inverse conversion processing device 14, and the processing proceeds to step S9.

In step S9, the multi-viewpoint image decoding device 13 subjects the encoded data of the viewpoint image A and viewpoint image B after resolution reduction processing to decoding processing. Specifically, the multi-viewpoint image decoding device 13 decodes the encoded data of the viewpoint image A to generate a viewpoint image A. Also, the multi-viewpoint image decoding device 13 subjects, based on the received viewpoint A low-resolution conversion information, the viewpoint image A obtained as a decoding result to resolution reduction processing, thereby generating a viewpoint image A having the same resolution as with the viewpoint image B after resolution reduction processing. The multi-viewpoint image decoding device 13 then decodes the encoded data of the viewpoint image B after resolution reduction processing with reference to the viewpoint image A thereof to generate a viewpoint image B after resolution reduction processing.

The multi-viewpoint image decoding device 13 outputs the viewpoint image A obtained as a result of the decoding processing, supplies the viewpoint image B after resolution reduction processing to the image inverse conversion processing device 14, and the processing proceeds to step S10.

In step S10, the image inverse conversion processing device 14 subjects, based on the viewpoint B low-resolution conversion information supplied from the multi-viewpoint image decoding device 13, the viewpoint image B after resolution reduction processing supplied from the multi-viewpoint image decoding device 13 to resolution increase processing. The image inverse conversion processing device 14 outputs the viewpoint image B having the same resolution at the time of being input to the image processing system 10, which is generated as a result of the resolution increase processing. The processing then ends.

Configuration Example of Image Conversion Processing Device

Figure 4:
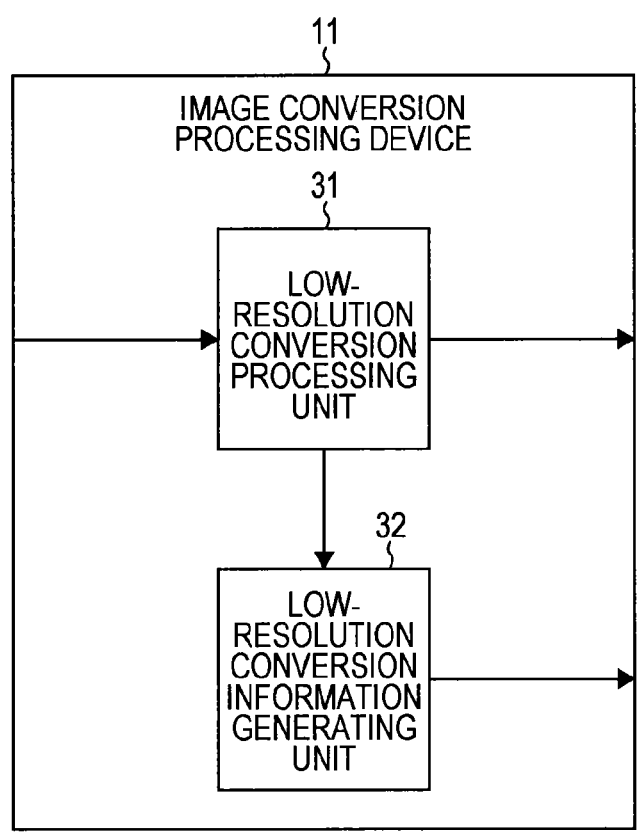
FIG. 4 is a block diagram illustrating a configuration example of an image conversion processing device in FIG. 1.

FIG. 4 is a block diagram illustrating a configuration example of the image conversion processing device 11 in FIG. 1.

In FIG. 4, the image conversion processing device 11 includes a low-resolution conversion processing unit 31, and a low-resolution conversion information generating unit 32.

The low-resolution conversion processing unit 31 of the image conversion processing device 11 serves as a second viewpoint low-resolution processing unit, subjects the viewpoint image B to predetermined filter processing as resolution reduction processing, and supplies the viewpoint image B after resolution reduction processing to the multi-viewpoint image encoding device 12 in FIG. 1. Also, the low-resolution conversion processing unit 31 supplies information such as the number of taps of the filter processing performed as resolution reduction processing to the low-resolution conversion information generating unit 32.

The low-resolution conversion information generating unit 32 generates viewpoint B low-resolution conversion information based on the information such as the number of taps of the filter processing supplied from the low-resolution conversion processing unit 31, and supplied to the multi-viewpoint image encoding device 12.

Configuration Example of Multi-Viewpoint Image Encoding Device

Figure 5:
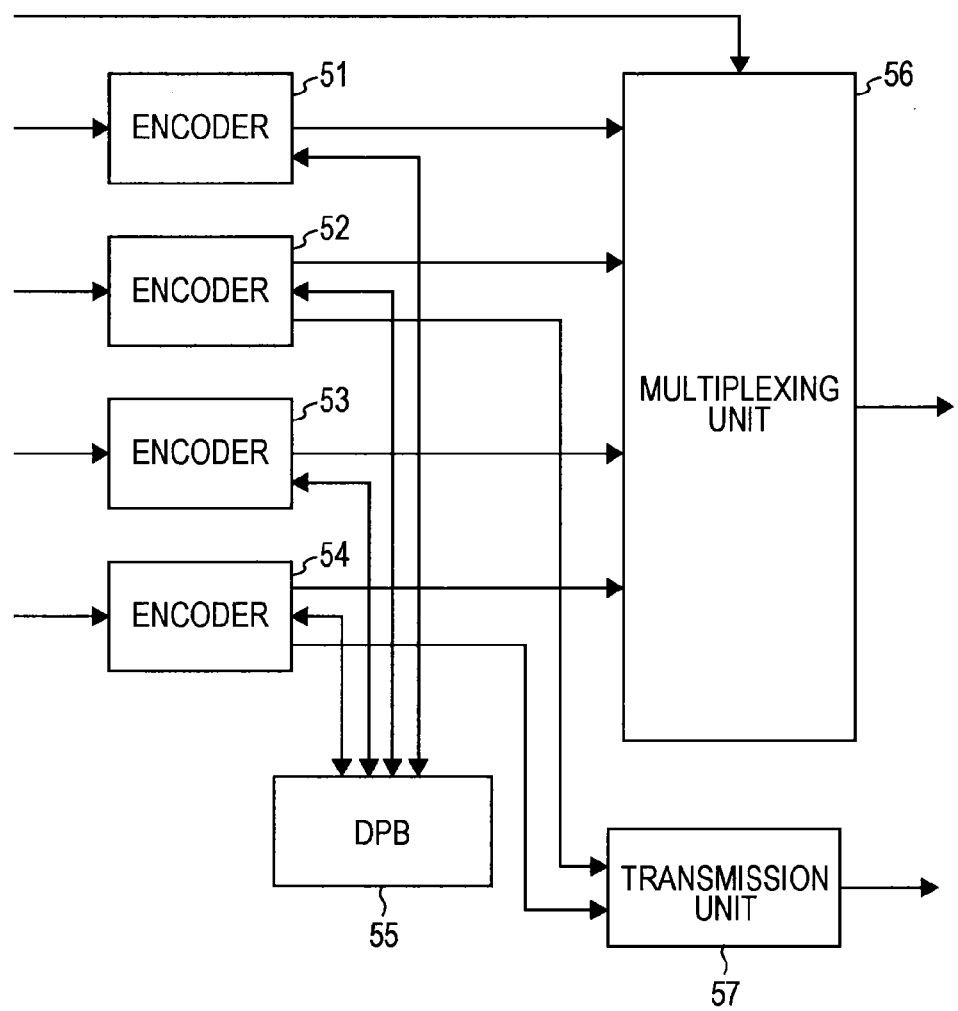
FIG. 5 is a block diagram illustrating a configuration example of a multi-viewpoint image encoding device in FIG. 1.

FIG. 5 is a block diagram illustrating a configuration example of the multi-viewpoint image encoding device 12 in FIG. 1.

The multi-viewpoint image encoding device 12 in FIG. 5 is an encoding device configured to encode images of multiple viewpoints using the MVC format for example, and hereinafter, with regard to the same processing as with the MVC format, description will be omitted as appropriate.

In FIG. 5, the multi-viewpoint image encoding device 12 includes encoders 51 to 54, a DPB (Decoded Picture Buffer) 55, a multiplexing unit 56, and a transmission unit 57.

The multi-viewpoint image encoding device 12 encodes the viewpoint image A of the base point as a base view in the MVC format, and encodes the viewpoint image B of a viewpoint other than the base point as a dependent view in the MVC format.

Specifically, the encoder 51 of the multi-viewpoint image encoding device 12 encodes a color image of the viewpoint A to be externally input as an object to be encoded, and supplies encoded data of the color image of the viewpoint A obtained as a result thereof to the multiplexing unit 56.

The encoder 52 encodes a color image of the viewpoint B after resolution reduction processing supplied from the image conversion processing device 11, and supplies encoded data of the color image of the viewpoint B obtained as a result thereof to the multiplexing unit 56. Also, the encoder 52 generates viewpoint A low-resolution conversion information, and supplies to the transmission unit 57.

The encoder 53 encodes a disparity information image of the viewpoint A to be externally input as an object to be encoded, and supplies encoded data of the disparity information image of the viewpoint A obtained as a result thereof to the multiplexing unit 56.

The encoder 54 encodes a disparity information image of the viewpoint B after resolution reduction processing supplied from the image conversion processing device 11, and supplies encoded data of the disparity information image of the viewpoint B obtained as a result thereof to the multiplexing unit 56. Also, the encoder 54 generates viewpoint A low-resolution conversion information, and supplies to the transmission unit 57.

The DPB 55 temporarily stores an image after local decoding (decoded image) obtained by each of the encoders 51 to 54 encoding an image to be encoded, and subjecting this to local decoding, as (a candidate of) a reference picture to be referenced at the time of generating a prediction image.

Specifically, the encoders 51 to 54 subject an image to be encoded to prediction encoding. Therefore, in order to generate a prediction image to be used for prediction encoding, the encoders 51 to 54 obtains a decoded image by encoding an image to be encoded, and then performing local decoding thereon.

The DPB 55 is, so to speak, a buffer for common use which temporarily stores a decoded image obtained at each of the encoders 51 to 54, and each of the encoders 51 to 54 selects a reference picture to be referenced for encoding an image to be encoded, from decoded images stored in the DPB 55. Each of the encoders 51 to 54 generates a prediction image using the reference picture, and uses the prediction image thereof to perform encoding (prediction encoding) of an image.

The DPB 55 is shared by the encoders 51 to 54, and accordingly, each of the encoders 51 to 54 may also reference a decoded image obtained from another encoder in addition to a decoded image obtained by itself.

In addition to encoded data from each of the encoders 51 to 54, the viewpoint B low-resolution conversion information is supplied from the image conversion processing device 11 to the multiplexing unit 56.

The multiplexing unit 56 and transmission unit 57 serve as a transfer unit. Specifically, the multiplexing unit 56 multiplexes encoded data from each of the encoders 51 to 54 and the viewpoint B low-resolution conversion information to generate a bitstream. The multiplexing unit 56 transfers the bitstream to the multi-viewpoint image decoding device 13 in FIG. 1.

The transmission unit 57 transfers the viewpoint A low-resolution conversion information supplied from the encoder 52 and encoder 54 to the multi-viewpoint image decoding device 13.

Configuration Example of Encoder 51

Figure 6:
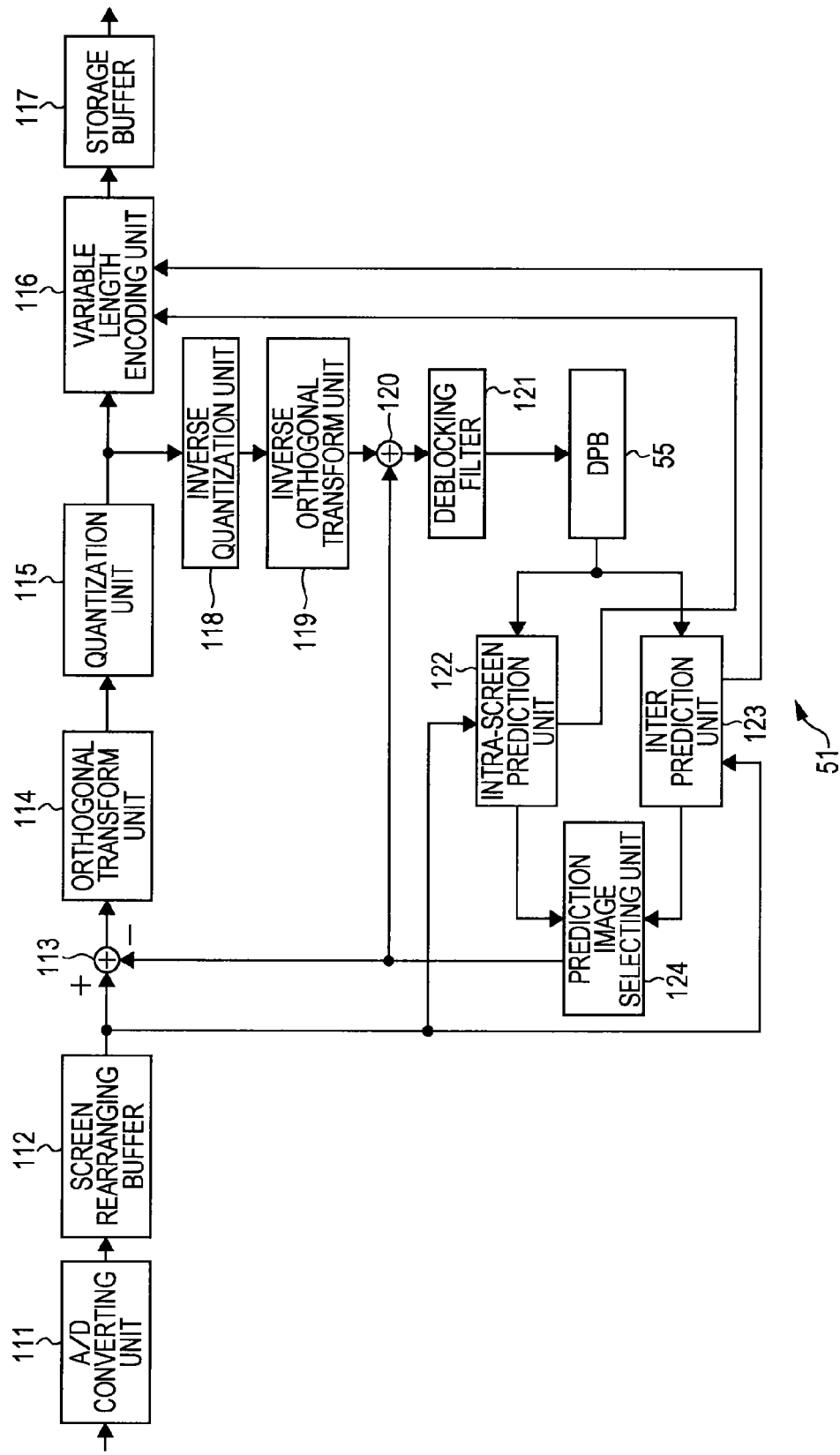
FIG. 6 is a block diagram illustrating a configuration example of an encoder in FIG. 5.

FIG. 6 is a block diagram illustrating a configuration example of the encoder 51 in FIG. 5.

Note that the encoder 53 in FIG. 5 is also configured in the same way as the encoder 51, and performs encoding of images in accordance with the MVC format, for example.

In FIG. 6, the encoder 51 has an A/D (Analog/Digital) converting unit 111, a screen rearranging buffer 112, a computing unit 113, an orthogonal transform unit 114, a quantization unit 115, a variable length encoding unit 116, a storage buffer 117, an inverse quantization unit 118, an inverse orthogonal transform unit 119, a computing unit 120, a deblocking filter 121, an intra-screen prediction unit 122, an inter prediction unit 123, and a prediction image selecting unit 124.

The pictures of viewpoint A color images which are images to be encoded (moving image) are sequentially supplied in display order to the A/D converting unit 111.

In the event that the pictures supplied thereto are analog signals, the A/D converting unit 111 subjects the analog signals thereof to A/D conversion, and supplies to the screen rearranging buffer 112.

The screen rearranging buffer 112 temporarily stores the pictures from the A/D converting unit 111, and reads out the pictures in accordance with a GOP (Group of Pictures) structure determined beforehand, thereby performing rearranging where the order of the pictures is rearranged from display order to encoding order (decoding order).

The pictures read out from the screen rearranging buffer 112 are supplied to the computing unit 113, the intra-screen prediction unit 122, and the inter prediction unit 123.

Pictures are supplied from the screen rearranging buffer 112 to the computing unit 113, and also, prediction images generated at the intra-screen prediction unit 122 or inter prediction unit 123 are supplied from the prediction image selecting unit 124.

The computing unit 113 takes a picture read out from the screen rearranging buffer 112 to be a current picture to be encoded, and further sequentially takes a macroblock making up the current picture to be a current block to be encoded.

The computing unit 113 then computes a subtraction value where a pixel value of a prediction image supplied from the prediction image selecting unit 124 is subtracted from a pixel value of the current block as necessary, thereby performing prediction encoding, and supplies to the orthogonal transform unit 114.

The orthogonal transform unit 114 subjects (the pixel value, or the residual of the prediction image having been subtracted, of) the current block from the computing unit 113 to orthogonal transform such as discrete cosine transform or Karhunen-Lóeve transform or the like, and supplies transform coefficients obtained as a result thereof to the quantization unit 115.

The quantization unit 115 quantizes the transform coefficients supplied from the orthogonal transform unit 114, and supplies quantization values obtained as a result thereof to the variable length encoding unit 116.

The variable length encoding unit 116 performs lossless encoding such as variable-length coding (e.g., CAVLC (Context-Adaptive Variable Length Coding) or the like) or arithmetic coding (e.g., CABAC (Context-Adaptive Binary Arithmetic Coding) or the like) on the quantization values from the quantization unit 115, and supplies the encoded data obtained as a result thereof to the storage buffer 117.

Note that in addition to quantization values being supplied to the variable length encoding unit 116 from the quantization unit 115, header information to be included in the header of the encoded data is also supplied from the intra-screen prediction unit 122 or inter prediction unit 123.

The variable length encoding unit 116 encodes the header information from the intra-screen prediction unit 122 or inter prediction unit 123, and includes in the header of the encoded data.

The storage buffer 117 temporarily stores the encoded data from the variable length encoding unit 116, and outputs at a predetermined data rate.

The encoded data output from the storage buffer 117 is supplied to the multiplexing unit 56 (FIG. 5).

Quantization values obtained at the quantization unit 115 are supplied to the variable length encoding unit 116, and also supplied to the inverse quantization unit 118 as well, and local decoding is performed at the inverse quantization unit 118, inverse orthogonal transform unit 119, and computing unit 120.

That is to say, the inverse quantization unit 118 performs inverse quantization of the quantization values from the quantization unit 115 into transform coefficients, and supplies to the inverse orthogonal transform unit 119.

The inverse orthogonal transform unit 119 performs inverse orthogonal transform of the transform coefficients from the inverse quantization unit 118, and supplies to the computing unit 120.

The computing unit 120 adds pixel values of a prediction image supplied from the prediction image selecting unit 124 to the data supplied from the inverse orthogonal transform unit 119 as necessary, thereby obtaining a decoded image where the current block has been decoded (locally decoded), which is supplied to the deblocking filter 121.

The deblocking filter 121 performs filtering of the decoded image from the computing unit 120, thereby removing (reducing) block noise occurring in the decoded image, and supplies to the DPB 55.

Now, the DPB 55 stores a decoded image from the deblocking filter 121, that is, the picture of a color image of the viewpoint A encoded at the encoder 51 and locally decoded, as (a candidate for) a reference picture to be referenced when generating a prediction image to be used for prediction encoding (encoding where subtraction of a prediction image is performed at the computing unit 113) later in time.

As described with FIG. 5, the DPB 55 is shared between the encoders 51 to 54, so besides the picture of a color image of the viewpoint A encoded at the encoder 51 and locally decoded, also stores the picture of a color image of the viewpoint B encoded at the encoder 52 and locally decoded, the picture of a disparity information image of the viewpoint A encoded at the encoder 53 and locally decoded, and the picture of a disparity information image of the viewpoint B encoded at the encoder 52 and locally decoded.

Note that local decoding by the inverse quantization unit 118, inverse orthogonal transform unit 119, and computing unit 120 is performed on I pictures, P pictures, and Bs pictures which are referable pictures which can be reference pictures, for example, and the DPB 553 stores decoded images of the I pictures, P pictures, and Bs pictures.

In the event that the current picture is an I picture, P picture, or B picture (including Bs picture) which can be intra-predicted (intra-screen predicted), the intra-screen prediction unit 122 reads out, from the DPB 55, the portion of the current picture which has already been locally decoded (decoded image). The intra-screen prediction unit 122 then takes the part of the decoded image of the current picture, read out from the DPB 55, as a prediction image of the current block of the current picture supplied from the screen rearranging buffer 112.

Further, the intra-screen prediction unit 122 obtains encoding cost necessary to encode the current block using the prediction image, that is, encoding cost necessary to encode the residual of the current block as to the prediction image and so forth, and supplies this to the prediction image selecting unit 124 along with the prediction image.

In the event that the current picture is a P picture or B picture (including Bs picture) which can be inter-predicted, the inter prediction unit 123 reads out from the DPB 55 one or more pictures which have been encoded and locally decoded before the current picture, as candidate pictures (candidates of a reference picture).

Also, the inter prediction unit 123 employs ME (Motion Estimation) (motion detection) using the current block of the current picture from the screen rearranging buffer 112 and a candidate picture, to detect a shift vector representing motion (temporal shift) serving as shift between the current block and a corresponding block corresponding to the current block (e.g., a block which minimizes the SAD (Sum of Absolute Differences) as to the current block) of the candidate picture.

The inter prediction unit 123 generates a prediction image by performing motion compensation to compensate shift of motion worth of a candidate picture from the DPB 55 in accordance with the shift vector of the current block, thereby generating a prediction image.

That is to say, the inter prediction unit 123 obtains a corresponding block, which is a block (region) at a position that has moved (shifted) from the position of the current block in the candidate picture, as a prediction image in accordance with the shift vector of the current block.

Further, the inter prediction unit 123 obtains the encoding cost necessary to encode the current block using the prediction image, for each inter prediction mode of which the candidate picture to be used for generation of a prediction image or the macroblock type differs.

The inter prediction unit 123 then takes the inter prediction mode of which the encoding cost is the smallest as the optimal inter prediction mode which is the inter prediction mode that is optimal, and supplies the prediction image and encoding cost obtained in that optimal inter prediction mode to the prediction image selecting unit 124.

The prediction image selecting unit 124 selects the one of the prediction images from each of the intra-screen prediction unit 122 and inter prediction unit 123 of which the encoding cost is smaller, and supplies to the computing units 113 and 120.

Now, the intra-screen prediction unit 122 supplies information relating to intra prediction to the variable length encoding unit 116 as header information, and the inter prediction unit 123 supplies information relating to inter prediction (information of a shift vector, etc.) to the variable length encoding unit 116 as header information.

The variable length encoding unit 116 selects, of the header information from each of the intra-screen prediction unit 122 and inter prediction unit 123, the header information by which a prediction image with smaller encoding cost has been generated, and includes this in the header of the encoded data.

Configuration Example of Encoder 52

Figure 7:
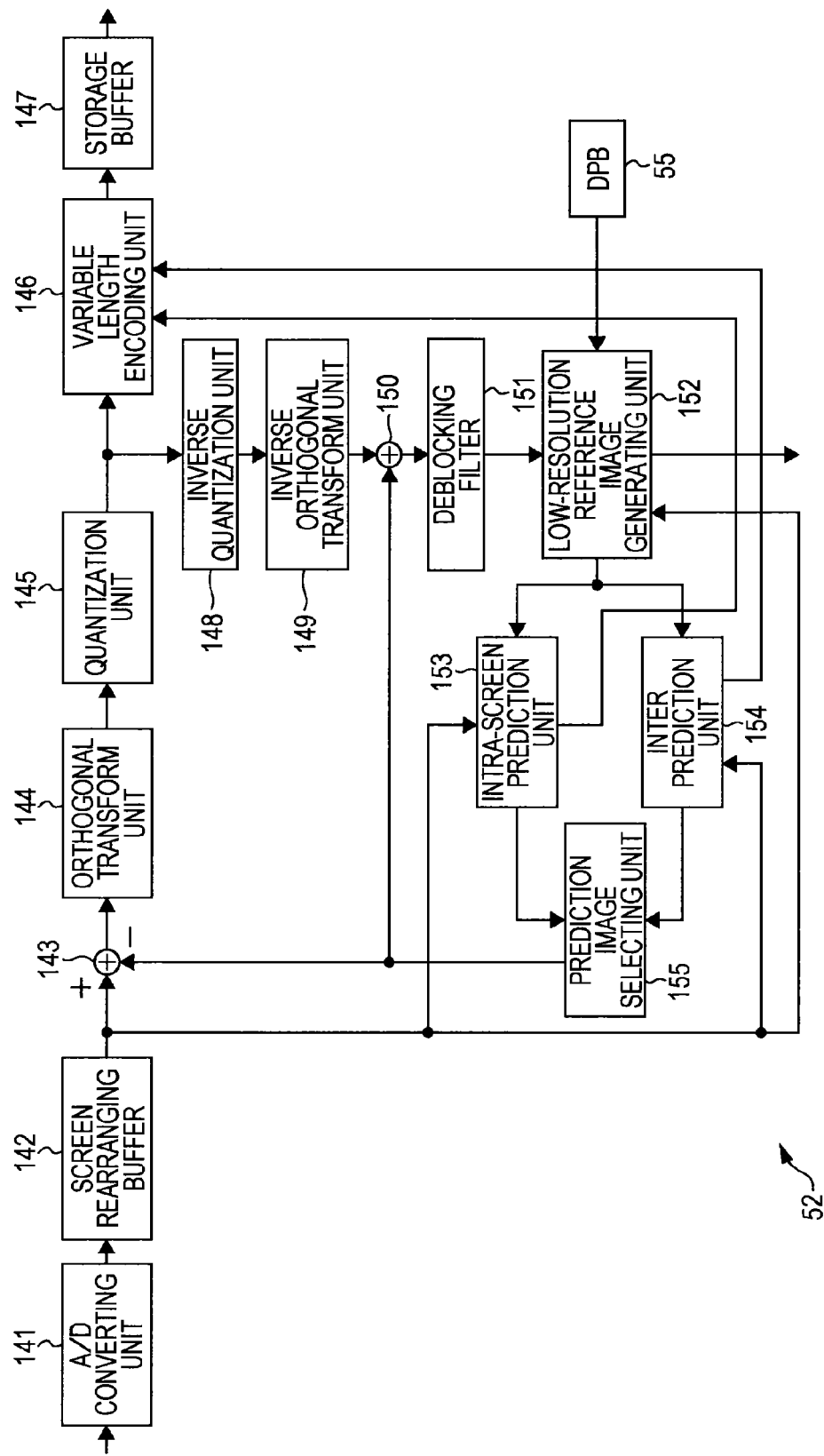
FIG. 7 is a block diagram illustrating a configuration example of another encoder in FIG. 5.

FIG. 7 is a block diagram illustrating a configuration example of the encoder 52 in FIG. 5.

Note that the encoder 54 in FIG. 5 is also configured as the encoder 52, and performs encoding of images in accordance with the MVC format, for example.

In FIG. 7, the encoder 52 includes an A/D converting unit 141, a screen rearranging buffer 142, a computing unit 143, an orthogonal transform unit 144, a quantization unit 145, a variable length encoding unit 146, a storage buffer 147, an inverse quantization unit 148, an inverse orthogonal transform unit 149, a computing unit 150, a deblocking filter 151, a low-resolution reference image generating unit 152, an intra-screen prediction unit 153, an inter prediction unit 154, and a prediction image selecting unit 155.

The A/D converting unit 141, screen rearranging buffer 142, computing unit 143, orthogonal transform unit 144, quantization unit 145, variable length encoding unit 146, storage buffer 147, inverse quantization unit 148, orthogonal transform unit 149, computing unit 150, deblocking filter 151, intra-screen prediction unit 153, and prediction image selecting unit 155 of the encoder 52 are the same as the A/D converting unit 111, screen rearranging buffer 112, computing unit 113, orthogonal transform unit 114, quantization unit 115, variable length encoding unit 116, storage buffer 117, inverse quantization unit 118, orthogonal transform unit 119, computing unit 120, deblocking filter 121, intra-screen prediction unit 122, and prediction image selecting unit 124 in FIG. 6 respectively, and accordingly, description will be omitted.

The low-resolution reference image generating unit 152 of the encoder 52 detects the resolution of a predetermined picture read out from the screen rearranging buffer 142. For example, the low-resolution reference image generating unit 152 detects the resolution of the top picture in sequence or GOP, for example.

Also, the low-resolution reference image generating unit 152 serves as a first viewpoint resolution reduction processing unit. Specifically, the low-resolution reference image generating unit 152 subjects the picture of a color image of the viewpoint A read out as a candidate picture from the DPB 55 and subjected to local decoding, to predetermined filter processing as resolution reduction processing, and sets the resolution of the candidate picture to the same resolution as the detected resolution. That is to say, the low-resolution reference image generating unit 152 sets the resolution of the picture of the color image of the viewpoint A to be read out as a candidate picture to the same as the resolution of the picture of a color image of the viewpoint B which is the current picture. The low-resolution reference image generating unit 152 then supplies the candidate picture after resolution reduction processing to the inter prediction unit 154.

Further, the low-resolution reference image generating unit 152 supplies, of a decoded image of the current picture read out from the DPB 55, a portion already subjected to local decoding to the intra-screen prediction unit 153 without change. That is to say, the resolution of a decoded image of the current picture read out from the DPB 55 is the same as the resolution of the current picture. Accordingly, the decoded image of the current picture read out from the DPB 55 is supplied to the intra-screen prediction unit 153 without change.

Also, the low-resolution reference image generating unit 152 supplies a picture different from the current picture of a color image of the viewpoint B read out from the DPB 55 as a candidate picture and subjected to local decoding to the inter prediction unit 154 without change. That is to say, the resolution of a picture different from the current picture of the color image of the viewpoint B read out from the DPB 55 as a candidate picture and subjected to local decoding is the same as the resolution of the current picture. Accordingly, the picture different from the current picture of the color image of the viewpoint B read out from the DPB 55 as a candidate picture and subjected to local decoding is supplied to the inter prediction unit 154 without change. Also, the low-resolution reference image generating unit 152 generates viewpoint A low-resolution conversion information, and supplies to the transmission unit 57 in FIG. 5.

In the event that the current picture is a P picture or B picture (including Bs picture) to be able to be inter-predicted, the inter prediction unit 154 reads out one or more pictures encoded prior to the current picture and subjected to local decoding from the DPB 55 via the low-resolution reference image generating unit 152 as candidate pictures.

Also, the inter prediction unit 154 detects a vector that represents motion or disparity (spatial shift) as a shift vector using ME according to the current block of the current picture from the screen rearranging buffer 142 and the candidate pictures.

Specifically, in the event that the candidate picture is the picture of the same viewpoint as with the current picture, a shift vector to be detected by ME using the current block and candidate picture becomes a motion vector that represents motion between the current block and candidate picture.

Also, in the event that the candidate picture is the picture of a viewpoint different from the current picture, a shift vector to be detected by ME using the current block and candidate picture becomes a disparity vector that represents disparity between the current block and candidate picture.

As described above, a disparity vector obtained by ME will also be referred to as computed disparity vector in order to be distinguished from a disparity vector in a later-described multi-viewpoint image generating device.

The inter prediction unit 154 generates a prediction image by performing motion compensation to compensate shift for motion worth of a candidate picture from the DPB 55, or disparity compensation to compensate shift for disparity worth as shift compensation to compensate shift, in accordance with the shift vector of the current block.

Also, the inter prediction unit 154 obtains, in the same way as with the inter prediction unit 123 in FIG. 6, encoded cost for each inter prediction mode.

Next, the inter prediction unit 154 determines, in the same way as with the inter prediction unit 123, the optimal inter prediction mode, and supplies a prediction image and encoding cost obtained in the optimal inter prediction mode thereof to the prediction image selecting unit 155.

Configuration Example of Low-Resolution Reference Image Generating Unit

Figure 8:
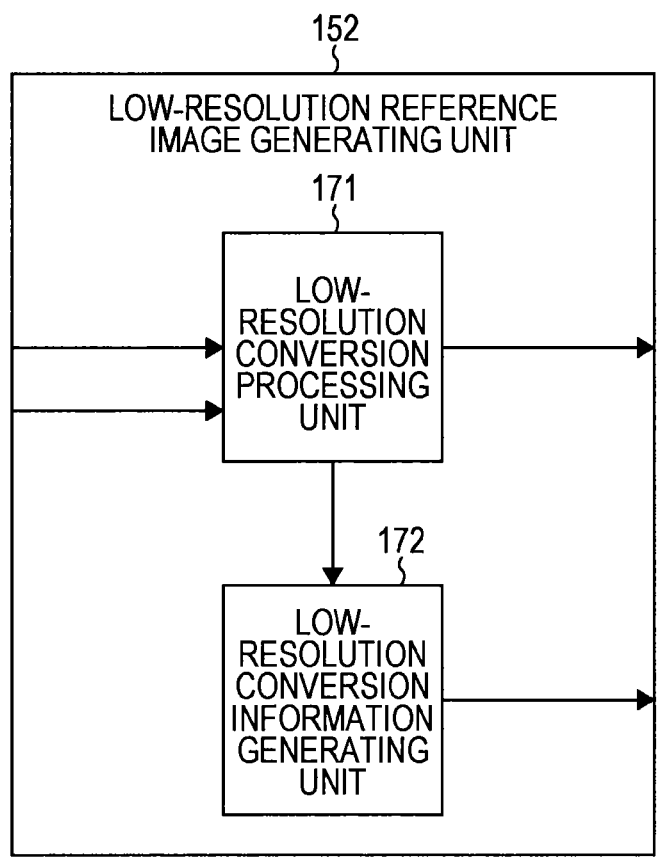
FIG. 8 is a block diagram illustrating a configuration example of a low-resolution reference imaged generating unit in FIG. 7.

FIG. 8 is a block diagram illustrating a configuration example of the low-resolution reference image generating unit 152 in FIG. 7.

The low-resolution reference image generating unit 152 in FIG. 8 is configured of a low-resolution conversion processing unit 171 and a low-resolution conversion information generating unit 172.

The low-resolution conversion processing unit 171 of the low-resolution reference image generating unit 152 detects the resolution of a predetermined picture read out from the screen rearranging buffer 142. Also, the low-resolution conversion processing unit 171 performs predetermined filter processing on the picture of a color image of the viewpoint A read out from the DPB 55 as a candidate picture and subjected to local decoding, as resolution reduction processing so that the resolution of the candidate picture agrees with the detected resolution. Next, the low-resolution conversion processing unit 171 supplies the candidate picture after resolution reduction processing to the inter prediction unit 154 (FIG. 7).

Also, the low-resolution conversion processing unit 171 supplies, of a decoded image of the current picture read out from the DPB 55, a portion already subjected to local decoding to the intra-screen prediction unit 153 without change. Further, the low-resolution conversion processing unit 171 supplies a picture different from the current picture of a color image of the viewpoint B read out from the DPB 55 as a candidate picture and subjected to local decoding to the inter prediction unit 154 without change. Further, the low-resolution conversion processing unit 171 supplies information such as the number of taps of the filter processing performed as resolution reduction processing to the low-resolution conversion information generating unit 172.

The low-resolution conversion information generating unit 172 generates, based on the information such as the number of taps of the filter processing supplied from the low-resolution conversion processing unit 171, viewpoint A low-resolution conversion information, and supplies to the transmission unit 57 in FIG. 5.

Description of Processing of Encoder 52

Figure 9:
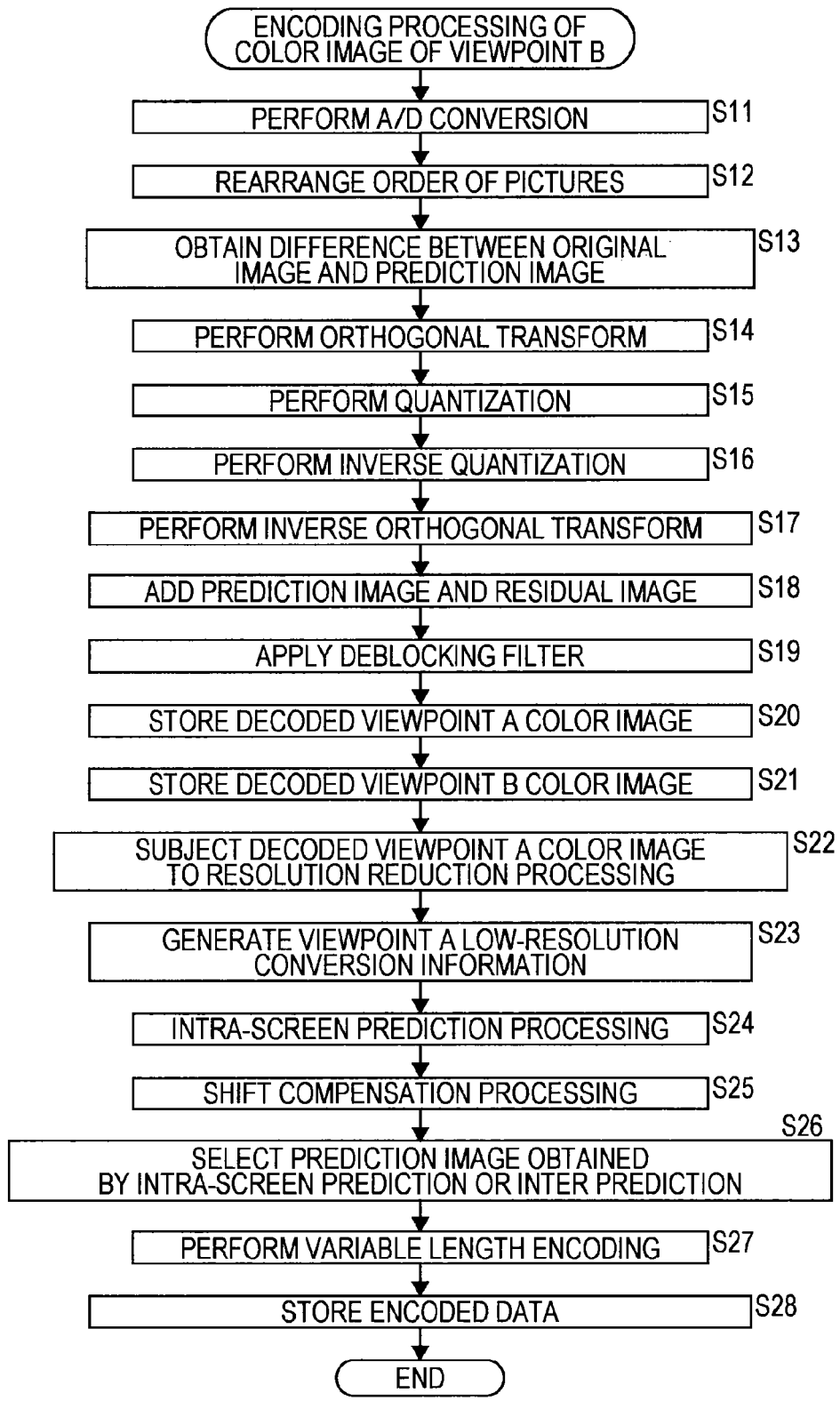
FIG. 9 is a flowchart for describing encoding processing to be performed by the encoder in FIG. 7.

FIG. 9 is a flowchart for describing encoding processing for encoding a color image of the viewpoint B that the encoder 52 in FIG. 7 performs in step S5 in FIG. 3.

In step S11, the A/D converting unit 141 converts analog signals of the picture of a color image of the viewpoint B supplied from the image conversion processing device 11 in FIG. 1 into digital signals, supplies to the screen rearranging buffer 142, and the processing proceeds to step S12.

In step S12, the screen rearranging buffer 142 temporarily stores the picture of the color image of the viewpoint B from the A/D converting unit 141, and reads out the picture according to the structure of GOP determined beforehand, thereby performing rearrangement for rearranging the order of pictures from display order to encoding order.

The picture read out from the screen rearranging buffer 142 is supplied to the computing unit 143, low-resolution reference image generating unit 152, intra-screen prediction unit 153, and inter prediction unit 154, and the processing proceeds from step S12 to step S13.

In step S13, the computing unit 143 takes the picture of the color image of the viewpoint B from the screen rearranging buffer 142 as a current picture to be encoded, and further sequentially takes a macroblock making up the current picture as a current block to be encoded.

The computing unit 143 then computes difference (residual) between the pixel values of the current block and the pixel values of the predicted image supplied from the prediction image selecting unit 155 as appropriate, supplies to the orthogonal transform unit 144, and the processing proceeds from step S13 to step S14.

In step S14, the orthogonal transform unit 144 subjects the current block from the computing unit 143 to orthogonal transform, supplies transform coefficients obtained as a result thereof to the quantization unit 145, and the processing proceeds to step S15.

The quantization unit 145 quantizes the transform coefficients supplied from the orthogonal transform unit 144, supplies quantization values obtained as a result thereof to the inverse quantization unit 148 and variable length encoding unit 146, and the processing proceeds to step S16.

In step S16, the inverse quantization unit 148 inverse-quantizes the quantization values from the quantization unit 145 into transform coefficients, supplies to the inverse orthogonal transform unit 149, and the processing proceeds to step S17.

In step S17, the inverse orthogonal transform unit 149 subjects the transform coefficients from the inverse quantization unit 148 to inverse orthogonal transform, supplies to the computing unit 150, and the processing proceeds to step S18.

In step S18, the computing unit 150 adds the pixel values of the prediction image supplied from the prediction image selecting unit 155 to the data supplied from the inverse orthogonal transform unit 149 as appropriate, thereby obtaining a decoded viewpoint B color image decoded (locally decoded) from the current block. The computing unit 150 then supplies the decoded viewpoint B color image of the current block to the deblocking filter 151, and the processing proceeds from step S18 to step S19.

In step S19, the deblocking filter 151 subjects the decoded viewpoint B color image from the computing unit 150 to filtering, supplies to the DPB 55, and the processing proceeds to step S20.

In step S20, the DPB 55 waits for a decoded viewpoint A color image being obtained from the encoder 51 configured to encode a color image of the viewpoint A by encoding and locally decoding the color image of the viewpoint A thereof, stores the decoded viewpoint A color image thereof, and the processing proceeds to step S21.

In step S21, the DPB 55 stores the decoded viewpoint B color image from the deblocking filter 151, and the processing proceeds to step S22.

In step S22, the low-resolution conversion processing unit 171 of the low-resolution reference image generating unit 152 (FIG. 8) subjects the picture of the decoded viewpoint A color image to be read out from the DPB 55 as a candidate picture to resolution reduction processing based on the resolution detected from a predetermined picture of a color image of the viewpoint B. Thus, the low-resolution conversion processing unit 171 sets the resolution of the read picture of the decoded viewpoint A color image to the same as the resolution of the current picture, and supplies to the inter prediction unit 154.

Also, the low-resolution conversion processing unit 171 supplies, of the decoded image of the current picture to be read out from the DPB 55, a portion already subjected to local decoding to the intra-screen prediction unit 153 without change. Further, the low-resolution conversion processing unit 171 supplies the picture of the decoded viewpoint B color image to be read out from the DPB 55 as a candidate picture to the inter prediction unit 154 without change. Further, the low-resolution conversion processing unit 171 supplies information such as the number of taps of the filter processing performed as resolution reduction processing to the low-resolution conversion information generating unit 172. The processing then proceeds from step S22 to step S23.

In step S23, the low-resolution conversion information generating unit 172 of the low-resolution reference image generating unit 152 generates viewpoint A low-resolution conversion information based on the information such as the number of taps of the filter processing to be supplied from the low-resolution conversion processing unit 171, and supplies to the transmission unit 57 in FIG. 5. The processing then proceeds from step S23 to step S24.

In step S24, the intra-screen prediction unit 153 performs intra prediction processing (intra-screen prediction processing) on the next current block which is a macroblock serving as an object to be encoded next.

Specifically, the intra-screen prediction unit 153 performs, regarding the next current block, intra prediction (intra-screen prediction) to generate a prediction image (prediction image by intra prediction) from the picture of the decoded viewpoint B color image read out from the DPB 55 via the low-resolution conversion processing unit 171.

The intra-screen prediction unit 153 then obtains encoding cost, supplies to the prediction image selecting unit 155 along with the prediction image by intra prediction, and the processing proceeds from step S24 to step S25.

In step S25, the inter prediction unit 154 subjects, regarding the next current block, the picture of the decoded viewpoint A color image to shift compensation processing as a candidate picture.

That is to say, the inter prediction unit 154 performs, regarding the next current block, disparity compensation to compensate shift for disparity worth using the picture of the decoded viewpoint A color image after resolution reduction processing read out from the DPB 55 via the low-resolution conversion processing unit 171, thereby obtaining a prediction image, encoding cost, and so forth for each inter prediction mode. Also, the inter prediction unit 154 performs, regarding the next current block, motion compensation to compensate shift for motion worth using the picture of the decoded viewpoint B color image read out from the DPB 55 via the low-resolution conversion processing unit 171, thereby obtaining a prediction image, encoding cost, and so forth for each inter prediction mode.

Further, the inter prediction unit 154 takes an inter prediction mode of which the encoding cost is the least as the optimal inter prediction mode, and supplies a prediction image of the optimal inter prediction mode thereof to the prediction image selecting unit 155 along with the encoding cost, and the processing proceeds from step S25 to step S26.

In step S26, the prediction image selecting unit 155 selects, of the prediction image (prediction image of intra-prediction) from the intra-screen prediction unit 153, and the prediction image (prediction image of inter prediction) from the inter prediction unit 154, a prediction image having lower encoding cost for example, supplies to the computing units 143 and 150, and the processing proceeds to step S27.

Here, the prediction image that the prediction image selecting unit 155 selects in step S26 will be used for the processing in step S13 or S18 to be performed at the time of encoding of the next current block.

Also, the intra-screen prediction unit 153 supplies information regarding intra-prediction to be obtained in the intra-prediction processing in step S24 to the variable length encoding unit 146 as header information, and the inter prediction unit 154 supplies information regarding disparity prediction or motion prediction (inter prediction) to be obtained in the shift compensation processing in step S25 to the variable length encoding unit 146 as header information.

In step S27, the variable length encoding unit 146 subjects the quantization values from the quantization unit 146 to variable length encoding to obtain encoded data.

Further, the variable length encoding unit 146 selects of the header information from each of the intra-screen prediction unit 153 and inter prediction unit 154, header information from one thereof where a prediction image with smaller encoding cost has been generated, and includes this in the header of the encoded data.

The variable length encoding unit 146 then supplies the encoded data to the storage buffer 147, and the processing proceeds from step S27 to step S28.

In step S28, the storage buffer 147 temporarily stores the encoded data from the variable length encoding unit 146, and outputs at a predetermined data rate.

The encoded data output from the storage buffer 147 is supplied to the multiplexing unit 56 (FIG. 5).

At the encoder 52, the processing in the above steps S11 to S28 is repeatedly performed as appropriate.

As described above, the image processing system 10 performs encoding by lowering the resolution of the viewpoint image B as compared to the resolution of the viewpoint image A, and accordingly, the data amount of an object to be encoded (base band) can be reduced as compared to a case where the viewpoint image A and viewpoint image B having the same resolution are encoded. As a result thereof, the data amount of encoded data can be reduced. Also, the image processing system 10 references the viewpoint image A after resolution reduction processing having the same resolution as with the viewpoint image B at the time of encoding of the viewpoint image B after resolution reduction processing, and accordingly, encoding can be performed using a method employing the MVC format or the like.

On the other hand, in the event of enabling encoding using a method employing the MVC format or the like to be performed by subjecting the viewpoint image B after resolution reduction processing to resolution increase processing so as to have the same resolution between the object to be encoded and the viewpoint image A to be referenced, the data amount of encoded data is not reduced. Accordingly, in order to reduce the data amount of encoded data, the encoding side has to thin out the encoded data, and the decoding side has to restore encoded data before thinning out using compensation employing adjacent pixels, or the like.

In this case, there is a possibility that error occurs at the time of restoration of encoded data, and precision of a decoded image deteriorates. Deterioration in the precision of a disparity information image after decoding has an adverse affect on a color image of a viewpoint other than the viewpoint A and viewpoint B to be generated at the subsequent stage, or the like, of the image processing system 10.

Configuration Example of Multi-Viewpoint Image Decoding Device

Figure 10:
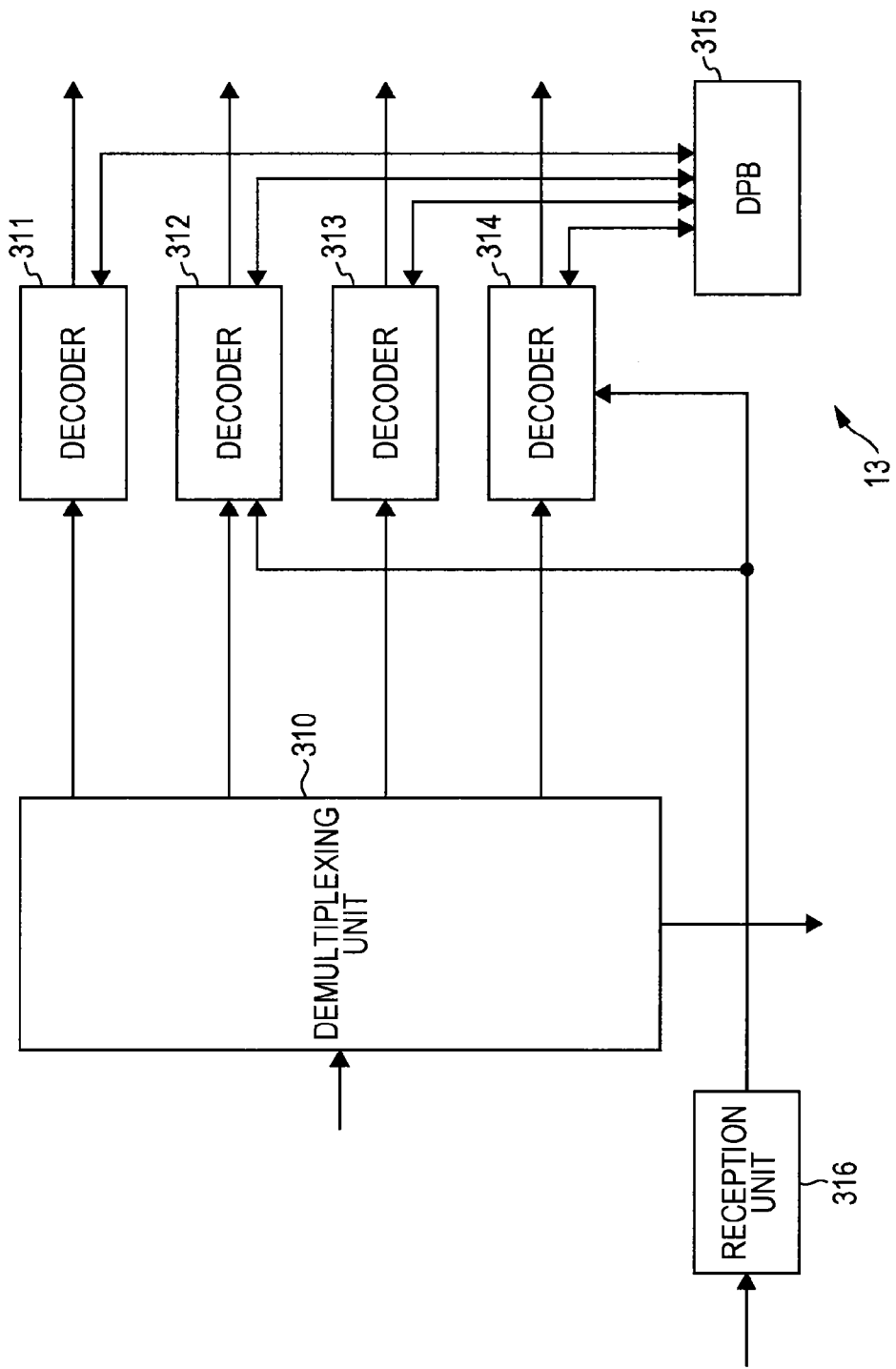
FIG. 10 is a block diagram illustrating a configuration example of a multi-viewpoint image decoding device in FIG. 1.

FIG. 10 is a block diagram illustrating a configuration example of the multi-viewpoint image decoding device 13 in FIG. 1.

The multi-viewpoint image decoding device 13 in FIG. 10 is, for example, a decoding device configured to decode data obtained by encoding images of multiple viewpoints using the MVC format, and hereinafter, with regard to the same processing as with the MVC format, description will be omitted as appropriate.

In FIG. 10, the multi-viewpoint image decoding device 13 includes a demultiplexing unit 310, decoders 311 to 314, a DPB 315, and a reception unit 316.

The demultiplexing unit 310 serves as a reception unit, and receives a bitstream transferred from the multi-viewpoint image encoding device 12 in FIG. 1. The demultiplexing unit 310 separates encoded data of a color image of the viewpoint A, encoded data of a color image of the viewpoint B, encoded data of a disparity information image of the viewpoint A, encoded data of a disparity information image of the viewpoint B, and viewpoint B low-resolution conversion information from the received bitstream.

The demultiplexing unit 310 then supplies the encoded data of the color image of the viewpoint A to the decoder 311, encoded data of the color image of the viewpoint B to the decoder 312, encoded data of the disparity information image of the viewpoint A to the decoder 313, encoded data of the disparity information image of the viewpoint B to the decoder 314, respectively. Also, the demultiplexing unit 310 supplies the viewpoint B low-resolution conversion information to the image inverse conversion processing device 14 in FIG. 1.

The decoder 311 decodes the encoded data of the color image of the viewpoint A from the demultiplexing unit 310, and supplies the color image of the viewpoint A obtained as a result thereof to the DPB 315, and also outputs.

The decoder 312 decodes the encoded data of the color image of the viewpoint B from the demultiplexing unit 310 using the viewpoint A low-resolution conversion information supplied from the reception unit 316, and supplies the color image of the viewpoint B obtained as a result thereof to the DPB 315 and image inverse conversion processing device 14.

The decoder 313 decodes the encoded data of the disparity information image of the viewpoint A from the demultiplexing unit 310, and supplies the disparity information image of the viewpoint A obtained as a result thereof to the DPB 315, and also outputs.

The decoder 314 decodes the encoded data of the disparity information image of the viewpoint B from the demultiplexing unit 310 using the viewpoint A low-resolution conversion information supplied from the reception unit 316, and supplies the disparity information image of the viewpoint B obtained as a result thereof to the DPB 315 and image inverse conversion processing device 14.

The DPB 315 temporarily stores images after decoding (decoded images) supplied from the decoders 311 to 314 as candidates of a reference picture to be referenced at the time of generating a prediction image.

That is to say, the decoders 311 to 314 decode images prediction-encoded at the encoders 51 to 54 in FIG. 5, respectively.

In order to decode an prediction-encoded image, a prediction image used for the prediction encoding thereof is necessary, and accordingly, in order to generate a prediction image used for prediction encoding, the decoders 311 to 314 decodes an image to be decoded, and temporarily stores the image after decoding which will be used for generating a prediction image in the DPB 315.

The DPB 315 is a buffer for common use to temporarily store the image after decoding (decoded image) obtained at each of the decoders 311 to 314, and each of the decoders 311 to 314 selects a reference picture to be referenced for decoding an image to be decoded, out of decoded images stored in the DPB 315, and uses the reference picture thereof to generate a prediction image.

The DPB 315 is shared by the decoders 311 to 314, and accordingly, each of the decoders 311 to 314 can also reference a decoded image obtained at another decoder in addition to a decoded image obtained by itself.

The reception unit 316 receives the viewpoint A low-resolution conversion information transferred from the multi-viewpoint image encoding device 12 in FIG. 1, and supplies to the decoder 312 and decoder 314.

Configuration Example of Decoder 311

Figure 11:
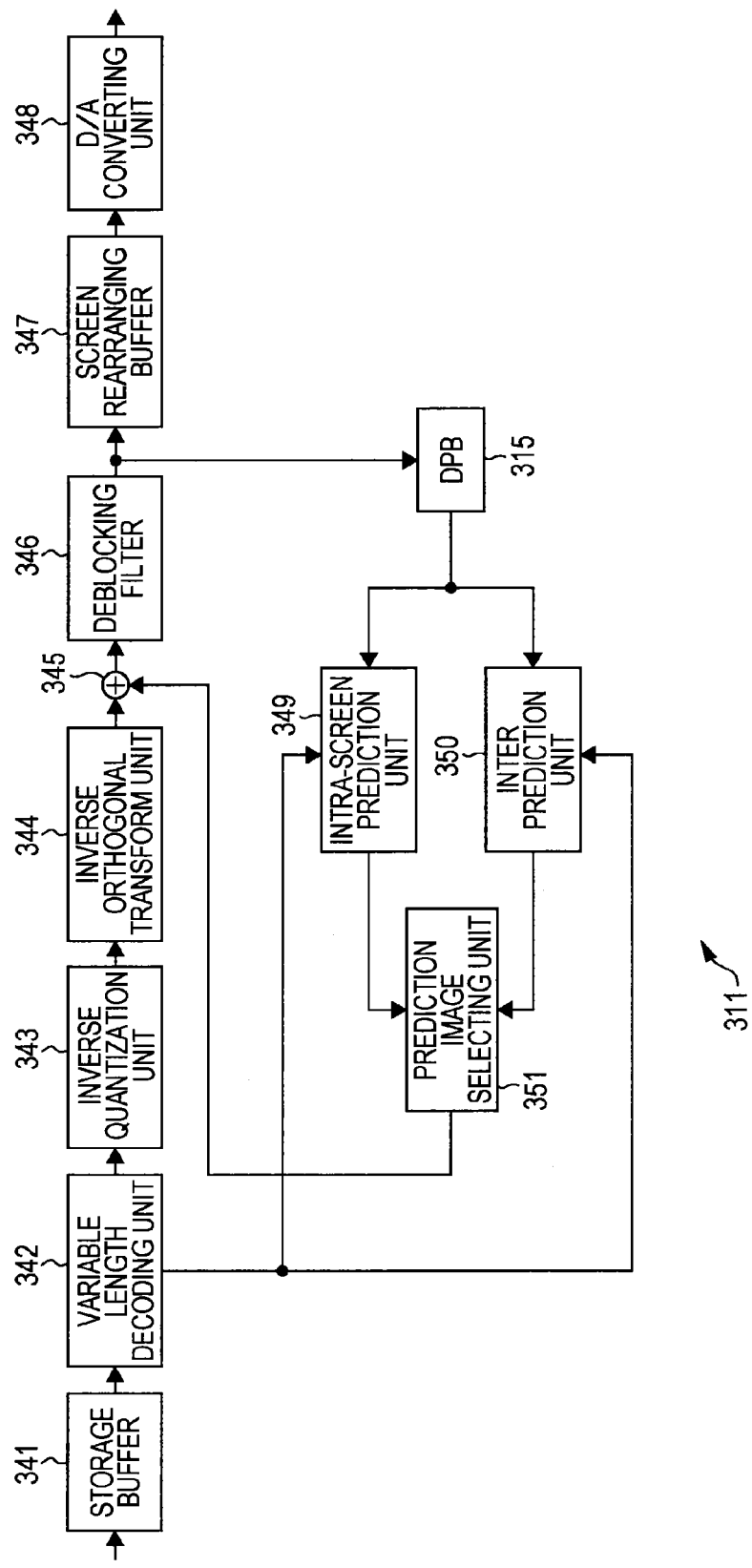
FIG. 11 is a block diagram illustrating a configuration example of a decoder in FIG. 10.

FIG. 11 is a block diagram illustrating a configuration example of the decoder 311 in FIG. 10.

Note that the decoder 313 in FIG. 10 is also configured in the same way as the decoder 311, and performs decoding of images in accordance with the MVC format, for example.

In FIG. 11, the decoder 311 has a storage buffer 341, a variable length decoding unit 342, an inverse quantization unit 343, an inverse orthogonal transform unit 344, a computing unit 345, a deblocking filter 346, a screen rearranging buffer 347, a D/A converting unit 348, an intra-screen prediction unit 349, an inter prediction unit 350, and a prediction image selecting unit 351.

Supplied to the storage buffer 341 is encoded data of a color image of the viewpoint A from the demultiplexing unit 310 (FIG. 10).

The storage buffer 341 temporarily stores the encoded data supplied thereto, and supplies to the variable length decoding unit 342.

The variable length decoding unit 342 performs variable length decoding of the encoded data from the storage buffer 341, thereby restoring quantization values and header information. The variable length decoding unit 342 then supplies the quantization values to the inverse quantization unit 343, and supplies the header information to the intra-screen prediction unit 349 and inter prediction unit 350.

The inverse quantization unit 343 performs inverse quantization of the quantization values from the variable length decoding unit 342 into transform coefficients, and supplies to the inverse orthogonal transform unit 344.

The inverse orthogonal transform unit 344 performs inverse orthogonal transform of the transform coefficients from the inverse quantization unit 343 in increments of macroblocks, and supplies to the computing unit 345.

The computing unit 345 takes a macroblock supplied from the inverse orthogonal transform unit 344 as a current block to be decoded, and adds the prediction image supplied from the prediction image selecting unit 351 to the current block as necessary, thereby performing decoding. The computing unit 345 supplies decoded image obtained as a result thereof to the deblocking filter 346.

The deblocking filter 346 performs filtering on the decoded image from the computing unit 345 in the same way as with the deblocking filter 121 in FIG. 6 for example, and supplies a decoded image after this filtering to the screen rearranging buffer 347.

The screen rearranging buffer 347 temporarily stores and reads out pictures of decoded images from the deblocking filter 346, thereby rearranging the order of pictures in the original order (display order) and supplies to the D/A (Digital/Analog) converting unit 348.

In the event that a picture from the screen rearranging buffer 347 needs to be output as analog signals, the D/A converting unit 348 D/A converts the picture thereof and outputs.

Also, the deblocking filter 346 supplies, of the decoded images after filtering, the decoded images of I picture, P pictures, and Bs pictures, which are referable pictures, to the DPB 315.

Now, the DPB 315 stores pictures of decoded images from the deblocking filter 346, that is, pictures of viewpoint A color images, as candidates of a reference picture (candidate pictures) to be referenced at the time of generating prediction images, to be used in decoding performed later in time.

As described with FIG. 10, the DPB 315 is shared between the decoders 311 to 314, and accordingly stores, besides pictures of viewpoint A color images (decoded viewpoint A color images) decoded at the decoder 311, pictures of viewpoint B color images (decoded viewpoint B color images) decoded at the decoder 312, pictures of viewpoint A disparity information images (decoded viewpoint A disparity information images) decoded at the decoder 313, and pictures of viewpoint B disparity information images (decoded viewpoint B disparity information images) decoded at the decoder 314.

The intra-screen prediction unit 349 recognizes whether or not the current block has been encoded using a prediction image generated by intra prediction (intra-screen prediction), based on the header information from the variable length decoding unit 342.

In the event that the current block has been encoded using a prediction image generated by intra prediction, in the same way as with the intra-screen prediction unit 122 in FIG. 6 the intra-screen prediction unit 349 reads out the already-decoded portion (decoded image) of the picture including the current block (current picture) from the DPB 315. The intra-screen prediction unit 349 then supplies the portion of the decoded image of the current picture that has been read out from the DPB 315 to the prediction image selecting unit 351, as a prediction image of the current block.

The inter prediction unit 350 recognizes whether or not the current block has been encoded using the prediction image generated by inter prediction, based on the header information from the variable length decoding unit 342.

In the event that the current block has been encoded using a prediction image generated by inter prediction, the inter prediction unit 350 recognizes, based on the header information from the variable length decoding unit 342, the optimal inter prediction mode of the current block, and reads out a candidate picture corresponding to the optimal inter prediction mode from the candidate pictures stored in the DPB 315 as a reference picture.

Further, the inter prediction unit 350 recognizes, based on the header information from the variable length decoding unit 342, the shift vector that represents motion used to generate the prediction image of the current block, and in the same way as with the inter prediction unit 123 in FIG. 6 performs motion compensation of the reference picture in accordance with the shift vector thereof, thereby generating a prediction image.

That is to say, the inter prediction unit 350 acquires a block (corresponding block) at a position moved (shifted) from the position of the current block in the candidate picture, in accordance with the shift vector of the current block, as a prediction image.

The inter prediction unit 350 then supplies the prediction image to the prediction image selecting unit 351.

In the event that the prediction image is supplied from the intra-screen prediction unit 349, the prediction image selecting unit 351 selects the prediction image thereof, and in the event that the prediction image is supplied from the inter prediction unit 350, selects the prediction image thereof respectively, and supplies to the computing unit 345.

Configuration Example of Decoder 312

Figure 12:
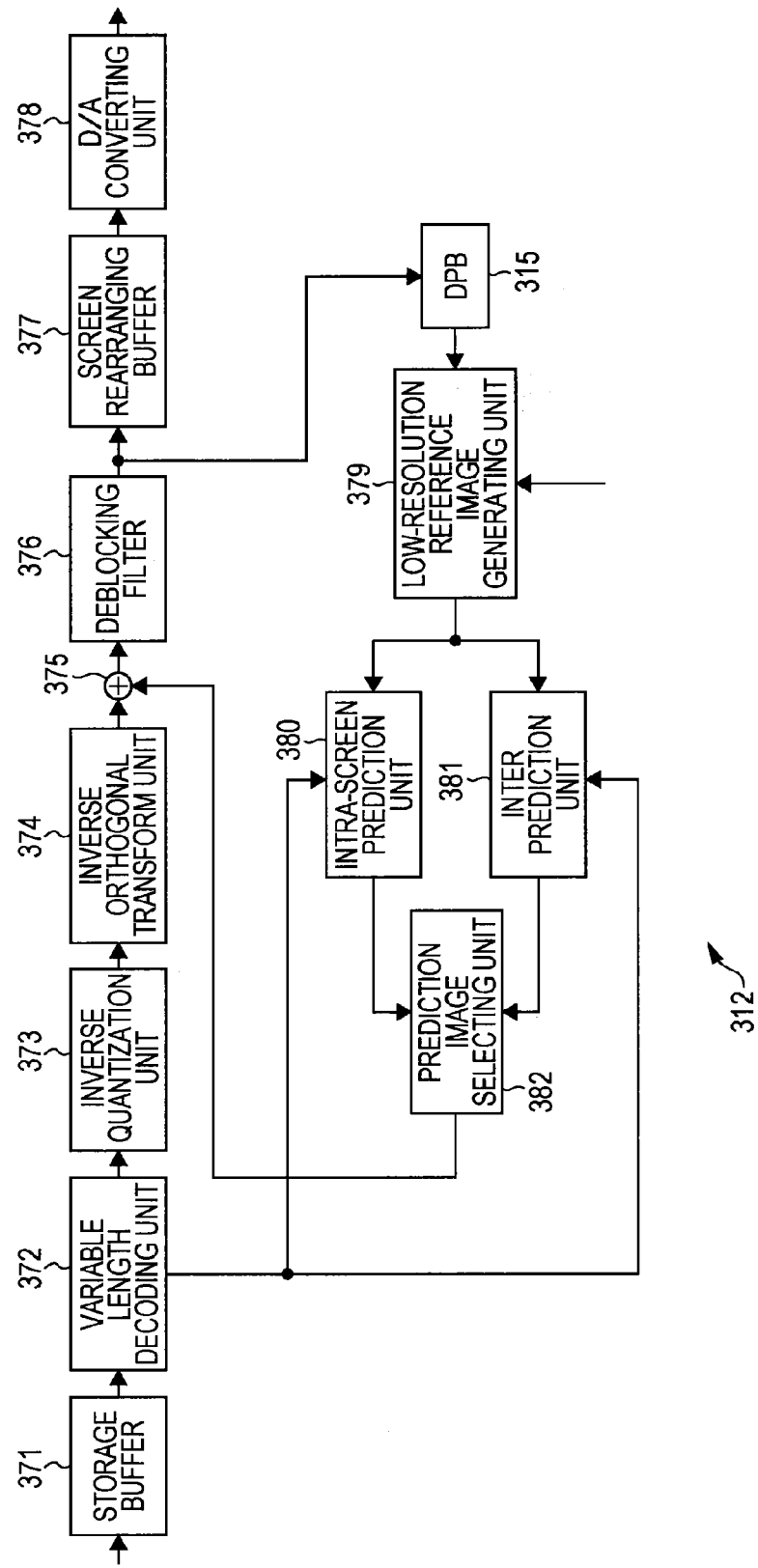
FIG. 12 is a block diagram illustrating a configuration example of the decoder in FIG. 10.

FIG. 12 is a block diagram illustrating a configuration example of the decoder 312 in FIG. 10.

Note that the decoder 314 in FIG. 10 is also configured in the same way as the decoder 312, and performs decoding of images in accordance with the MVC format, for example.

In FIG. 12, the decoder 314 has a storage buffer 371, a variable length decoding unit 372, an inverse quantization unit 373, an inverse orthogonal transform unit 374, a computing unit 375, a deblocking filter 376, a screen rearranging buffer 377, a D/A converting unit 378, a low-resolution reference image generating unit 379, an intra-screen prediction unit 380, an inter prediction unit 381, and a prediction image selecting unit 382.

The storage buffer 371, variable length decoding unit 372, inverse quantization unit 373, inverse orthogonal transform unit 374, computing unit 375, deblocking filter 376, screen rearranging buffer 377, D/A converting unit 378, intra-screen prediction unit 380, and prediction image selecting unit 382 of the decoder 314 are the same as the storage buffer 341, variable length decoding unit 342, inverse quantization unit 343, inverse orthogonal transform unit 344, computing unit 345, deblocking filter 346, screen rearranging buffer 347, D/A converting unit 348, intra-screen prediction unit 349, and prediction image selecting unit 351 of the decoder 314 respectively, description will be omitted.

In the event that the current block has been encoded using a prediction image generated by intra-prediction, in the same way as with the intra-screen prediction unit 153 in FIG. 7, of the picture (current picture) including the current block, a portion already decoded (decoded image) is read out from the DPB 315 by the intra-screen prediction unit 380 as a prediction image of the current block, and is supplied to the low-resolution reference image generating unit 379.

In the event that the current block has been encoded using a prediction image generated by inter prediction, out of candidate pictures stored in the DPB 315, a candidate picture corresponding to the optimal inter prediction mode included in the header information is read out by the inter prediction unit 381 as a reference picture, and is supplied to the low-resolution reference image generating unit 379.

The low-resolution reference image generating unit 379 supplies a portion of the decoded image of the current picture read out as a prediction image of the current block from the DPB 315 to the intra-screen prediction unit 380 without change. That is to say, the resolution of a portion of the decoded image of the current picture read out as a prediction image of the current block is the same as the resolution of the current picture. Accordingly, a portion of the decoded image of the current picture read out from the DPB 315 as a prediction image of the current block is supplied to the intra-screen prediction unit 380 without change.

Also, the low-resolution reference image generating unit 379 serves as a first viewpoint resolution reduction processing unit, and subjects the picture of the decoded viewpoint A color image read out from the DPB 315 as a reference picture to predetermined filter processing as resolution reduction processing based on the viewpoint A low-resolution conversion information supplied from the reception unit 316. Thus, the low-resolution reference image generating unit 379 sets the resolution of the candidate picture to the same as the resolution of the picture of a color image of the viewpoint image B which is the current picture. The low-resolution reference image generating unit 379 then supplies the reference picture after resolution reduction processing to the inter prediction unit 381.

Further, the low-resolution reference image generating unit 379 supplies a picture different from the current picture of the decoded viewpoint B color image read out from the DPB 315 as a reference picture to the inter prediction unit 381 without change. That is to say, the resolution of the picture different from the current picture of the decoded viewpoint B color image is the same as the resolution of the current picture. Accordingly, the picture different from the current picture of the decoded viewpoint B color image read out as a reference picture is supplied to the inter prediction unit 381 without change.

The inter prediction unit 381 recognizes, in the same way as the inter prediction unit 350 in FIG. 11, whether or not the current block has been encoded using the prediction image generated by inter prediction, based on the header information from the variable length decoding unit 372.

In the event that the current block has been encoded using a prediction image generated by inter prediction, the inter prediction unit 381 recognizes, in the same way as the inter prediction unit 350, the optimal inter prediction mode of the current block, based on the header information from the variable length decoding unit 372. The inter prediction unit 381 then reads out, from the candidate pictures stored in the DPB 315, a candidate picture corresponding to the optimal inter prediction mode via the low-resolution reference image generating unit 379 as the reference picture.

Further, the inter prediction unit 381 recognizes the shift vector that represents motion or disparity used to generate the prediction image of the current block, based on the header information from the variable length decoding unit 372, and in the same way as with the inter prediction unit 154 in FIG. 7 performs shift compensation of the reference picture following the shift vector thereof, thereby generating a prediction image. The inter prediction unit 381 then supplies the prediction image to the prediction image selecting unit 382.

Configuration Example of Low-Resolution Reference Image Generating Unit

Figure 13:
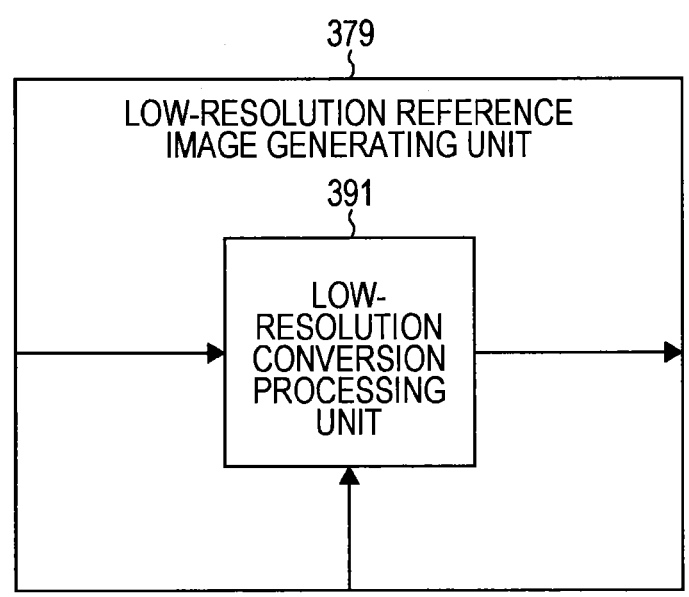
FIG. 13 is a block diagram illustrating a configuration example of a low-resolution reference image generating unit in FIG. 12.

FIG. 13 is a block diagram illustrating a configuration example of the low-resolution reference image generating unit 379 in FIG. 12.

In FIG. 13, the low-resolution reference image generating unit 379 includes a low-resolution conversion processing unit 391.

The low-resolution conversion processing unit 391 of the low-resolution reference image generating unit 379 subjects the picture of the decoded viewpoint A color image read out from the DPB 315 as a reference picture to predetermined filter processing as resolution reduction processing based on the viewpoint A low-resolution conversion information supplied from the reception unit 316 in FIG. 10. Thus, the low-resolution reference image generating unit 379 sets the resolution of the reference picture to the same as the resolution of the current picture, and supplies to the inter prediction unit 381 (FIG. 12).

Also, the low-resolution conversion processing unit 391 supplies the picture different from the current picture of the decoded viewpoint B color image read out from the DPB 315 as a reference picture to the inter prediction unit 381 without change. Further, the low-resolution conversion processing unit 391 supplies a portion of the decoded image of the current picture read out from the DPB 315 as a prediction image of the current block to the intra-screen prediction unit 380 (FIG. 12) without change.

Description of Processing of Decoder 312

Figure 14:
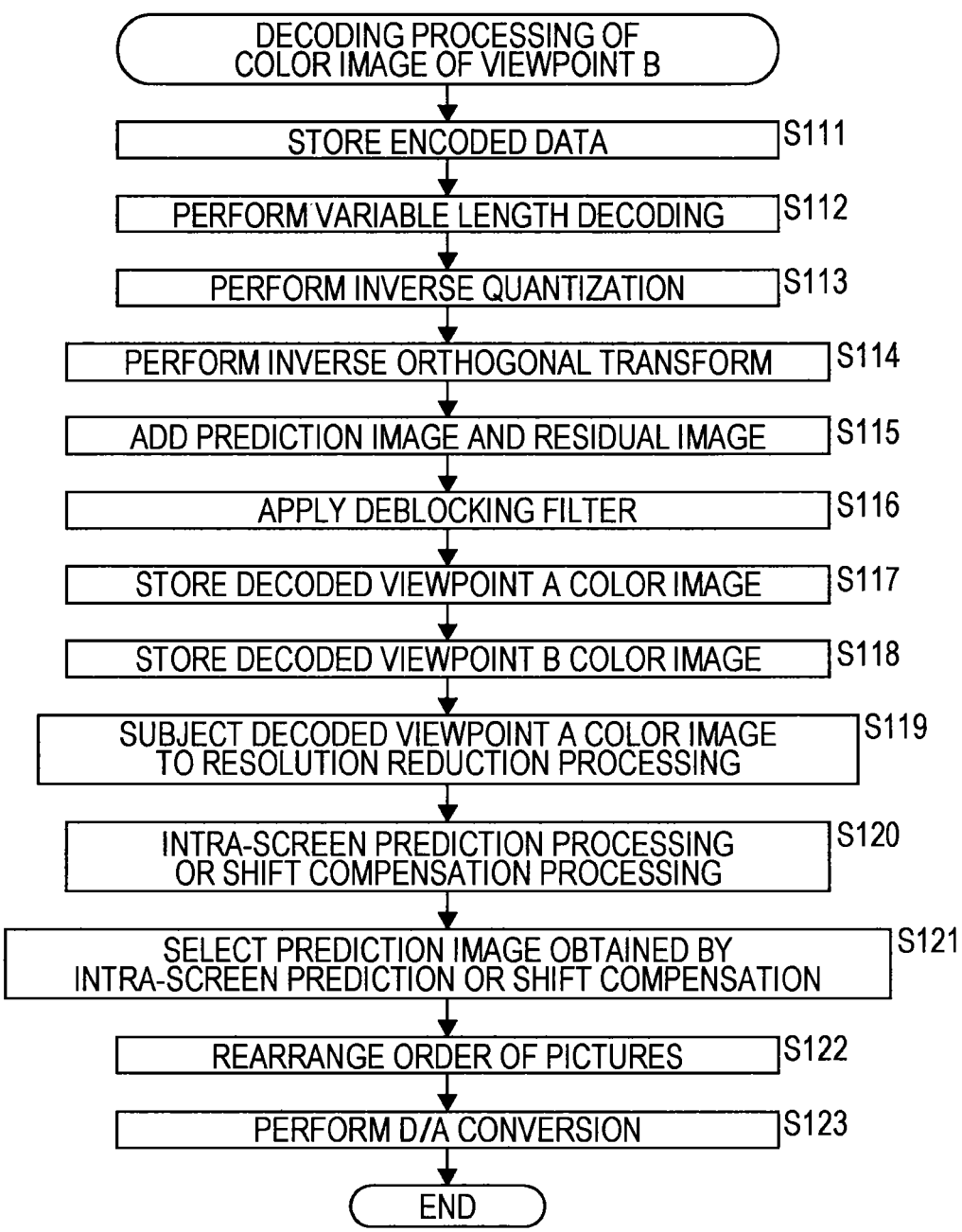
FIG. 14 is a flowchart for describing decoding processing to be performed by a decoder in FIG. 12.

FIG. 14 is a flowchart for describing decoding processing for decoding encoded data of a color image of the viewpoint B that the decoder 312 in FIG. 12 performs in step S9 in FIG. 3.

In step S111, the storage buffer 371 stores encoded data of a color image of the viewpoint B supplied from the multi-viewpoint image encoding device 12 in FIG. 1, and the processing proceeds to step S112.

In step S112, the variable length decoding unit 372 reads out encoded data stored in the storage buffer 371 and subjects this to variable length decoding, thereby restoring quantization values and header information. The variable length decoding unit 372 then supplies the quantization values to the inverse quantization unit 373, supplies the header information to the intra-screen prediction unit 380 and inter prediction unit 381, and the processing proceeds to step S113.

In step S113, the inverse quantization unit 373 performs inverse quantization of the quantization values from the variable length decoding unit 372 into transform coefficients, and supplies to the inverse orthogonal transform unit 374, and the processing proceeds to step S114.

In step S114, the inverse orthogonal transform unit 374 performs inverse orthogonal transform of the transform coefficients from the inverse quantization unit 373, supplies the computing unit 375 in increments of macroblocks, and the processing proceeds to step S115.

In step S115, the computing unit 375 takes the macroblocks from the inverse orthogonal transform unit 374 as a current block (residual image) to be decoded, and adds the prediction image supplied from the prediction image selecting unit 382 to the current block thereof as appropriate, thereby obtaining a decoded image. The computing unit 375 then supplies the decoded image to the deblocking filter 376, and the processing proceeds from step S115 to step S116.

In step S116, the deblocking filter 376 subjects the decoded image from the computing unit 375 to filtering, supplies the decoded image after filtering thereof (decoded viewpoint B color image) to the DPB 315 and screen rearranging buffer 377, and the processing proceeds to step S117.

In step S117, the DPB 315 waits for a decoded viewpoint A color image being supplied from the decoder 311 configured to decode a color image of the viewpoint A, stores the decoded viewpoint A color image thereof, and the processing proceeds to step S118.

In step S118, the DPB 315 stores the decoded viewpoint B color image from the deblocking filter 376, and the processing proceeds to step S119.

In step S119, the low-resolution conversion processing unit 391 of the low-resolution reference image generating unit 379 subjects the picture of the decoded viewpoint A color image read out from the DPB 315 as a reference picture to resolution reduction processing based on the viewpoint A low-resolution conversion information supplied from the reception unit 316. Thus, the low-resolution conversion processing unit 391 sets the resolution of the reference picture to the same as the resolution of the current picture, and supplies to the inter prediction unit 381.

Also, the low-resolution conversion processing unit 391 supplies a picture different from the current picture of the decoded viewpoint B color image read out from the DPB 315 as a reference picture to the inter prediction unit 381 without change. Further, the low-resolution conversion processing unit 391 supplies a portion of the decoded image of the current picture read out from the DPB 315 as a prediction image of the current block to the intra-screen prediction unit 380 without change.

In step S120, the intra-screen prediction unit 380 and inter prediction unit 381 recognizes, based on the header information supplied from the variable length decoding unit 372, whether or not the next current block (macroblock to be decoded next) has been encoded using a prediction image generated by which prediction method of intra prediction (intra-screen prediction) and disparity prediction (inter prediction).

In the event that the next current block has been encoded with the prediction image generated by intra-screen prediction, the intra-screen prediction unit 380 then performs intra prediction processing (intra-screen prediction processing).

Specifically, the intra-screen prediction unit 380 generates, regarding the next current block, a prediction image (prediction image by intra prediction) by reading out a part of the decoded image of the current picture stored in the DPB 315 as a prediction image of the current block via the low-resolution reference image generating unit 379. The intra-screen prediction unit 380 then supplies the prediction image obtained as a result thereof to the prediction image selecting unit 382, and the processing proceeds from step S120 to step S121.

Also, in the event that the next current block has been encoded with the prediction image generated by motion prediction or disparity prediction (inter prediction), the inter prediction unit 381 performs disparity prediction processing (inter prediction processing).

Specifically, the inter prediction unit 381 reads out, regarding the next current block, a candidate picture corresponding to the optimal inter prediction mode from the DPB 315 via the low-resolution conversion processing unit 391 as a reference picture based on the optimal inter prediction mode included in the header information from the variable length decoding unit 372.

Also, the inter prediction unit 381 generates a prediction image by performing shift compensation of the reference picture in accordance with a shift vector included in the header information from the variable length decoding unit 372. The inter prediction unit 381 supplies the prediction image thereof to the prediction image selecting unit 382, and the processing proceeds from step S120 to step S121.

In step S121, the prediction image selecting unit 382 selects, of one from which a prediction image has been supplied of the intra-screen prediction unit 380 and inter prediction unit 381, the prediction image thereof, and supplies to the computing unit 375, and the processing proceeds to step S122.

Now, the prediction image that the prediction image selecting unit 382 selects in step S121 is used for the processing in step S115 to be performed at the time of decoding of the next current block.

In step S122, the screen rearranging buffer 377 rearranges the order of pictures to the original order by temporarily storing and reading out the picture of the decoded viewpoint B color image from the deblocking filter 376, and supplies to the D/A converting unit 378, and the processing proceeds to step S123.

In step S123, in the event that the picture from the screen rearranging buffer 377 has to be output with analog signals, the D/A converting unit 378 subjects the picture thereof to D/A conversion, and outputs to the image inverse conversion processing device 14.

At the decoder 312, the processing in the above steps S111 to S123 is repeatedly performed as appropriate.

Configuration Example of Image Inverse Conversion Processing Device

Figure 15:
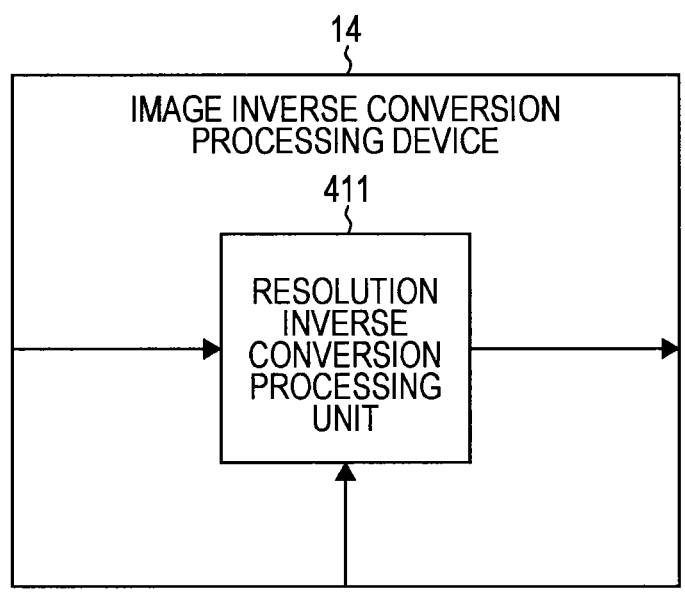
FIG. 15 is a block diagram illustrating a configuration example of an image inverse conversion processing device in FIG. 1.

FIG. 15 is a block diagram illustrating a configuration example of the image inverse conversion processing device 14 in FIG. 1.

In FIG. 15, the image inverse conversion processing device 14 includes a resolution inverse conversion processing unit 411.

The resolution inverse conversion processing unit 411 of the image inverse conversion processing device 14 subjects the viewpoint image B (decoded viewpoint B color image and decoded viewpoint B disparity information image) supplied from the decoder 312 and decoder 314 in FIG. 10 to resolution increase processing based on the viewpoint B low-resolution conversion information supplied from the demultiplexing unit 310 in FIG. 10. Thus, the resolution inverse conversion processing unit 411 sets the resolution of the viewpoint image B to the same resolution as the resolution at the time of being input as an object to be encoded in the image processing system 10, that is, the resolution of the viewpoint image A. The resolution inverse conversion processing unit 411 outputs the viewpoint image B after resolution increase processing.

As described above, the image processing system 10 decodes encoded data of the viewpoint image B which has been encoded with lower resolution than the resolution of the viewpoint image A with reference to the viewpoint image A after resolution reduction processing having the same resolution as with the viewpoint image B. Accordingly, the image processing system 10 can decode encoded data of the viewpoint image B which has been encoded with lower resolution than the resolution of the viewpoint image A using a method employing the MVC format or the like.

Second Embodiment

Configuration Example of Second Embodiment of Image Processing System

Figure 16:
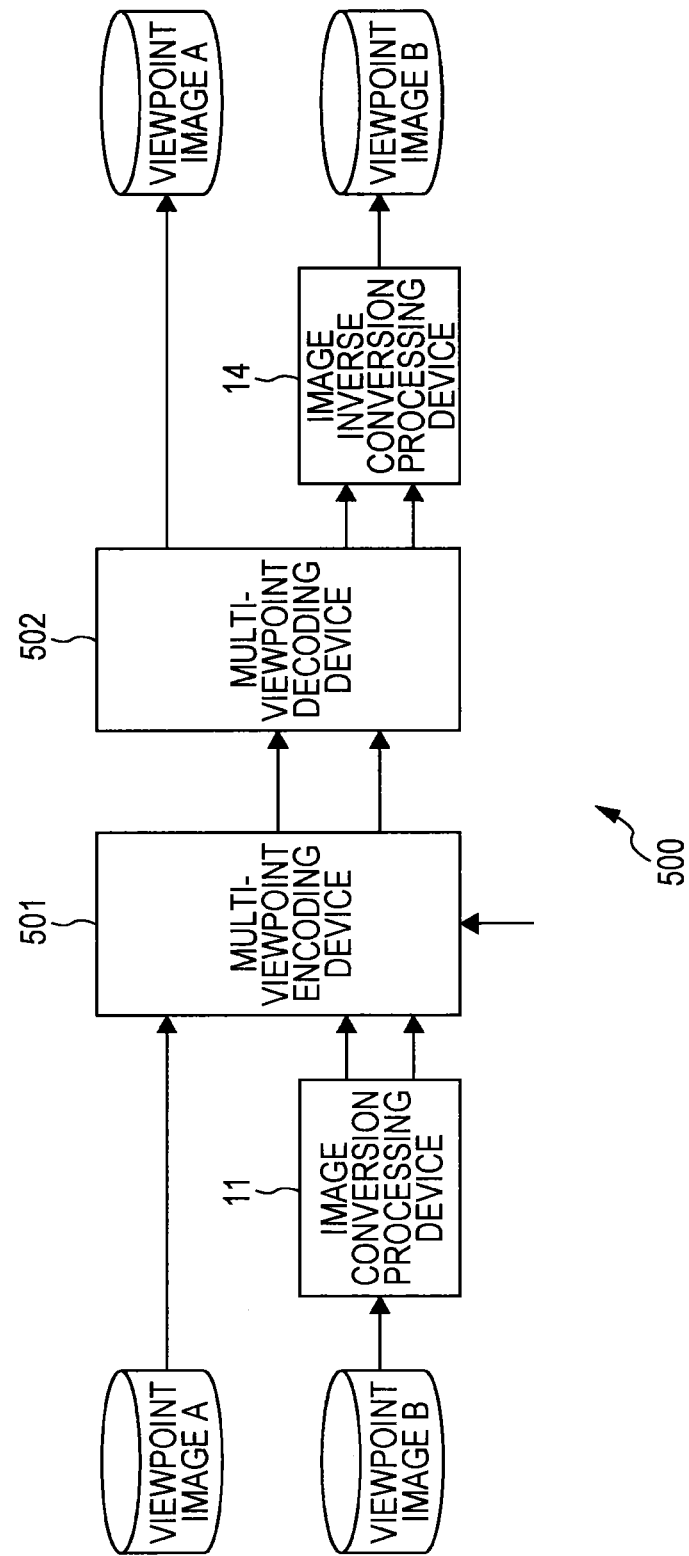
FIG. 16 is a block diagram illustrating a configuration example of a second embodiment of the image processing system to which the present technology has been applied.

FIG. 16 is a block diagram illustrating a configuration example of a second embodiment of the image processing system to which the present technology has been applied.

Of the configuration illustrated in FIG. 16, the same configuration as the configuration in FIG. 1 is denoted with the same reference numeral. Redundant description will be omitted as appropriate.

The configuration of an image processing system 500 in FIG. 16 differs from the configuration in FIG. 1 principally in that a multi-viewpoint image encoding device 501 is provided instead of the multi-viewpoint image encoding device 12, and in that a multi-viewpoint image decoding device 502 is provided instead of the multi-viewpoint image decoding device 13.

The image processing system 500 encodes and decodes the viewpoint image B after resolution reduction processing with reference to an image wherein the resolution of the viewpoint image A is decreased, and the viewpoint is changed to the viewpoint B.

Specifically, the multi-viewpoint image encoding device 501 of the image processing system 500 obtains, in the same way as with the multi-viewpoint image encoding device 12 in FIG. 1, the viewpoint image A to be externally input as an object to be encoded. Also, the multi-viewpoint image encoding device 501 obtains disparity related information (depth related information) to be externally input. Here, the disparity related information (depth related information) is metadata of disparity information (depth information), and details thereof will be described later.

Also, the multi-viewpoint image encoding device 501 encodes the viewpoint image A and the viewpoint image B after resolution reduction processing to be supplied from the image conversion processing device 11. At this time, the multi-viewpoint image encoding device 501 sets the resolution of the viewpoint image A to the same resolution as the resolution of the viewpoint image B after resolution reduction processing by subjecting the viewpoint image A to resolution reduction processing, and changes the viewpoint to the viewpoint B using the disparity related information. At the time of encoding the viewpoint image B, the multi-viewpoint image encoding device 501 then references the viewpoint image A which has been subjected to resolution reduction processing and the viewpoint has been changed to the viewpoint B.

The multi-viewpoint image encoding device 501 multiplexes encoded data of the viewpoint image A and viewpoint image B after resolution reduction processing obtained as encoding results, the viewpoint B low-resolution conversion information from the image conversion processing device 11, and the disparity related information to generate a bitstream. The multi-viewpoint image encoding device 501 then supplies, in the same way as with the multi-viewpoint image encoding device 12, the generated bitstream to the multi-viewpoint image decoding device 502. Also, the multi-viewpoint image encoding device 501 generates, in the same way as with the multi-viewpoint image encoding device 12, viewpoint A low-resolution conversion information, and supplies to the multi-viewpoint image decoding device 502.

The multi-viewpoint image decoding device 502 receives, in the same way as with the multi-viewpoint image decoding device 13 in FIG. 1, the bitstream transferred from the multi-viewpoint image encoding device 501. The multi-viewpoint image decoding device 502 extracts, in the same way as with the multi-viewpoint image decoding device 13, viewpoint B low-resolution conversion information from the received bitstream, and supplies to the image inverse conversion processing device 14. Also, the multi-viewpoint image decoding device 502 extracts the disparity related information from the bitstream. Further, the multi-viewpoint image decoding device 502 decodes the encoded viewpoint image A and viewpoint image B after resolution reduction processing of the bitstream.

At this time, the multi-viewpoint image decoding device 502 subjects the decoded viewpoint image A to resolution reduction processing based on the viewpoint A low-resolution conversion information from the multi-viewpoint image encoding device 501, thereby setting the resolution of the viewpoint image A to the same resolution as the resolution of the viewpoint image B after resolution reduction processing. Also, the multi-viewpoint image decoding device 502 changes the viewpoint of the viewpoint image A after resolution reduction processing to the viewpoint B based on the disparity related information. At the time of decoding the encoded data of the viewpoint image B after resolution reduction processing, the multi-viewpoint image decoding device 502 then references the viewpoint image A subjected to resolution reduction processing of which the viewpoint has been changed to the viewpoint B. The multi-viewpoint image decoding device 502 outputs, in the same way as with the multi-viewpoint image decoding device 13, the viewpoint image A obtained as a decoding result, and supplies the viewpoint image B after resolution reduction processing to the image inverse conversion processing device 14.

Figure 17:
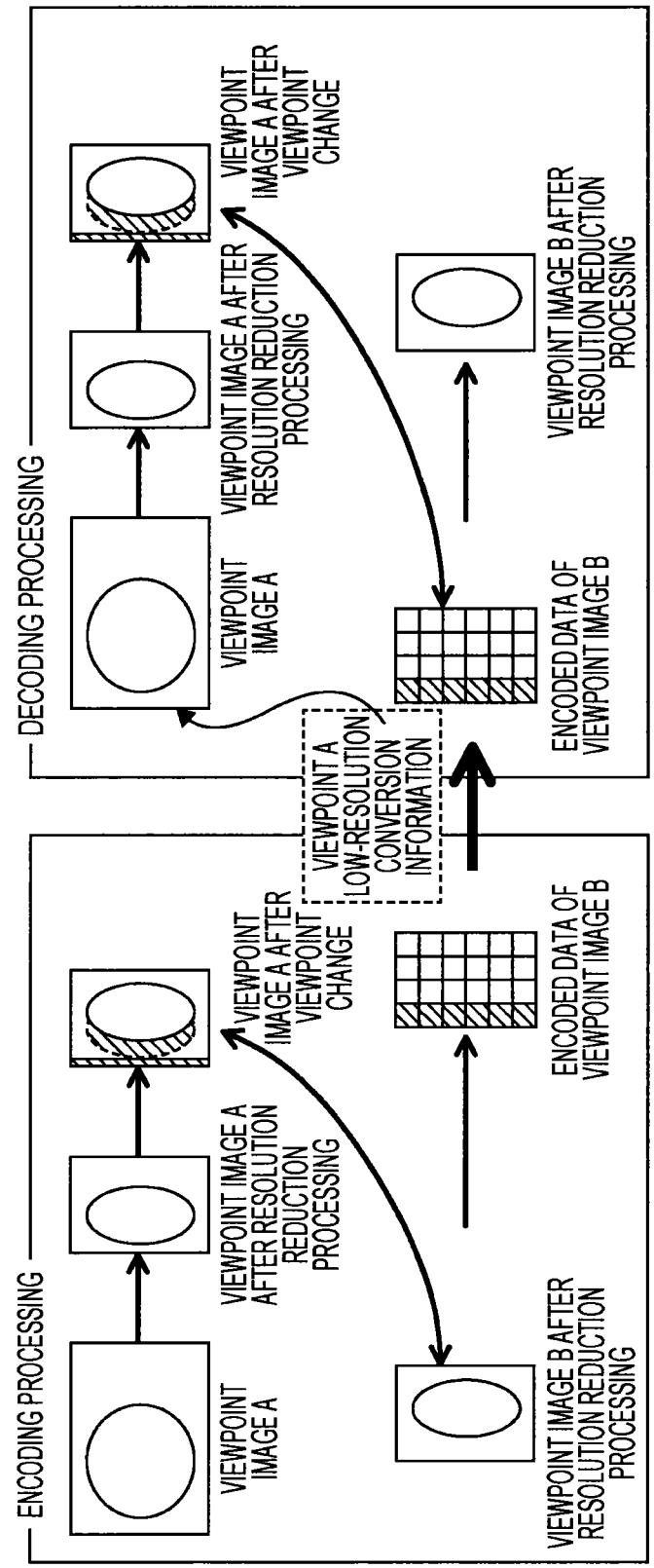
FIG. 17 is a diagram for describing overview of encoding and decoding of a viewpoint image B after resolution reduction processing.

Overview of Encoding and Decoding of Viewpoint Image B after Resolution Reduction Processing FIG. 17 is a diagram for describing overview of encoding by the multi-viewpoint image encoding device 501 and decoding by the multi-viewpoint image decoding device 502 in FIG. 16 of the viewpoint image B after resolution reduction processing.

As illustrated in the left side in FIG. 17, with the multi-viewpoint image encoding device 501, the viewpoint image A is subjected to resolution, reduction processing, and the resolution of the viewpoint image A is set to the same as with the viewpoint image B after resolution reduction processing. The viewpoint of the viewpoint image A after resolution reduction processing is then changed to the viewpoint B. That is to say, the viewpoint image A after resolution reduction processing is converted into a viewpoint image obtained at the viewpoint B corresponding thereto. At the time of encoding of the viewpoint image B after resolution reduction processing, the viewpoint image A after viewpoint change is then referenced, for example.

The encoded data of the viewpoint image B after resolution reduction processing obtained as an encoding result is transferred to the multi-viewpoint image decoding device 502 along with the viewpoint A low-resolution conversion information.

Also, as illustrated in the right side of FIG. 17, with the multi-viewpoint image decoding device 502, the viewpoint image A encoded by the multi-viewpoint image encoding device 501 and decoded by the multi-viewpoint image decoding device 502 is subjected to resolution reduction processing based on the viewpoint A low-resolution conversion information. Thus, the resolution of the viewpoint image A is set to the same resolution as with the viewpoint image B after resolution reduction processing. The viewpoint of the viewpoint image A after resolution reduction processing is then changed to the viewpoint B. At the time of decoding of the encoded data of the viewpoint image B after resolution reduction processing transferred from the multi-viewpoint image encoding device 501, the viewpoint image A after resolution reduction processing is then referenced. As a result of decoding, the viewpoint image B after resolution reduction processing is generated.

Configuration Example of Multi-Viewpoint Image Encoding Device

Figure 18:
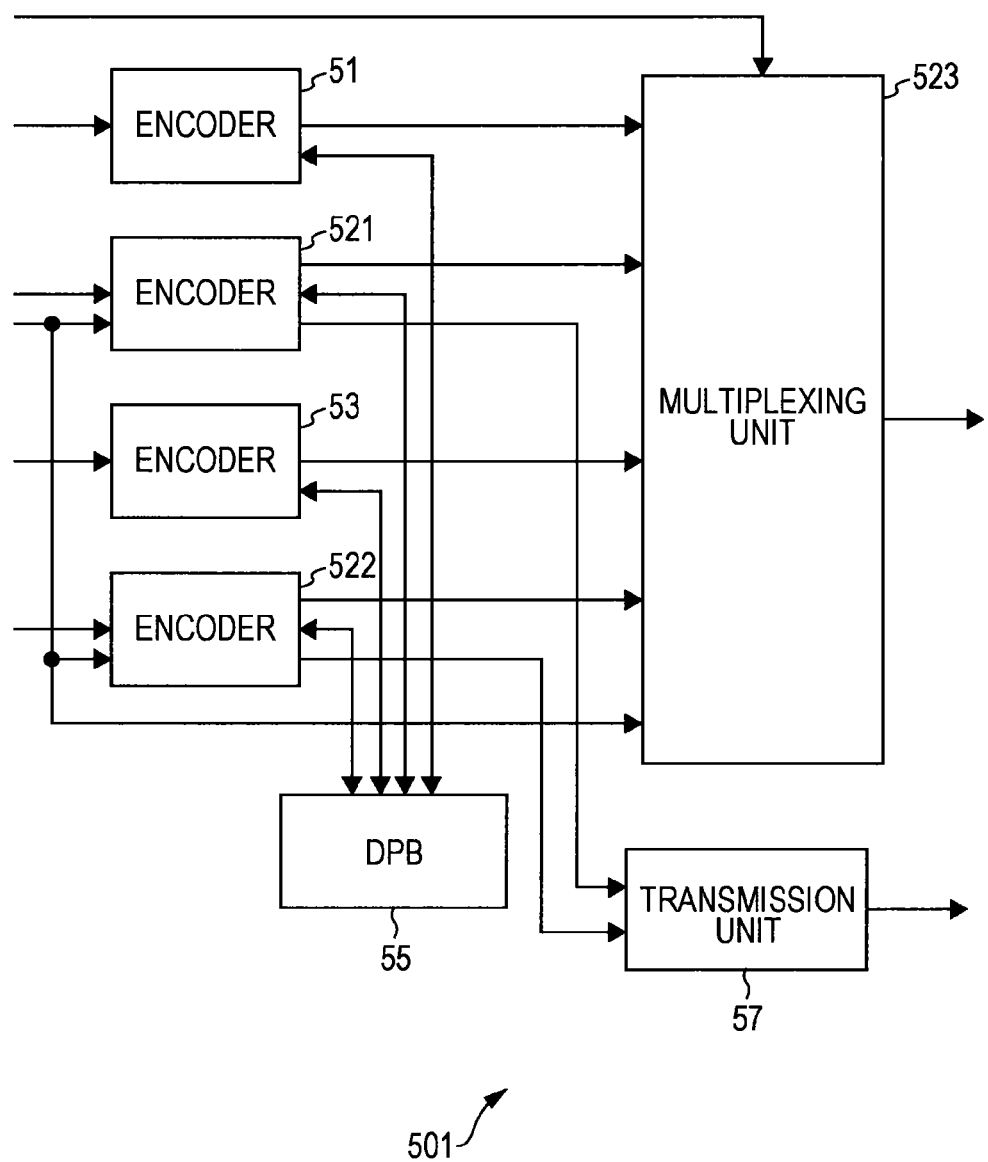
FIG. 18 is a block diagram illustrating a configuration example of a multi-viewpoint image encoding device in FIG. 16.

FIG. 18 is a block diagram illustrating a configuration example of the multi-viewpoint image encoding device 501 in FIG. 16.

Of configuration illustrated in FIG. 18, the same configuration as the configuration in FIG. 5 is denoted with the same reference numeral. Redundant description will be omitted as appropriate.

The configuration of the multi-viewpoint image encoding device 501 in FIG. 18 differs from the configuration in FIG. 5 principally in that instead of the encoder 52, encoder 54, and multiplexing unit 56, an encoder 521, an encoder 522, and a multiplexing unit 523 are provided.

The encoder 521 of the multi-viewpoint image encoding device 501 encodes a color image of the viewpoint B after resolution reduction processing supplied from the image conversion processing device 11 using the disparity related information as appropriate, and supplies encoded data of the color image of the viewpoint B obtained as a result thereof to the multiplexing unit 523. Also, the encoder 521 generates viewpoint A low-resolution conversion information, and supplies to the transmission unit 57.

The encoder 522 encodes the disparity information image of the viewpoint B after resolution reduction processing supplied from the image conversion processing device 11 using the disparity related information as appropriate, and supplies encoded data of the disparity information image of the viewpoint B obtained as a result thereof to the multiplexing unit 523. Also, the encoder 522 generates viewpoint A low-resolution conversion information, and supplies to the transmission unit 57.

The multiplexing unit 523 multiplexes encoded data from each of the encoders 51, 521, 53, and 522, the viewpoint B low-resolution conversion information supplied from the image conversion processing device 11, and the disparity related information to generate a bitstream. The multiplexing unit 523 transfers the bitstream to the multi-viewpoint image decoding device 502 in FIG. 16.

Configuration Example of Multi-Viewpoint Image Generating Device

Figure 19:
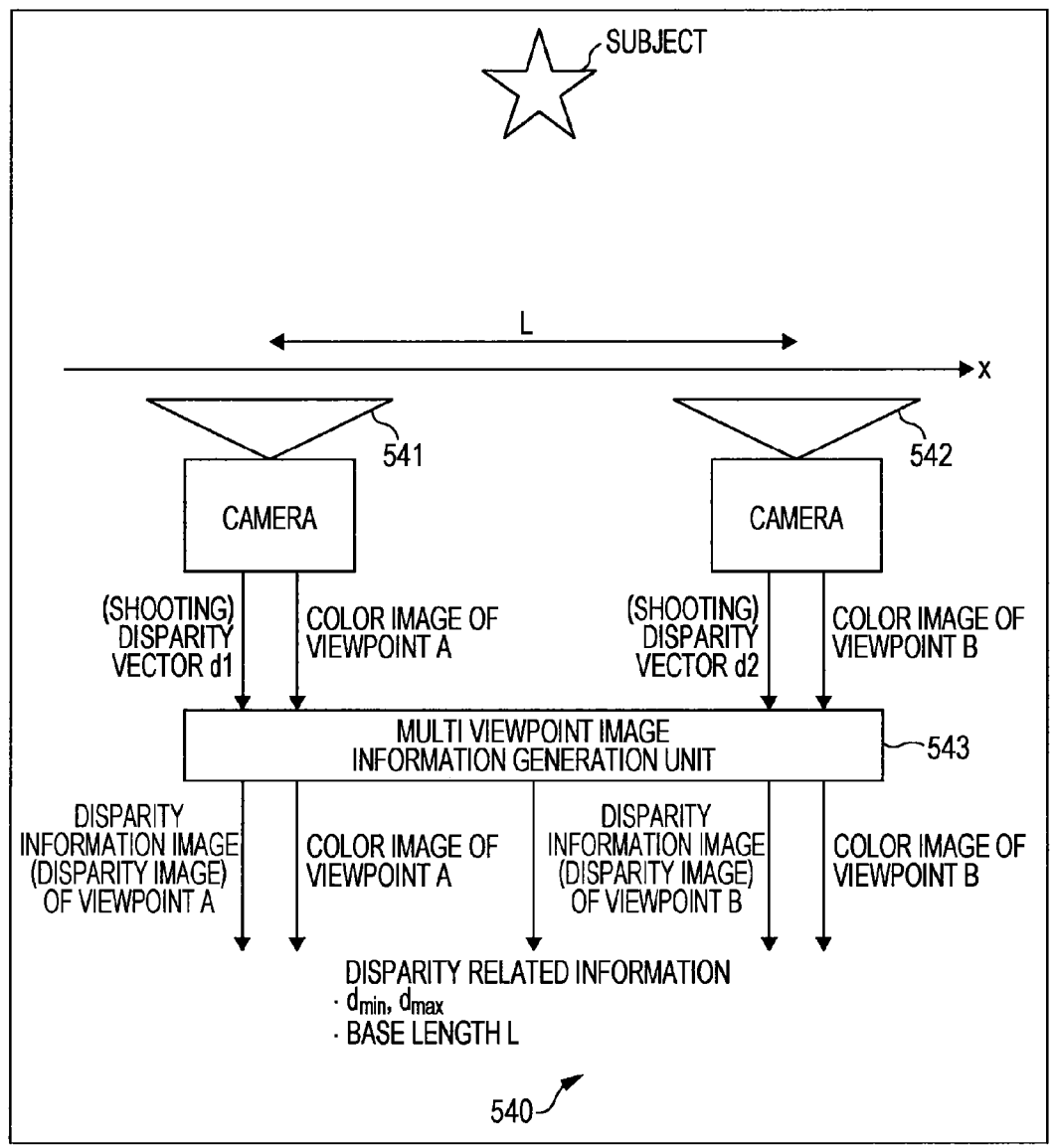
FIG. 19 is a block diagram illustrating a configuration example of a multi-viewpoint image generating device.

FIG. 19 is a block diagram illustrating a configuration example of the multi-viewpoint image generating device 540 which generates the viewpoint image A and viewpoint image B, and inputs to the image processing system 500.

With the multi-viewpoint image generating device 540, in order to shoot a color image of the viewpoint A and a color image of the viewpoint B, the two cameras 541 and 542 are installed in a position where the color images of the viewpoint A and viewpoint B can be shot, respectively.

Now, with the present embodiment, in order to simplify description, let us say that the cameras 541 and 542 are disposed in a different position on a straight line on a certain horizontal surface with the optical axis being directed in a direction perpendicular to the straight line thereof.

The camera 541 shoots a subject in a position where the camera 541 thereof is disposed, and outputs a color image of the viewpoint A which is a moving image.

Further, the camera 541 outputs a disparity vector (disparity) d1 that represents disparity as to a reference viewpoint regarding each pixel of the color image of the viewpoint A with the position of the camera 542 which is another optional camera as a reference viewpoint.

The camera 542 shoots a subject in a position where the camera 542 thereof is disposed, and outputs a color image of the viewpoint B which is a moving image.

Further, the camera 542 outputs a disparity vector (disparity) d2 that represents disparity as to a reference viewpoint regarding each pixel of the color image of the viewpoint B with the position of the camera 541 which is another optional camera as a reference viewpoint.

Now, when assuming that a two-dimensional plane where the lateral (horizontal) direction of the color image is taken as the x axis, the longitudinal (vertical) direction is taken as the y axis is taken as a color image plane, the cameras 541 and 542 are disposed on a straight line on a plane (horizontal surface) orthogonal to the color image plane. Accordingly, the disparity vectors d1 and d2 are vectors where the y component is 0, and the x component has a value corresponding to a positional relation in the horizontal directions of the cameras 541 and 542, or the like.

Now, hereinafter, the disparity vectors d1 and d2 that the cameras 541 and 542 output will also be referred to as shooting disparity vectors in order to distinguish from disparity vectors obtained by ME.

The color image of the viewpoint A and the shooting disparity vector d1 that the camera 541 outputs, and the color image of the viewpoint B and the shooting disparity vector d2 that the camera 542 outputs are supplied to the multi-viewpoint image information generating unit 543.

The multi-viewpoint image information generating unit 543 outputs the color image of the viewpoint A from the camera 541, and the color image of the viewpoint B from the camera 542 without change.

Also, the multi-viewpoint image information generating unit 543 obtains disparity information regarding disparity for each pixel of the color image of the viewpoint A from the shooting disparity vector d1 from the camera 541, generates and outputs a disparity information image of the viewpoint A including the disparity information thereof as pixel values.

Further, the multi-viewpoint image information generating unit 543 obtains disparity information regarding disparity for each pixel of the color image of the viewpoint B from the shooting disparity vector d2 from the camera 542, generates and outputs a disparity information image of the viewpoint B including the disparity information thereof as pixel values.

As described above, examples of the disparity information (depth information) include a disparity value (value 1) which is a value corresponding to a shooting disparity vector, and a value y after normalization of depth Z that represents distance (depth) to a subject.

Now, let us say that the pixel values of a disparity information image takes an integer value of 0 to 255 that is represented with eight bits, for example. Further, (the x component of) a shooting disparity vector is represented with d, and also, (for example, with a picture or a moving image serving as one content, or the like,) the maximum value and minimum value (of the x component) of a shooting disparity vector are represented with dmax and dmin respectively.

In this case, a disparity value v (value 1) is, as described above, obtained in accordance with Expression (1), for example, using (the x component of) the shooting disparity vector d and the maximum value dmax ($D_{max}$) and minimum value dmin ($D_{min}$).

$$v=255\times(d-d\text{min})/(d\text{max}-d\text{min}) \tag{1}$$

Note that the disparity value v in Expression (1) can be converted into (the x component of) a shooting disparity vector d in accordance with Expression (2).

$$d=v\times(d\text{max}-d\text{min})/255+d\text{min} \tag{2}$$

Also, the depth Z represents distance from a straight line where the cameras 541 and 542 are disposed to a subject.

With regard to the camera 541 (the same applies to the camera 542), when representing base length which is distance to the camera 542 disposed on a straight line from the camera 541 (distance from the reference viewpoint) as L, and the focal distance of the camera 541 as f respectively, the depth Z can be obtained in accordance with Expression (3) using (the x component of) the shooting disparity vector d (d1).

$$Z=(L/d)\times f \tag{3}$$

The disparity value v and depth Z which are disparity information can mutually be converted in accordance with Expression (3), and accordingly, are equivalent information.

Now, hereinafter, disparity information image (depth image) having the disparity value v as pixel values will also be referred to as disparity image, and an image having a value y after normalization of the depth Z as pixel values will also be referred to as depth image.

Not that, with the second embodiment, though of the disparity image and depth image the disparity image will be used as a disparity information image for example, the depth image may also be used as a disparity information image.

The multi-viewpoint image information generating unit 543 outputs the disparity related information in addition to the color image of the viewpoint A and the color image of the viewpoint B, and the disparity information image of the viewpoint A and the disparity information image of the viewpoint B, which are described above.

That is to say, externally supplied to the multi-viewpoint image information generating unit 543 are the base length L which is distance between the cameras 541 and 542 (distance from each of the cameras 541 and 542 to the reference viewpoint) and the focal distance f.

The multi-viewpoint image information generating unit 543 detects, regarding each of the shooting disparity vector d1 from the camera 541, and the shooting disparity vector d2 from the camera 542, the maximum value dmax and minimum value dmin of (the x component of) the shooting disparity vector d.

The multi-viewpoint image information generating unit 543 then outputs the maximum value dmax and minimum value dmin of the shooting disparity vector d, base length L, and focal distance f as disparity related information.

The color image of the viewpoint A and the color image of the viewpoint B, the disparity information image of the viewpoint A and the disparity information image of the viewpoint B, and disparity related information that the multi-viewpoint image information generating unit 543 outputs are supplied to the image processing system 500 in FIG. 16.

Now, in order to simplify description, though assuming here that the cameras 541 and 542 are disposed on a straight line on the same plane orthogonal to the color image plane, and the shooting disparity vector d (d1 and d2) are a vector where the y component is 0, each of the cameras 541 and 542 may be disposed on a different plane orthogonal to the color image plane. In this case, the shooting disparity vector d becomes a vector where both of the x component and y component may have a value other than 0.

Configuration Example of Encoder 522

Figure 20:
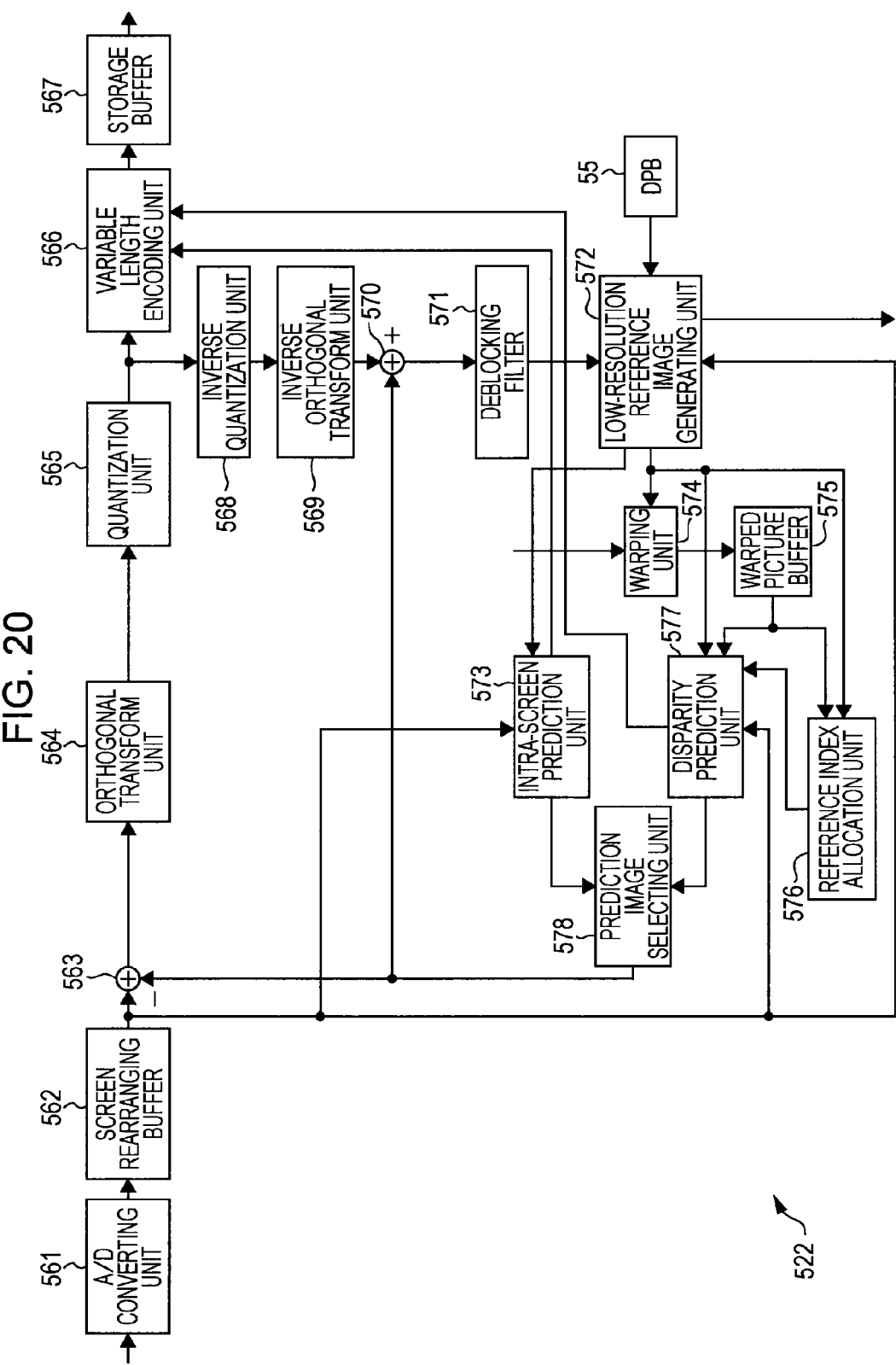
FIG. 20 is a block diagram illustrating a configuration example of an encoder in FIG. 18.

FIG. 20 is a block diagram illustrating a configuration example of the encoder 522 in FIG. 18.

The encoder 522 performs encoding of the disparity information image of the viewpoint B which is an image to be encoded with the MVC format.

In FIG. 20, the encoder 522 has an A/D converting unit 561, a screen rearranging buffer 562, a computing unit 563, an orthogonal transform unit 564, a quantization unit 565, a variable length encoding unit 566, a storage buffer 567, an inverse quantization unit 568, an inverse orthogonal transform unit 569, a computing unit 570, a deblocking filter 571, a low-resolution reference image generating unit 572, an intra-screen prediction unit 573, a warping unit 574, a warped picture buffer 575, a reference index allocation unit 576, a disparity prediction unit 577, and a prediction image selecting unit 578.

The A/D converting unit 561 through the intra-screen prediction unit 573, and prediction imager selecting unit 578 are configured in the same way as with the A/D converting unit 141 through the intra-screen prediction unit 153, and prediction imager selecting unit 155 of the encoder 52 in FIG. 7, and accordingly, description thereof will be omitted as appropriate.

In FIG. 20, the picture of a decoded image, that is, a disparity information image encoded at the encoder 522 and subjected to local decoding (hereinafter, also referred to as decoded viewpoint B disparity information image) is supplied to the DPB 55 from the deblocking filter 571, and is stored as a candidate picture which may become a reference picture.

Also, supplied to and stored in the DPB 55 are the picture of the color image of the viewpoint A encoded at the encoder 51 and subjected to local decoding, the picture of the color image of the viewpoint B encoded at the encoder 521 and subjected to local decoding, and the picture of the disparity information image of the viewpoint A encoded at the encoder 52 and subjected to local decoding.

Supplied to the warping unit 574 are the maximum value dmax and minimum value dmin of the shooting disparity vector d1, base length L, and focal distance f, serving as the disparity related information.

The warping unit 574 reads out a picture (picture at the same point-in-time as with the current picture) of the decoded viewpoint A disparity information image from the DPB 55 via the low-resolution reference image generating unit 572.

The warping unit 574 subjects the picture of the decoded viewpoint A disparity information image to warping using the disparity related information as appropriate, thereby generating the picture of the warped viewpoint A disparity information image which is a warped image where the picture of the decoded viewpoint A disparity information image has been converted into an image (disparity information image) obtained at the viewpoint B.

Specifically, the warping unit 574 converts the disparity value v which is the pixel value of each pixel of the picture of the decoded viewpoint A disparity information image into the shooting disparity vector d1 for each pixel in accordance with the above Expression (2) using the maximum value dmax and minimum value dmin of the shooting disparity vector d1.

Now, in the event of employing a depth image instead of a disparity image as a disparity information image, the depth Z which is a value before normalization of a value y which is a pixel value of a depth image is converted into the shooting disparity vector d in accordance with the above Expression (3) using the base length L and focal distance f.

The warping unit 574 performs warping wherein each pixel of the picture of the decoded viewpoint A disparity information image is moved in accordance with the shooting disparity vector d1 of the pixel thereof, thereby generating the picture of the warped viewpoint A disparity information image.

Note that, according to warping, a perforated occlusion portion where there is no pixel value may occur on the picture of the warped viewpoint A disparity information image, but a pixel of the occlusion portion is compensated with the pixel value (disparity value) of a surrounding pixel, that is, for example, a pixel closest to the occlusion portion in the opposite direction of a moving direction with warping.

Here, the pixel closest to the occlusion portion in the opposite direction of a moving direction with warping is a pixel having a disparity value that represents disparity of the background of the depth side (disparity value of the background) as a pixel value, and accordingly, (the pixels of) the occlusion portion are compensated with the disparity value of the background.

When generating the picture of the warped viewpoint A disparity information image by warping of the picture of the decoded viewpoint A disparity information image, the warping unit 574 supplies the picture of the warped viewpoint A disparity information image thereof to the warped picture buffer 575.

The warped picture buffer 575 temporarily stores the picture of the warped viewpoint A disparity information image from the warping unit 574.

Note that, with the present embodiment, the warped picture buffer 575 which stores the picture of the warped viewpoint A disparity information image is provided separately from the DPB 55, but one buffer may be shared as the DPB 55 and warped picture buffer 575.

The reference index allocation unit 576 takes the picture of the decoded viewpoint A disparity information image stored in the DPB 55, and the picture of the warped viewpoint A disparity information image stored in the warped picture buffer 575 as candidate pictures which are candidates of a reference picture, and allocates a reference index to each candidate picture.

The reference index allocation unit 576 then supplies the reference index allocated to each candidate picture to the disparity prediction unit 577.

Note that the reference index allocation unit 576 allocates, of the picture of the decoded viewpoint A disparity information image and the picture of the warped viewpoint A disparity information image which are candidate pictures, a reference index of which the value is 1 to the picture of the decoded viewpoint A disparity information image, and allocates a reference index of which the value is 0 to the picture of the warped viewpoint A disparity information image. That is to say, the reference index of which the value is 0 is information that represents that the warped viewpoint A disparity information image has been referenced at the time of generation of a prediction image.

Now, with MVC (AVC), the code amount of the reference index of which the value is 0 is smaller than the code amount of the reference index of which the value is 1.

Also, with regard to the pictures of the warped viewpoint A disparity information image and the viewpoint A disparity information image, the picture of the warped viewpoint A disparity information image is apt to be smaller in encoding cost of the current block than the picture of the viewpoint A disparity information image, and is readily selected as a reference picture.

Accordingly, the reference index having small code amount and a value of 0 is allocated to the picture of the warped viewpoint A disparity information image which is readily selected as a reference picture, whereby coding efficiency can be improved.

Also, with the encoder 522, as described above, the same processing as with the encoder 52 (FIG. 7) is performed except that the warped viewpoint A disparity information image to be generated by subjecting the disparity information image of the viewpoint A different from the viewpoint B of the disparity information image of the viewpoint B which is an object to be encoded (decoded viewpoint A disparity information image) to warping is included in the candidate pictures, and a reference index is allocated to the warped viewpoint A disparity information image which is the candidate picture thereof.

Accordingly, in the event that a reference index of which the value allocated to the warped viewpoint A disparity information image is 0 has been selected as a reference index for prediction of the current block, that is, in the event that the warped viewpoint A disparity information image which is a candidate picture to which a reference index having a value of 0 has been allocated has been selected as a reference picture, the current block can be taken as a skip macroblock.

Accordingly, a reference index having a value of 0 is allocated to the picture of the warped viewpoint A disparity information image which is readily selected as a reference picture, thereby increasing a probability that a skip macroblock where information of residual and a shift vector is not encoded will occur, and accordingly, coding efficiency can be improved.

The disparity prediction unit 577 performs disparity prediction (generation of a prediction image) of the current block with a candidate picture to which a reference index has been allocated at the reference index allocation unit 576, that is, the picture of the decoded viewpoint A disparity information image stored in the DPB 55, and the picture of the warped viewpoint A disparity information image stored in the warped picture buffer 575 as reference pictures respectively.

Further, the disparity prediction unit 577 computes encoding cost necessary for encoding of the current block (prediction encoding) employing a prediction image obtained from candidate pictures by disparity prediction regarding each of the picture of the decoded viewpoint A disparity information image, and the picture of the warped viewpoint A disparity information image which are candidate pictures.

The disparity prediction unit 577 selects a reference index allocated to the candidate picture to be used for encoding of the current block out of the reference indexes allocated to the picture of the decoded viewpoint A disparity information image, and the picture of the warped viewpoint A disparity information image which are candidate pictures, as a reference index for prediction of the current block, and outputs this to the variable length encoding unit 566 as one of the header information.

Also, the disparity prediction unit 577 supplies a prediction image generated by disparity prediction to the prediction image selecting unit 578 with a candidate picture to which the reference index for prediction of the current block has been allocated (the picture of the decoded viewpoint A disparity information image or the picture of the warped viewpoint A disparity information image) as a reference picture.

Note that, in FIG. 20, in order to simplify description, the disparity prediction unit 577 configured to perform disparity prediction of inter prediction is provided to the encoder 522, but with the encoder 522, in the same way as with the inter prediction unit 154 of the encoder 52 in FIG. 7, motion prediction (time prediction) can also be performed in addition to disparity prediction.

In the event of performing both of disparity prediction and time prediction at the encoder 522, with the reference index allocation unit 576, a reference index is also allocated to the picture of the decoded viewpoint B disparity information image which is a candidate picture to be referenced with time prediction (another point-in-time picture of which the point-in-time differs from the current picture) in addition to the pictures of the warped viewpoint A disparity information image and decoded viewpoint A disparity information image which are candidate pictures to be referenced with disparity prediction.

Figure 21:
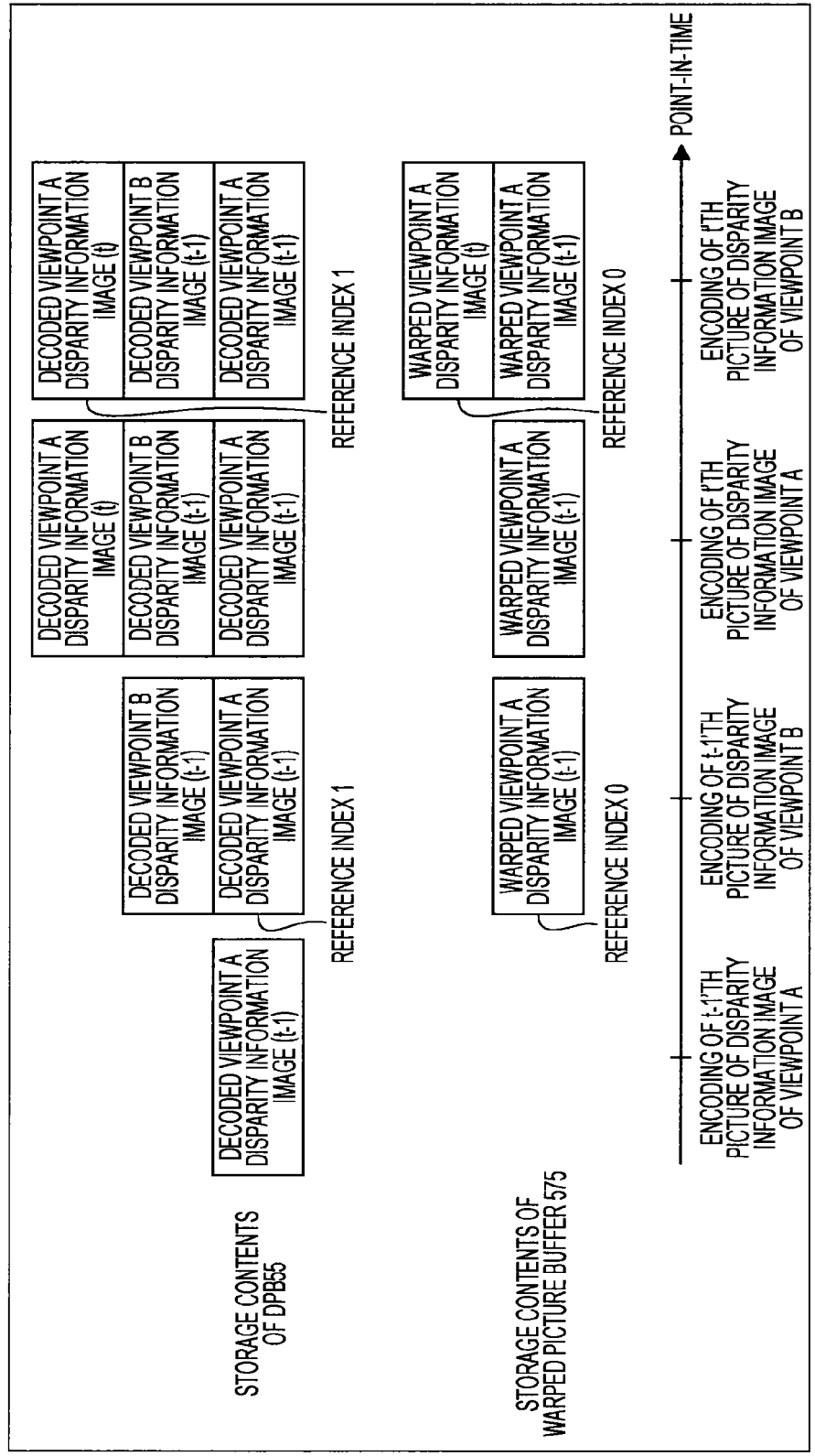
FIG. 21 is a diagram for describing a decoded viewpoint A disparity information image and a warped viewpoint A disparity information image.

Description of Decoded Viewpoint A Disparity Information Image and Warped Viewpoint A Disparity Information Image FIG. 21 is a diagram for describing the decoded viewpoint A disparity information image to be stored in the DPB 55 in FIG. 20, and the warped viewpoint A disparity information image to be stored in the warped picture buffer 575.

Now, when paying notice to the disparity information image of the viewpoint A, and the disparity information image of the viewpoint B, with the encoders 53 and 522 in FIG. 18, in accordance with the MVC format, encoding will be performed in order of a first picture of the disparity information image of the viewpoint A, a first picture of the disparity information image of the viewpoint B, a second picture of the disparity information image of the viewpoint A, a second picture of the disparity information image of the viewpoint B, and so on.

In the event that the t−1'th picture of the disparity information image of the viewpoint A has been encoded and subjected to local decoding at the encoder 53, a decoded viewpoint A disparity information image obtained by the local decoding thereof (decoded viewpoint A disparity information image (t−1)) is supplied to and stored in the DPB 55.

Thereafter, with the encoder 522, the decoded viewpoint A disparity information image (t−1) subjected to resolution reduction processing by the low-resolution reference image generating unit 572 is subjected to warping at the warping unit 574, and accordingly, the t−1'th picture of the warped viewpoint A disparity information image (warped viewpoint A disparity information image (t−1)) is generated, and is supplied to and stored in the warped picture buffer 575.

With the encoder 522, a reference index of which the value is 0 is then allocated to the warped viewpoint A disparity information image (t−1) stored in the warped picture buffer 575 at the reference index allocation unit 576, and a reference index of which the value is 1 is allocated to the decoded viewpoint A disparity information image (t−1) stored in the DPB 55.

Further, with the encoder 522, the t−1'th picture of the disparity information image of the viewpoint B is encoded and subjected to local decoding using the warped viewpoint A disparity information image (t−1) or decoded viewpoint A disparity information image (t−1) to which a reference index has been allocated, as a reference picture as appropriate. The decoded viewpoint B disparity information image (decoded viewpoint B disparity information image (t−1)) obtained by the local decoding thereof is supplied to and stored in the DPB 55.

As a result thereof, the decoded viewpoint B disparity information image (t−1) and decoded viewpoint A disparity information image (t−1) are stored in the DPB 55 as illustrated in FIG. 21.

Thereafter, the t'th picture of the disparity information image of the viewpoint A is encoded and subjected to local decoding at the encoder 53. The decoded viewpoint A disparity information image (decoded viewpoint A disparity information image (t)) obtained by the local decoding thereof is supplied to and stored in the DPB 55.

As a result thereof, the decoded viewpoint A disparity information image (t), decoded viewpoint B disparity information image (t−1), and decoded viewpoint A disparity information image (t−1) are stored in the DPB 55 as illustrated in FIG. 21.

As described above, in the event that the decoded viewpoint A disparity information image (t) has been stored in the DPB 55, the warping unit 574 of the encoder 522 subjects the decoded viewpoint A disparity information image (t) after resolution reduction processing to be read out from the DPB 55 via the low-resolution reference image generating unit 572 to warping, thereby generating the t'th picture of the warped viewpoint A disparity information image (warped viewpoint A disparity information image (t)), and supplying to and storing in the warped picture buffer 575.

As a result thereof, the warped viewpoint A disparity information image (t) and warped viewpoint A disparity information image (t−1) are stored in the warped picture buffer 575 as illustrated in FIG. 21.

Thereafter, with the encoder 522, a reference index of which the value is 0 is allocated to the warped viewpoint A disparity information image (t) stored in the warped picture buffer 575 at the reference index allocation unit 576, and a reference index of which the value is 1 is allocated to the decoded viewpoint A disparity information image (t) stored in the DPB 55.

Further, with the encoder 522, the t'th picture of the disparity information image of the viewpoint B is encoded and subjected to local decoding using the warped viewpoint A disparity information image (t) or decoded viewpoint A disparity information image (t) to which a reference index has been allocated, as a reference picture as appropriate.

With the encoders 53 and 522, hereinafter, the same processing will be performed.

Figure 22:
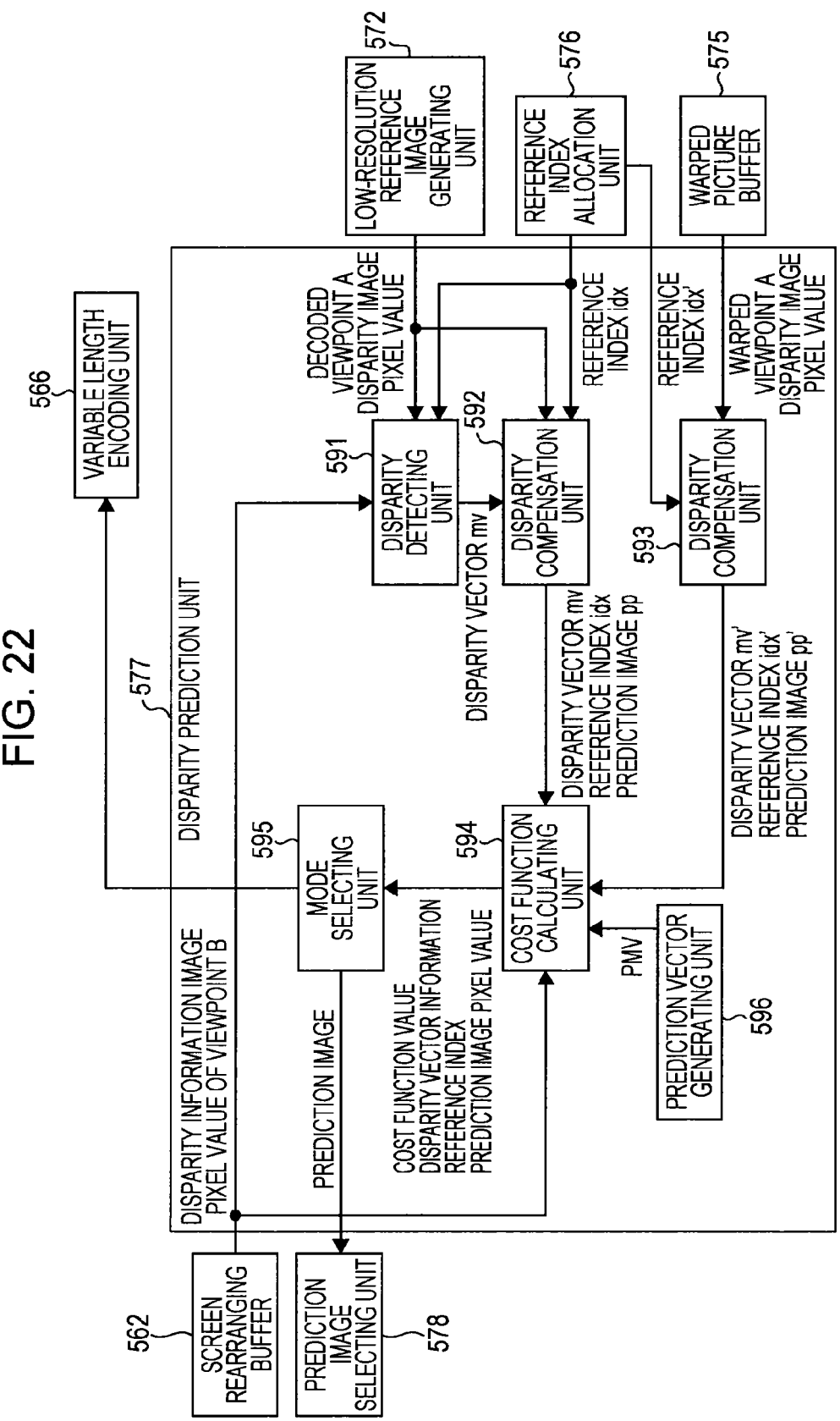
FIG. 22 is a block diagram illustrating a configuration example of a disparity prediction unit in FIG. 20.

FIG. 22 is a block diagram illustrating a configuration example of the disparity prediction unit 577 in FIG. 20.

In FIG. 22, the disparity prediction unit 577 includes a disparity detecting unit 591, disparity compensation units 592 and 593, a cost function calculating unit 594, a mode selecting unit 595, and a prediction vector generating unit 596.

Supplied to the disparity detecting unit 591 is the picture of the decoded viewpoint A disparity information image which is a candidate picture subjected to resolution reduction processing by the low-resolution reference image generating unit 572. Further, supplied to the disparity detecting unit 591 from the reference index allocation unit 576 are a reference index idx (here, 1) allocated to the picture of the decoded viewpoint A disparity information image which is a candidate picture, and also the current block of the picture of the disparity information image of the viewpoint B to be encoded from the screen rearranging buffer 562.

The disparity detecting unit 591 performs, in the same way as with the MVC format, ME using the current block and the picture of the decoded viewpoint A disparity information image which is a candidate picture, thereby obtaining a shift vector that represents shift between the current block and a block that minimizes SAD as to the current block (corresponding block) of the picture of the decoded viewpoint A disparity information image, that is, a computed disparity vector my that represents disparity as to the viewpoint A of the current block, and supplying to the disparity compensation unit 592.

Supplied to the disparity compensation unit 592 are not only a shift vector which is the computed disparity vector my from the disparity detecting unit 591, but also the picture of the decoded viewpoint A disparity information image which is a candidate picture after resolution reduction processing from the low-resolution reference image generating unit 572. Further, supplied to the disparity compensation unit 592 from the reference index allocation unit 576 is the reference index idx allocated to the picture of the decoded viewpoint A disparity information image which is a candidate picture.

The disparity compensation unit 592 takes the picture of the decoded viewpoint A disparity information image which is a candidate picture as a reference picture, and performs shift compensation (disparity compensation) of the reference picture thereof using the computed disparity vector my from the disparity detecting unit 591 in the same way as with the MVC format, thereby generating a prediction image pp of the current block.

That is to say, the disparity compensation unit 592 obtains a corresponding block which is a block in a position shifted from the position of the current block of the picture of the decoded viewpoint A disparity information image just by the computed disparity vector mv, as a prediction image pp.

The disparity compensation unit 592 supplies the prediction image pp to the cost function calculating unit 594 along with the computed disparity vector my from the disparity detecting unit 591, and the reference index idx allocated to the picture of the decoded viewpoint A disparity information image from the reference index allocation unit 576.

Supplied to the disparity compensation unit 593 is the picture of the warped viewpoint A disparity information image which is a candidate picture stored in the warped picture buffer 575. Further, supplied to the disparity compensation unit 593 is a reference index idx' (here, 0) allocated to the picture of the warped viewpoint A disparity information image which is a candidate picture from the reference index allocation unit 576.

The disparity compensation unit 593 takes the picture of the warped viewpoint A disparity information image which is a candidate picture as a reference picture, and performs shift compensation (disparity compensation) of the reference picture thereof assuming that the computed disparity vector mv' serving as a shift vector is 0 vector, in the same way as with the MVC format, thereby generating a prediction image pp' of the current block.

That is to say, the warped viewpoint A disparity information image is an image converted into the disparity information image obtained at the viewpoint B by subjecting the disparity information image of the viewpoint A to warping, and accordingly, assuming that there is no disparity with the current block of the disparity information image of the viewpoint B, 0 vector is employed as the computed disparity vector mv'.

The disparity compensation unit 593 obtains a corresponding block which is a block in a position shifted from the position of the current block of the picture of the warped viewpoint A disparity information image just by the computed disparity vector mv'=0, that is, a block in the same position as with the current block of the picture of the warped viewpoint A disparity information image, as a prediction image pp'.

The disparity compensation unit 593 supplies the prediction image pp' to the cost function calculating unit 594 along with the computed disparity vector mv', and the reference index idx' allocated to the picture of the warped viewpoint A disparity information image from the reference index allocation unit 576.

Note that, though it has been assumed that the computed disparity vector mv' of the current block as to the picture of the warped viewpoint A disparity information image is 0 vector, with regard to the computed disparity vector mv' as to the picture of the warped viewpoint A disparity information image, ME is performed using the picture of the warped viewpoint A disparity information image and the current block, and a shift vector obtained by ME thereof can be employed as the computed disparity vector mv'.

Supplied to the cost function calculating unit 594 are from the disparity compensation unit 592 the prediction image pp, computed disparity vector mv, and reference index idx, and also from the disparity compensation unit 593 the prediction image pp', computed disparity vector mv', and reference index idx', and additionally, from the prediction vector generating unit 596 the prediction vector which is a predicted value of a shift vector of the current block, and also from the screen rearranging buffer 562 the current block.

The cost function calculating unit 594 obtains, regarding the reference index idx (allocated to the picture of the decoded viewpoint A disparity information image), encoding cost necessary for encoding of the current block for each macroblock type.

Specifically, the cost function calculating unit 594 obtains a residual vector as to a prediction vector of the computed disparity vector my regarding the reference index idx, and obtains a value MV corresponding to the code amount of the residual vector thereof.

Further, the cost function calculating unit 594 obtains, regarding the reference index idx, SAD which is a value corresponding to residual of the current block as to the prediction image pp generated from the decoded viewpoint A disparity information image to the reference index idx is allocated.

The cost function calculating unit 594 then obtains encoding cost for each macroblock type regarding the reference index idx in accordance with, for example, the following Expression (4) serving as a cost function for computing encoding cost.

$$COST=SAD+\lambda MV \tag{4}$$

Note that, in Expression (4), $\lambda$ is weight as to the value MV, and is set according to residual quantization step.

The cost function calculating unit 594 obtains encoding cost necessary for encoding of the current block for each macroblock type regarding the reference index idx' (allocated to the picture of the warped viewpoint A disparity information image) as well.

Note that the cost function for obtaining encoding cost is not restricted to Expression (4). Specifically, encoding cost can further be obtained by taking $\lambda 1$ and $\lambda 2$ as weight, and adding a value obtained by multiplying a value corresponding to the code amount of the residual vector by the weight $\lambda 1$, or a value obtained by multiplying a value corresponding to the code amount of the reference index by the weight $\lambda 2$ to SAD, or the like.

Upon obtaining encoding cost (cost function value) for each macroblock type regarding each of the reference indexes idx and idx', the cost function calculating unit 594 supplies the encoding cost to the mode selecting unit 595 along with the reference indexes, prediction image, and residual vector (disparity vector information).

The mode selecting unit 595 detects the least cost which is the minimum value out of the encoding cost for each macroblock type regarding each of the reference indexes idx and idx' from the cost function calculating unit 594.

Further, the mode selecting unit 595 selects a reference index and a macroblock type whereby the minimum cost has been obtained, as the optimal inter prediction mode.

Note that, with selection of the optimal inter prediction mode, for example, first, regarding each macroblock type, of the reference indexes idx and idx', a reference index with smaller encoding cost is selected, and thereafter, a macroblock type with the least encoding cost is selected with the selected reference index alone as a current from the macroblock types, whereby a reference index and a macroblock type whereby the least cost has been obtained can be selected as the optimal inter prediction mode.

The mode selecting unit 595 then supplies the optimal inter prediction mode, the reference index (reference index for prediction) of the optimal inter prediction mode, the disparity vector information of the optimal inter prediction mode, and so forth to the variable length encoding unit 566 as header information.

Further, the mode selecting unit 595 supplies the prediction image and encoding cost (least cost) of the optimal inter prediction mode to the prediction image selecting unit 578.

Note that, in the event that the reference index whereby the least cost has been obtained is a reference index of which the value is 0, the mode selecting unit 595 serves as a determining unit, and performs determination regarding whether or not the current block is encoded as a skip macroblock, for example, based on the data amount of encoded data and the least cost and so forth.

In the event that the current block is encoded as a skip macroblock at the mode selecting unit 595, the optimal inter prediction mode is determined to be a skip mode wherein the current block is encoded as a skip macroblock.

The prediction vector generating unit 596 generates a prediction vector of the current block using the MVC (AVC) system, and supplies to the cost function calculating unit 594.

Specifically, when the current block is encoded, the prediction vector generating unit 596 generates, of macroblocks already encoded (in raster scan order), a median value of a shift vector of a macroblock adjacent above the current block, a shift vector of a macroblock adjacent to the left, and a shift vector of a macroblock adjacent to the diagonally upper right as a prediction vector of the current block.

Note that, in the event that a shift vector of a macroblock adjacent to the diagonally upper right of the current block is unavailable, such as in the event that the current block is a macroblock of the right edge of the picture, a prediction vector of the current block is generated instead of the shift vector thereof using a shift vector of a macroblock adjacent to the diagonally upper left of the current block.

Also, calculation of a prediction vector is independently performed regarding each of the x component and y component.

Description of Processing of Encoder 522

Figure 23:
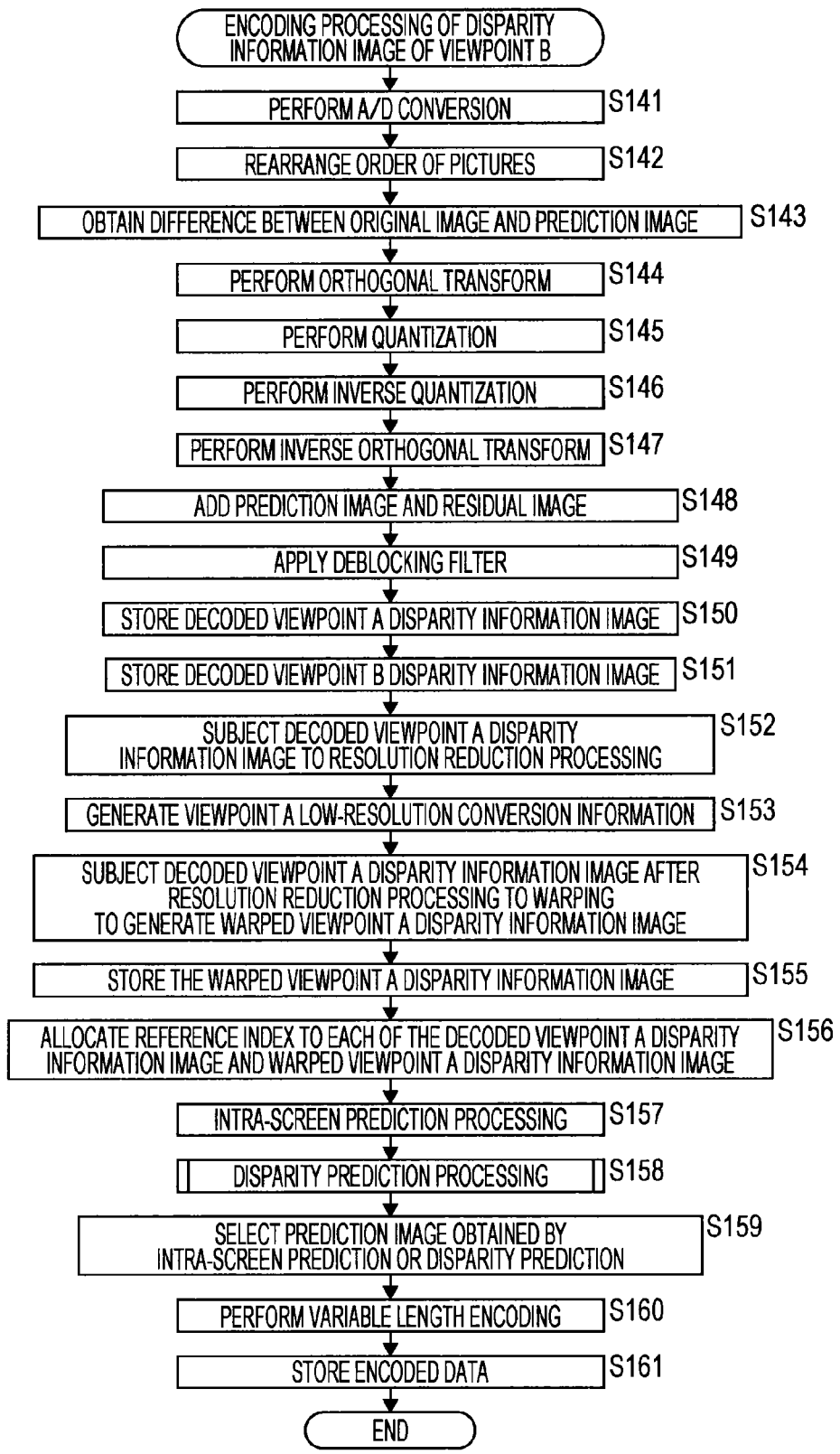
FIG. 23 is a flowchart for describing encoding processing to be performed by an encoder in FIG. 20.

FIG. 23 is a flowchart for describing encoding processing for encoding the disparity information image of the view point B that the encoder 522 in FIG. 20 performs.

Processing in steps S141 to S153 is the same as the processing in steps S11 to S23 in FIG. 9 except that the processing target is not a color image but a disparity information image, and accordingly, description will be omitted.

After the processing in step S153, in step S154 the warping unit 574 subjects the picture of the decoded viewpoint A disparity information image after resolution reduction processing supplied from the low-resolution reference image generating unit 572 to warping using the disparity related information as appropriate to generate the picture of the warped viewpoint A disparity information image. The warping unit 574 supplies the warped viewpoint A disparity information image to the warped picture buffer 575, and the processing proceeds to step S155.

In step S155, the warped picture buffer 575 stores the picture of the warped viewpoint A disparity information image from the warping unit 574, and the processing proceeds to step S156.

In step S156, the reference index allocation unit 576 allocates a reference index to each of the picture of the decoded viewpoint A disparity information image stored in the DPB 55, and the picture of the warped viewpoint A disparity information image stored in the warped picture buffer 575.

Further, the reference index allocation unit 576 supplies the reference index allocated to each of the picture of the decoded viewpoint A disparity information image and the picture of the warped viewpoint A disparity information image to the disparity prediction unit 577, and the processing proceeds from step S156 to step S157.

In step S157, the intra-screen prediction unit 573 subjects the next current block which is a macroblock serving as an object to be encoded next to intra-prediction processing (intra-screen prediction processing), and supplies a prediction image and encoding cost obtained as a result thereof to the prediction image selecting unit 578. The processing then proceeds from step S157 to step S158.

In step S158, the disparity prediction unit 577 performs, regarding the next current block, disparity prediction processing with the picture of the decoded viewpoint A disparity information image and the picture of the warped viewpoint A disparity information image as candidate pictures.

Specifically, the disparity prediction unit 577 performs, regarding the next current block, disparity prediction using each of the picture of the decoded viewpoint A disparity information image subjected to resolution reduction processing by the low-resolution reference image generating unit 572, and to which a reference index has been allocated by the reference index allocation unit 576, and the picture of the warped viewpoint A disparity information image stored in the warped picture buffer 575, and to which a reference index has been allocated by the reference index allocation unit 576, thereby obtaining a prediction image and encoding cost and so forth for each inter prediction mode.

Further, the disparity prediction unit 577 determines the optimal inter prediction mode, and supplies the prediction image of the optimal inter prediction mode thereof to the prediction image selecting unit 578 along with the encoding cost, and the processing proceeds from step S158 to step S159.

In step S159, the prediction image selecting unit 578 selects, of the prediction image from the intra-screen prediction unit 573 (prediction image by intra prediction) and the prediction image from the disparity prediction unit 577 (prediction image by inter prediction), for example, a prediction image of which the encoding cost is smaller, supplies to the computing units 563 and 570, and the processing proceeds to step S160.

Here, the prediction image that the prediction image selecting unit 578 selects in step S159 is used for the processing in steps S143 and S148 to be performed at the time of encoding of the next current block.

Also, the intra-screen prediction unit 573 supplies information regarding intra-prediction obtained in the intra-prediction processing in step S157 to the variable length encoding unit 566 as header information, and the disparity prediction unit 577 supplies information (optimal inter prediction mode, reference index, disparity vector information, etc.) regarding disparity prediction (inter prediction) obtained in the disparity prediction processing in step S158 to the variable length encoding unit 566 as header information.

In step S160, the variable length encoding unit 566 subjects the quantization values from the quantization unit 565 to variable length encoding to obtain encoded data.

Further, the variable length encoding unit 566 selects, of the header information from each of the intra-screen prediction unit 573 and disparity prediction unit 577, header information from one of the units wherein a prediction image with smaller encoding cost has been generated, and includes this in the header of encoded data.

The variable length encoding unit 566 supplies the encoded data to the storage buffer 567, and the processing proceeds from step S160 to step S161.

In step S161, the storage buffer 567 temporarily stores the encoded data from the variable length encoding unit 566, and outputs this at a predetermined data rate.

The encoded data output from the storage buffer 567 is supplied to the multiplexing unit 56 (FIG. 5).

With the encoder 522, the above processing in steps S141 to S161 is repeatedly performed as appropriate.

Figure 24:
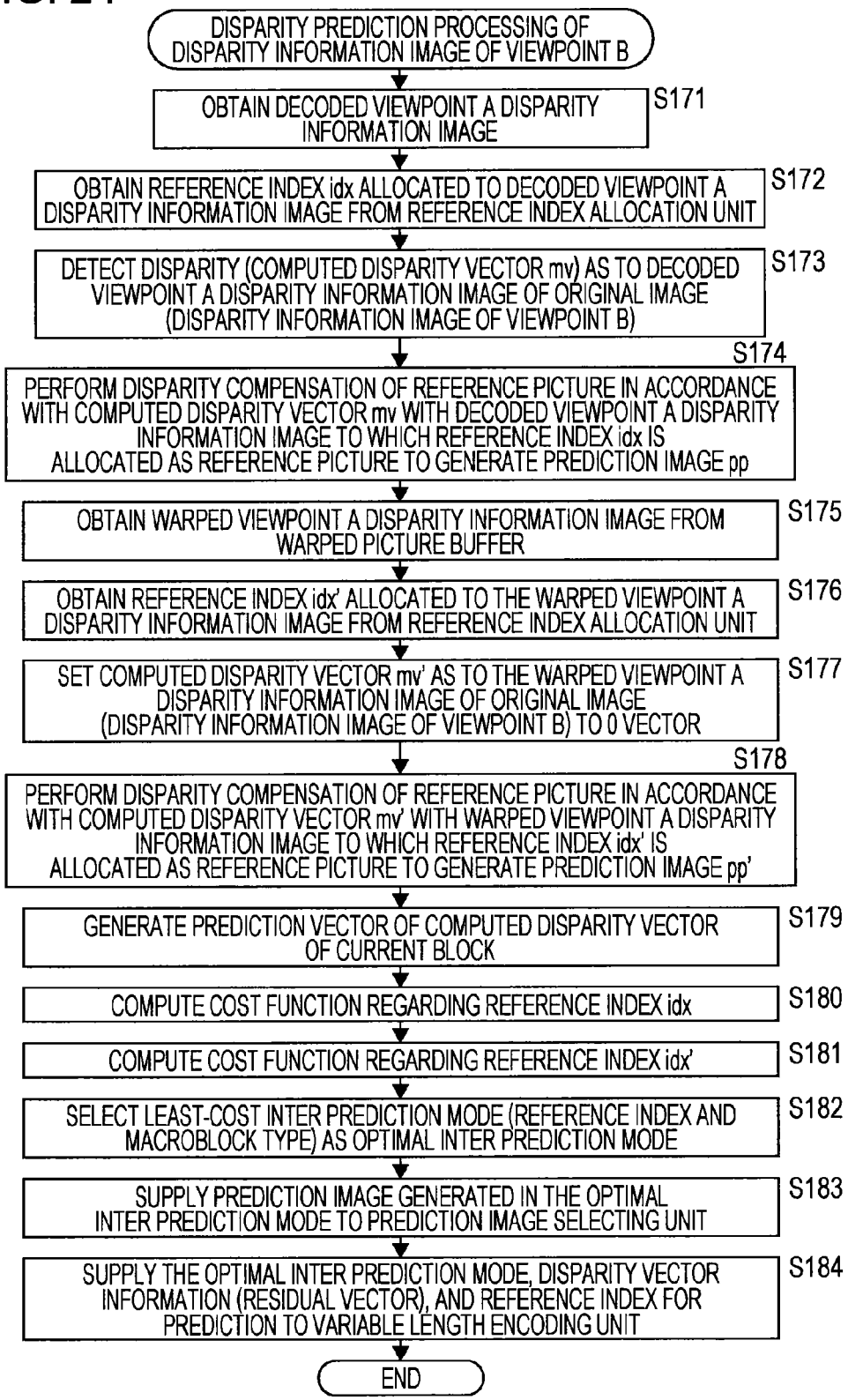
FIG. 24 is a flowchart for describing disparity prediction processing in FIG. 23.

FIG. 24 is a flowchart for describing disparity prediction processing that the disparity prediction unit 577 in FIG. 22 performs in step S158 in FIG. 23.

In step S171, the disparity prediction unit 577 obtains the picture of the decoded viewpoint A disparity information image after resolution reduction processing from the low-resolution reference image generating unit 572 as a candidate picture, and supplies to the disparity detecting unit 591 and disparity compensation unit 592, and the processing proceeds to step S172.

In step S172, the disparity prediction unit 577 obtains the reference index idx allocated to the picture of the decoded viewpoint A disparity information image after resolution reduction processing from the reference index allocation unit 576, and supplies to the disparity detecting unit 591 and disparity compensation unit 592, and the processing proceeds to step S173.

In step S173, the disparity detecting unit 591 detects the computed disparity vector my that represents disparity as to the picture of the decoded viewpoint A disparity information image after resolution reduction processing to which the reference index idx has been allocated from the reference index allocation unit 576 of the (next) current block of the disparity information image of the viewpoint B which is the original image supplied from the screen rearranging buffer 562 by ME.

The disparity detecting unit 591 then supplies the computed disparity vector my to the disparity compensation unit 592, and the processing proceeds from step S173 to step S174.

In step S174, the disparity compensation unit 592 takes the picture of the decoded viewpoint A disparity information image after resolution reduction processing to which the reference index idx has been allocated, as a reference picture, and performs shift compensation (disparity compensation) of the reference picture thereof using the computed disparity vector my from the disparity detecting unit 591, thereby generating a prediction image pp of the current block.

The disparity compensation unit 592 then supplies the prediction image pp to the cost function calculating unit 594 along with the computed disparity vector my and reference index idx, and the processing proceeds from step S174 to step S175.

In step S175, the disparity prediction unit 577 obtains the picture of the warped viewpoint A disparity information image which is a candidate picture from the warped picture buffer 575, and supplies to the disparity compensation unit 593, and the processing proceeds to step S176.

In step S176, the disparity prediction unit 577 obtains the reference index idx' allocated to the picture of the warped viewpoint A disparity information image from the reference index allocation unit 576, supplies to the disparity compensation unit 593, and the processing proceeds to step S177.

In step S177, the disparity compensation unit 593 sets the computed disparity vector mv' as to the picture of the warped viewpoint A disparity information image of the (next) current block to 0 vector, and the processing proceeds to step S178.

In step S178, the disparity compensation unit 593 takes the picture of the warped viewpoint A disparity information image to which the reference index idx' has been allocated, as a reference picture, and performs shift compensation (disparity compensation) of the reference picture thereof using the computed disparity vector mv' which has been set to 0 vector, thereby generating a prediction image pp' of the current block.

The disparity compensation unit 592 then supplies the prediction image pp' to the cost function calculating unit 594 along with the computed disparity vector mv' and reference index idx', and the processing proceeds from step S178 to step S179.

In step S179, the prediction vector generating unit 596 generates the prediction vector of each of the computed disparity vectors my and mv', supplies to the cost function calculating unit 594, and the processing proceeds to step S180.

In step S180, the cost function calculating unit 594 obtains parameters necessary for computation of the cost function such as a residual vector between the computed disparity vector my and the prediction vector, SAD between the current block and the prediction image pp, and so forth based on the (next) current block supplied from the screen rearranging buffer 562, the prediction image pp, computed disparity vector mv, reference index idx supplied from the disparity compensation unit 592, and the prediction vector supplied from the prediction vector generating unit 596.

Further, the cost function calculating unit 594 calculates the cost function using the parameters thereof, thereby computing encoding cost for each macroblock regarding (the picture of the decoded viewpoint A disparity information image to which has been allocated) the reference index idx, and the processing proceeds to step S181.

In step S181, the cost function calculating unit 594 obtains parameters necessary for computation of the cost function such as a residual vector between the computed disparity vector mv' and the prediction vector, SAD between the current block and the prediction image pp', and so forth based on the (next) current block supplied from the screen rearranging buffer 562, the prediction image pp', computed disparity vector mv', reference index idx' supplied from the disparity compensation unit 593, and the prediction vector supplied from the prediction vector generating unit 596.

Further, the cost function calculating unit 594 calculates the cost function using the parameters thereof, thereby computing encoding cost for each macroblock regarding (the picture of the warped viewpoint A disparity information image to which has been allocated) the reference index idx'.

The cost function calculating unit 594 then supplies the encoding cost (cost function value) for each macroblock regarding each of the reference indexes idx and idx' to the mode selecting unit 595 along with the reference index, prediction image, and residual vector (disparity vector information), and the processing proceeds from step S181 to step S182.

In step S182, the mode selecting unit 595 detects the least cost which is the minimum value out of the encoding cost for each macroblock regarding each of the reference indexes idx and idx' from the cost function calculating unit 594.

Further, the mode selecting unit 595 selects the reference index and macroblock type whereby the least cost has been obtained as the optimal inter prediction mode, and the processing proceeds from step S182 to step S183.

In step S183, the mode selecting unit 595 supplies the prediction image and encoding cost (least cost) of the optimal inter prediction mode to the prediction image selecting unit 578, and the processing proceeds to step S184.

In step S184, the mode selecting unit 595 supplies the optimal inter prediction mode, the reference index (reference index for prediction) of the optimal inter prediction mode, and the disparity vector information of the optimal inter prediction mode, and so forth to the variable length encoding unit 566 as header information, and the processing returns.

Configuration Example of Encoder 521

Figure 25:
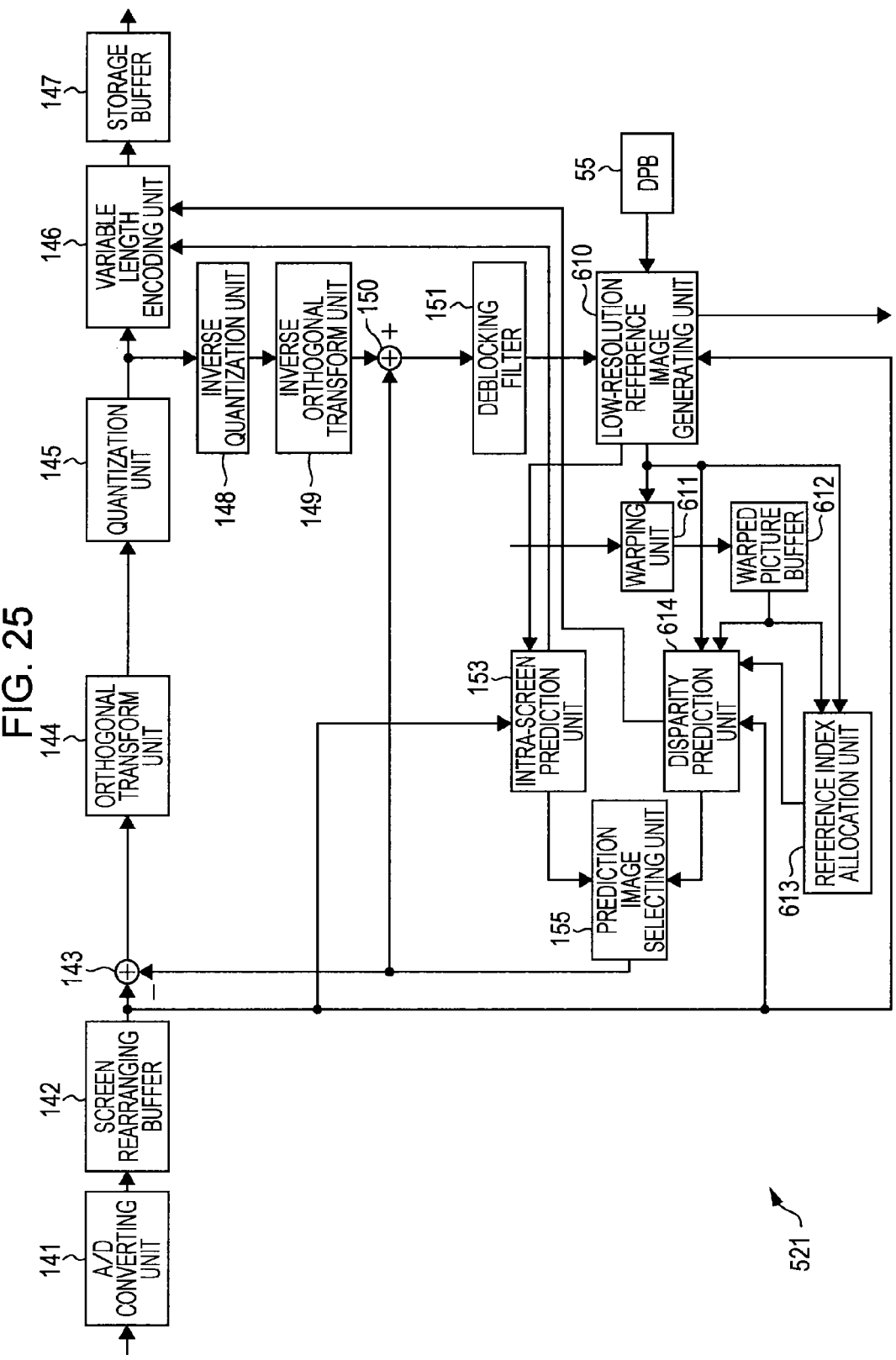
FIG. 25 is a block diagram illustrating a configuration example of another encoder in FIG. 18.

FIG. 25 is a block diagram illustrating a configuration example of the encoder 521 in FIG. 18.

Of the configuration illustrated in FIG. 25, the same configuration as the configuration in FIG. 7 is denoted with the same reference numeral. Redundant description will be omitted as appropriate.

The configuration of the encoder 521 in FIG. 25 differs from the configuration in FIG. 7 principally in that a low-resolution reference image generating unit 610 is provided instead of the low-resolution reference image generating unit 152, and in that there are newly provided a warping unit 611, a warped picture buffer 612, a reference index allocation unit 613, and a disparity prediction unit 614.

The warping unit 611, warped picture buffer 612, reference index allocation unit 613, and disparity prediction unit 614 perform the same processing as with the warping unit 574, warped picture buffer 575, reference index allocation unit 576, and disparity prediction unit 577 in FIG. 20 respectively except that processing is not performed on the disparity information image of the viewpoint B but on the color image of the viewpoint B.

Note that, in FIG. 25, the picture of the decoded viewpoint A color image is supplied to the DPB 55 from the deblocking filter 121, and is stored as a candidate picture which can become a reference picture.

Also, there are also supplied to and stored in the DPB 55 the picture of the color image of the viewpoint A encoded and subjected to local decoding at the encoder 51, the picture of the disparity information image of the viewpoint A encoded and subjected to local decoding at the encoder 53, and the picture of the disparity information image of the viewpoint B encoded and subjected to local decoding at the encoder 522.

However, with the encoder 521, in addition to the picture of the decoded viewpoint B color image from the deblocking filter 151, the decoded viewpoint A color image obtained and subject to resolution reduction processing at the encoder 51, and the decoded viewpoint A disparity information image obtained and subject to resolution reduction processing at the encoder 53 are used for encoding of the color image of the viewpoint B serving as an object to be encoded.

Specifically, pictures having the same point-in-time as with the current pictures of the decoded viewpoint A disparity information image and the decoded viewpoint A color image are read out from the DPB 55 by the warping unit 611, and supplied to the low-resolution reference image generating unit 610. Also, a picture having the same point-in-time as with the current picture of the decoded viewpoint A color image serving as a candidate picture to which a reference index has been allocated at the reference index allocation unit 613 is read out by the disparity prediction unit 614, and supplied to the low-resolution reference image generating unit 610.

The low-resolution reference image generating unit 610 detects the resolution of a predetermined picture read out from the screen rearranging buffer 142 in the same way as with the low-resolution reference image generating unit 152 in FIG. 7. The low-resolution reference image generating unit 610 performs predetermined filter processing on the pictures having the same point-in-time as with the current pictures of the decoded viewpoint A color image and the decoded viewpoint A disparity information image read out from the DPB 55, as resolution reduction processing. Thus, the resolution of the picture after resolution reduction processing becomes the same resolution as the detected resolution.

The low-resolution reference image generating unit 610 then supplies the picture having the same point-in-time as with the current picture of the decoded viewpoint A color image after resolution reduction processing to the warping unit 611 or disparity prediction unit 614. Also, the low-resolution reference image generating unit 610 supplies the picture having the same point-in-time as with the current picture of the decoded viewpoint A disparity information image after resolution reduction processing to the warping unit 611.

Note that, at the warping unit 611, the decoded viewpoint A disparity information image after resolution reduction processing is used for generating the picture of the warped viewpoint A color image which is a warped image where by subjecting the picture of the decoded viewpoint A color image after resolution reduction processing to warping, the picture of the decoded viewpoint A color image after resolution reduction processing thereof has been converted into an image (color image) to be obtained at the viewpoint B.

That is to say, the warping unit 611 converts, in the same way as with the warping unit 574 in FIG. 20, the disparity value v which is the pixel value of each pixel of the picture of the decoded viewpoint A disparity information image into a shooting disparity vector d1 for each pixel in accordance with Expression (2).

The warping unit 611 performs warping for moving each pixel of the picture of the decoded viewpoint A color image after resolution reduction processing in accordance with the shooting disparity vector d1 of the pixel thereof, thereby generating the picture of the warped viewpoint A color image.

Note that, in the event that a perforated occlusion portion where there is no pixel value occurs on the picture of the warped viewpoint A color image, the pixels of the occlusion portion are compensated with surrounding pixels.

Configuration Example of Disparity Prediction Unit

Figure 26:
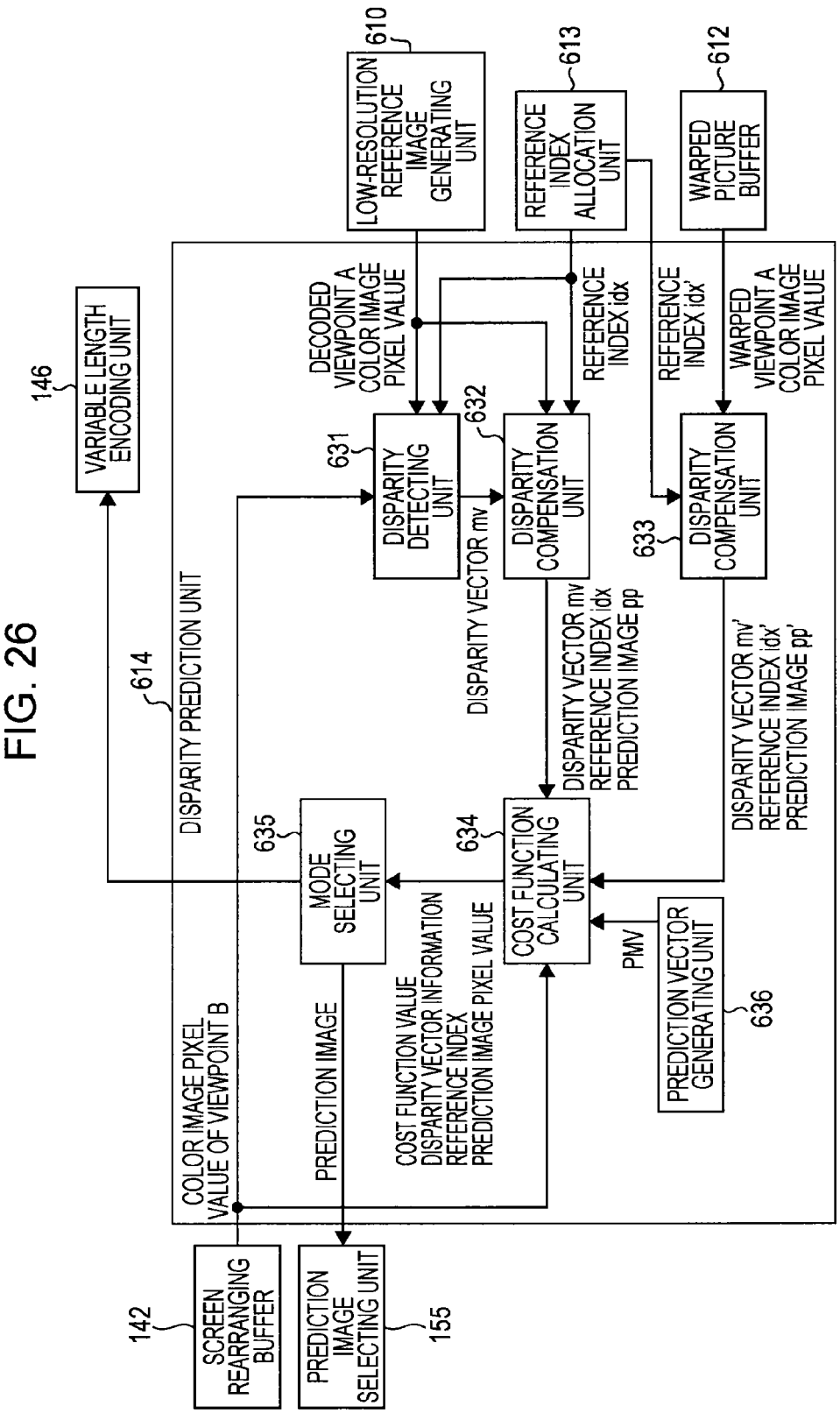
FIG. 26 is a block diagram illustrating a configuration example of a disparity prediction unit in FIG. 25.

FIG. 26 is a block diagram illustrating a configuration example of the disparity prediction unit 614 in FIG. 25.

In FIG. 26, the disparity prediction unit 614 includes a disparity detecting unit 631, disparity compensation units 632 and 633, a cost function calculating unit 634, a mode selecting unit 635, and a prediction vector generating unit 636.

The disparity detecting unit 631 through the prediction vector generating unit 636 perform the same processing as with the disparity detecting unit 591 through the prediction vector generating unit 596 in FIG. 22 respectively except that processing is performed with a color image as a target instead of a disparity information image.

Description of Processing of Encoder 521

Figure 27:
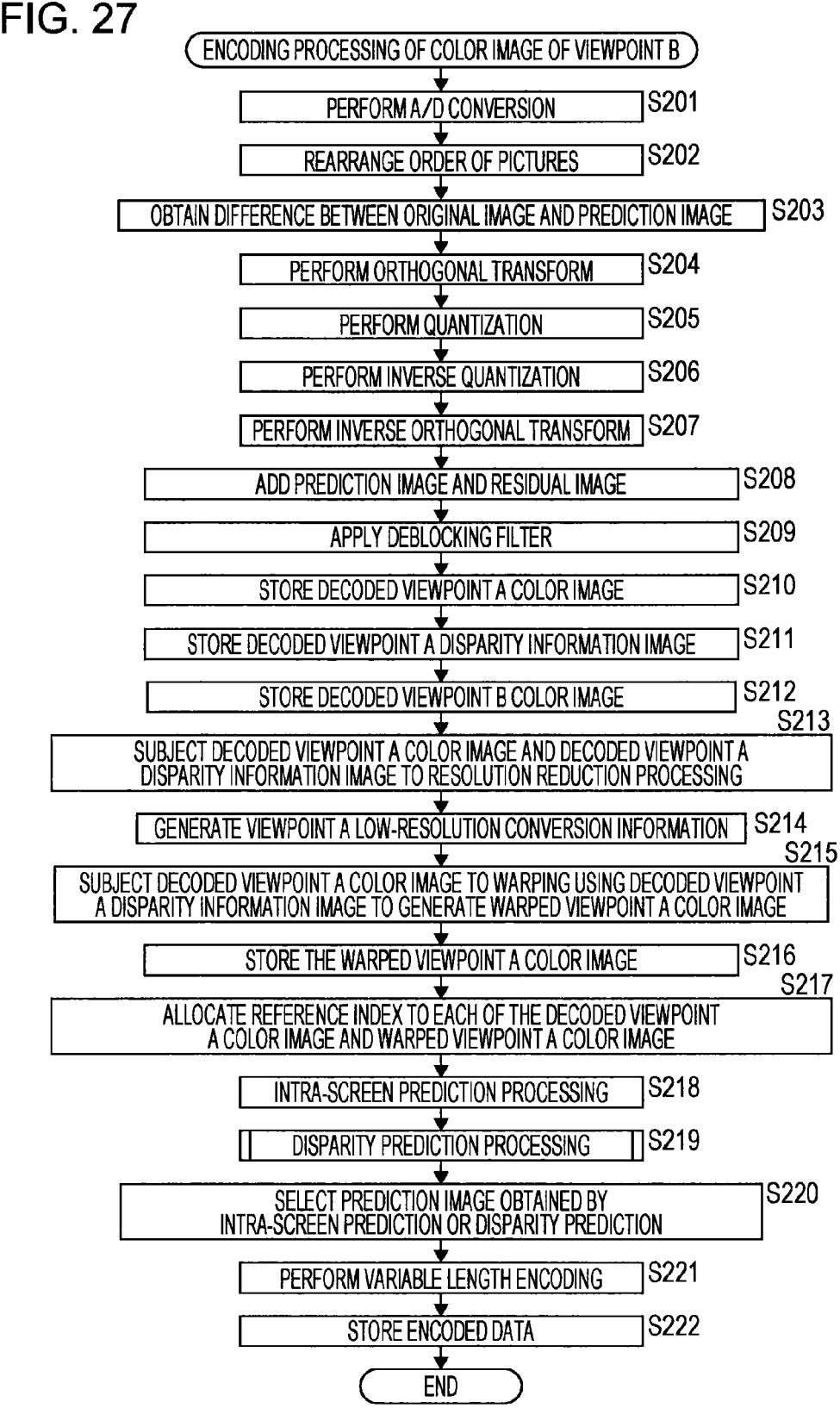
FIG. 27 is a flowchart for describing encoding processing to be performed by the encoder in FIG. 25.

FIG. 27 is a flowchart for describing encoding processing for encoding a color image of the viewpoint B that the encoder 521 in FIG. 25 performs.

With the encoder 521 in FIG. 25, according to the same processing being performed in steps S201 to S209 as the processing in steps S141 to S149 in FIG. 23 with a color image as a target instead of a disparity information image, the decoded viewpoint B color image obtained by filtering at the deblocking filter 151 is supplied to the DPB 55, and the processing proceeds to step S210.

In step S210, waiting for the decoded viewpoint A color image obtained by a color image of the viewpoint A being encoded and subjected to local decoding being supplied from the encoder 51 configured to encode a color image of the viewpoint A, the DPB 55 stores the decoded viewpoint A color image, and the processing proceeds to step S211.

In step S211, waiting for the decoded viewpoint A disparity information image obtained by the disparity information image of the viewpoint A being encoded and subjected to local decoding being supplied from the encoder 53 configured to encode the disparity information image of the viewpoint A, the DPB 55 stores the decoded viewpoint A disparity information image, and the processing proceeds to step S212.

In step S212, the DPB 55 stores the decoded viewpoint B color image from the deblocking filter 151, and the processing proceeds to step S213.

In step S213, the low-resolution reference image generating unit 610 subjects the pictures of the decoded viewpoint A color image and decoded viewpoint A disparity information image read out from the DPB 55 to resolution reduction processing based on the resolution detected from a predetermined picture of a color image of the viewpoint B. Thus, the low-resolution conversion processing unit 171 sets the resolutions of the pictures of the decoded viewpoint A color image and decoded viewpoint A disparity information image read out to the same as the resolution of the current picture. The low-resolution reference image generating unit 610 supplies the decoded viewpoint A color image after resolution reduction processing to the warping unit 611 or disparity prediction unit 614, and supplies the decoded viewpoint A disparity information image after resolution reduction processing to the warping unit 611.

Also, the low-resolution reference image generating unit 610 supplies, of the decoded image of the current picture to be read out from the DPB 55, a portion already subjected to local decoding to the intra-screen prediction unit 153 without change. The processing then proceeds from step S213 to step S214.

In step S214, the low-resolution reference image generating unit 610 generates viewpoint A low-resolution conversion information based on information such as the number of taps of the filter processing performed as resolution reduction processing, and supplies to the transmission unit 57 in FIG. 18. The processing then proceeds from step S214 to step S215.

In step S215, the warping unit 611 subjects the picture of the decoded viewpoint A color image after resolution reduction processing to warping using the picture of the decoded viewpoint A disparity information image after resolution reduction processing, thereby generating the picture of the warped viewpoint A color image. The warping unit 611 then supplies the picture of the warped viewpoint A color image to the warped picture buffer 612, and the processing proceeds to step S216.

Hereinafter, in steps S216 to S222, at the encoder 521, the same processes as with steps S155 to S161 in FIG. 23 are performed respectively with the color image as a target instead of the disparity information image.

Figure 28:
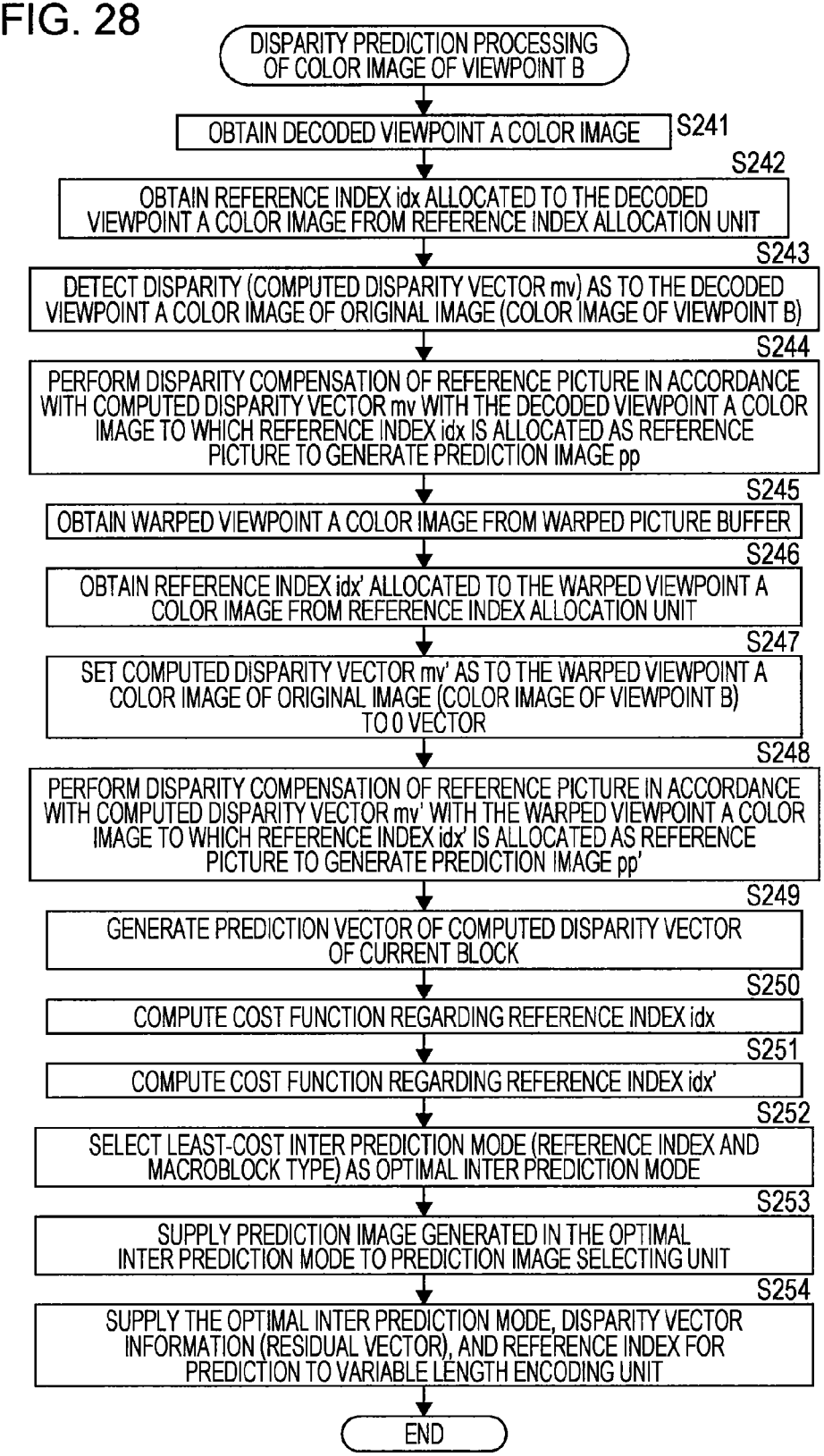
FIG. 28 is a flowchart for describing disparity prediction processing to be performed by the disparity prediction unit in FIG. 26.

FIG. 28 is a flowchart for describing disparity prediction processing that the disparity prediction unit 534 in FIG. 26 performs (in step S219 in FIG. 27).

At the disparity prediction unit 534 in FIG. 26, in steps S241 to S254, the same processes as with steps S171 to S184 in FIG. 24 are performed respectively with the color image as a target instead of the disparity information image.

As described above, the image processing system 500 performs encoding by lowering resolution of the viewpoint image B than the resolution of the viewpoint image A, and accordingly, the data amount of an object to be encoded can be reduced as compared to a case where the viewpoint image A and viewpoint image B having the same resolution are encoded. As a result thereof, the data amount of encoded data can be reduced. Also, the image processing system 500 references the viewpoint image A after resolution reduction processing and warping having the same resolution as the resolution of the viewpoint image B at the time of encoding of the viewpoint image B, and accordingly, encoding can be performed with a method employing the MVC format.

Configuration Example of Multi-Viewpoint Image Decoding Device

Figure 29:
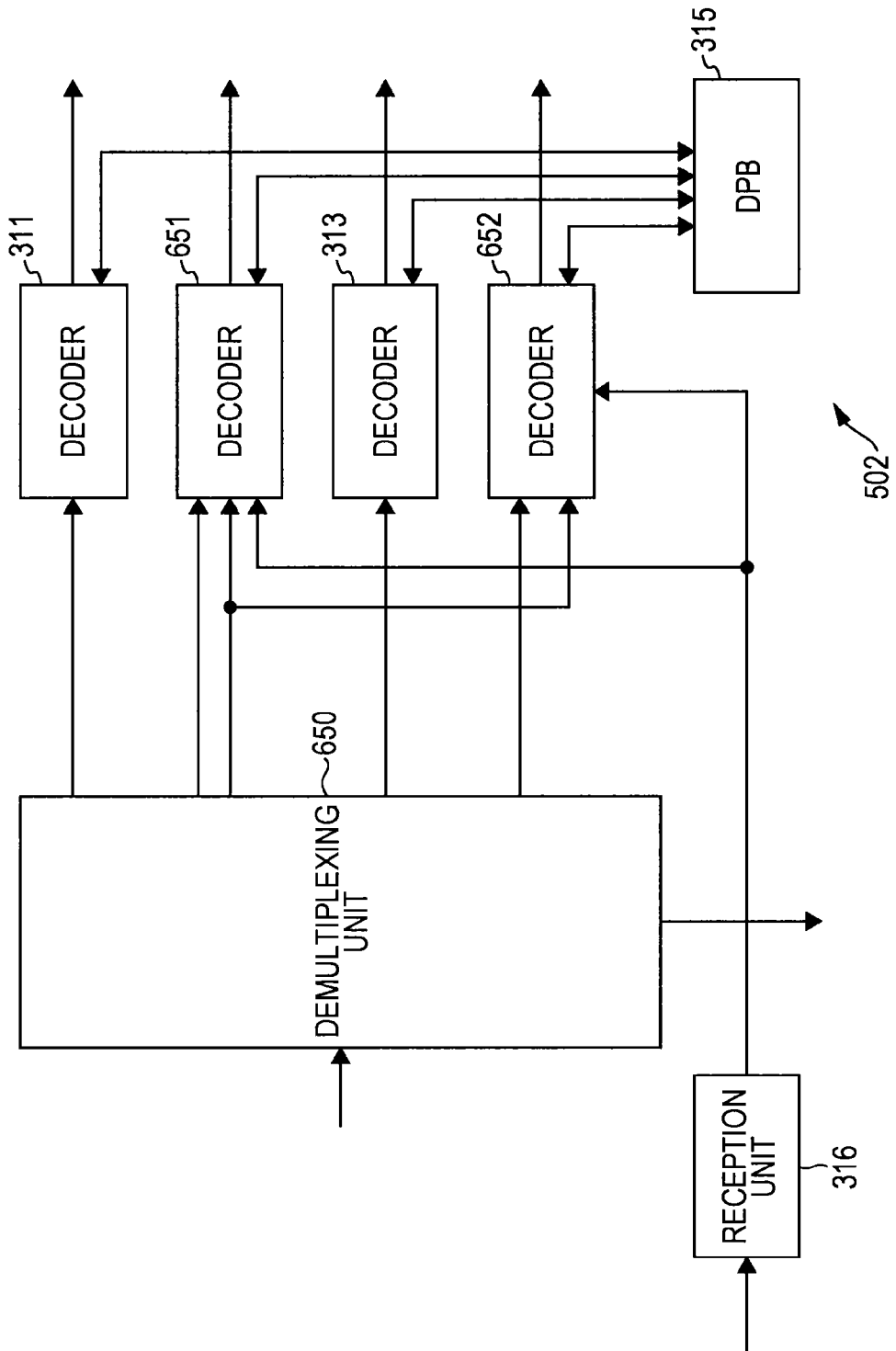
FIG. 29 is a block diagram illustrating a configuration example of a multi-viewpoint image decoding device in FIG. 16.

FIG. 29 is a block diagram illustrating a configuration example of the multi-viewpoint image decoding device 502 in FIG. 16.

Of configuration illustrated in FIG. 29, the same configuration as the configuration in FIG. 10 is denoted with the same reference numeral. Redundant description will be omitted as appropriate.

The configuration of the multi-viewpoint image decoding device 502 in FIG. 29 differs from the configuration in FIG. 10 principally in that a demultiplexing unit 650, decoder 651, and a decoder 652 are provided instead of the demultiplexing unit 310, decoder 312, and decoder 314.

The demultiplexing unit 650 of the multi-viewpoint image decoding device 502 receives the bitstream transferred from the multi-viewpoint image encoding device 501 in FIG. 16. The demultiplexing unit 650 separates, from the received bitstream, encoded data of a color image of the viewpoint A, encoded data of a color image of the viewpoint B, encoded data of a disparity information image of the viewpoint A, encoded data of a disparity information image of the viewpoint B, viewpoint B low-resolution conversion information, and disparity related information.

The demultiplexing unit 650 then supplies the encoded data of the color image of the viewpoint A to the decoder 311, encoded data of the color image of the viewpoint B to the decoder 651, encoded data of the disparity information image of the viewpoint A to the decoder 313, and encoded data of the disparity information image of the viewpoint B to the decoder 652, respectively. Also, the demultiplexing unit 650 supplies the disparity related information to the decoder 651 and decoder 652. Further, the demultiplexing unit 650 supplies the viewpoint B low-resolution conversion information to the image inverse conversion processing device 14 in FIG. 16.

Configuration Example of Decoder 652

Figure 30:
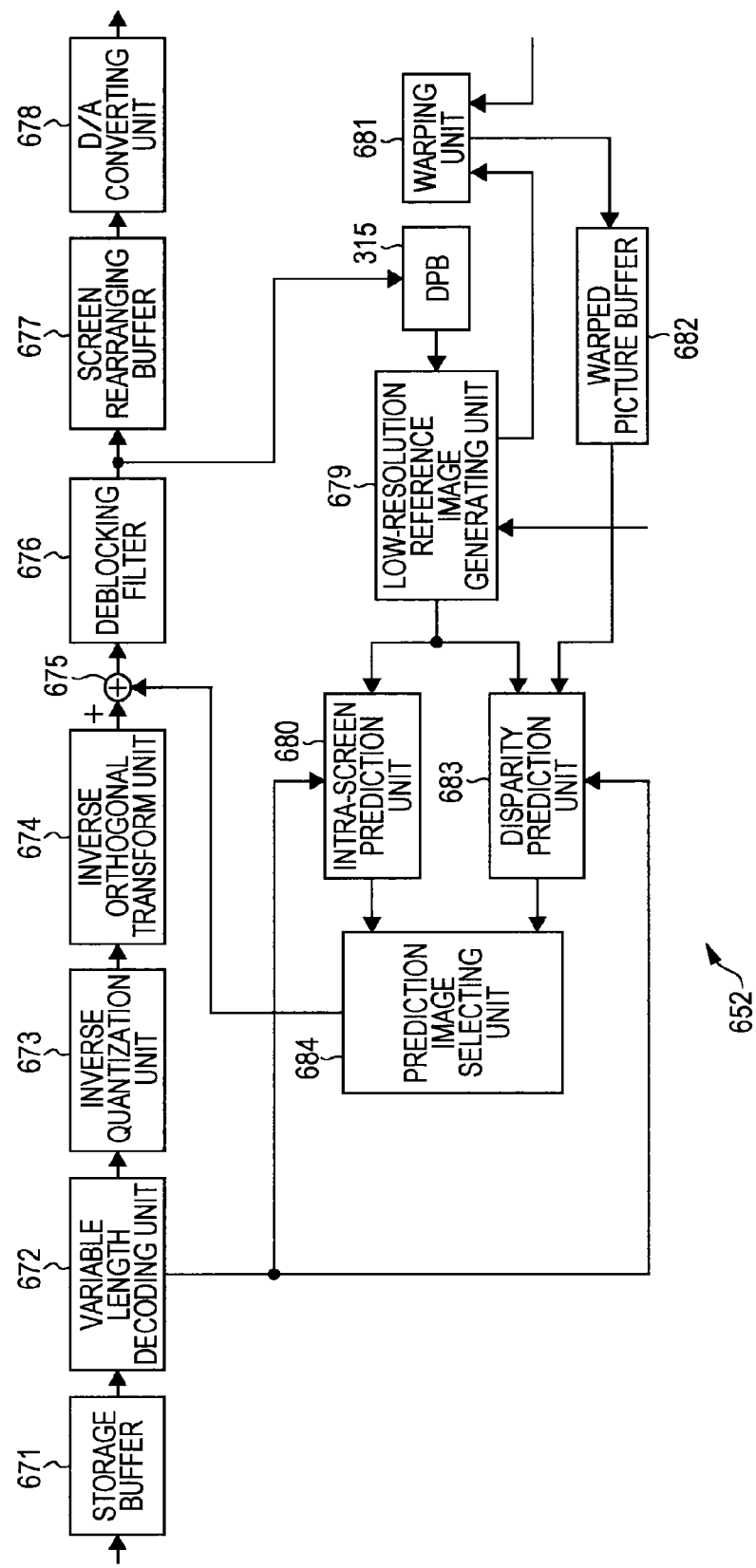
FIG. 30 is a block diagram illustrating a configuration example of a decoder in FIG. 29.

FIG. 30 is a block diagram illustrating a configuration example of the decoder 652 in FIG. 29.

The decoder 652 subjects the encoded data of the disparity information image of the viewpoint B which is an object to be decoded to local decoding using the MVC format, that is, in the same way as with local decoding to be performed at the encoder 522 in FIG. 20.

In FIG. 30, the decoder 652 includes a storage buffer 671, a variable length decoding unit 672, an inverse quantization unit 673, an inverse orthogonal transform unit 674, a deblocking filter 676, a screen rearranging buffer 677, a D/A converting unit 678, an intra-screen prediction unit 680, a low-resolution reference image generating unit 679, a warping unit 681, a warped picture buffer 682, a disparity prediction unit 683, and a prediction image selecting unit 684.

The storage buffer 671 through the intra-screen prediction unit 680, and the prediction image selecting unit 684 are configured in the same way as with the storage buffer 371 through the intra-screen prediction unit 380, and the prediction image selecting unit 382 in FIG. 12, and accordingly, description thereof will be omitted as appropriate.

In FIG. 30, supplied to the DPB 315 from the deblocking filter 676 is a decoded image, that is, the picture of the decoded viewpoint B disparity information image which is the disparity information image of the viewpoint B decoded at the decoder 652, and is stored as a candidate picture which can become a reference picture.

Also, supplied to and stored in the DPB 315 are the picture of the color image of the viewpoint A decoded at the decoder 311, the picture of the color image of the viewpoint B decoded at the decoder 651, and the picture of the disparity information image of the viewpoint A decoded at the decoder 313.

However, at the decoder 652, in addition to the picture of the decoded viewpoint B disparity information image from the deblocking filter 676, the decoded viewpoint A disparity information image obtained at the decoder 313 is used for decoding of the encoded data of the disparity information image of the viewpoint B which is an object to be decoded.

In the event that the current block is encoded using a prediction image generated by intra prediction, of a picture (current picture) including the current block, an already decoded portion (decoded image) is read out from the DPB 315 by the intra-screen prediction unit 680 as a prediction image of the current block, and is supplied to the intra-screen prediction unit 680 via the low-resolution reference image generating unit 679.

In the event that the current block is encoded using a prediction image generated by disparity prediction, a candidate picture of the decoded viewpoint A disparity information image corresponding to the optimal inter prediction mode included in the header information is read out from candidate pictures stored in the DPB 315 by the warping unit 681 and disparity prediction unit 683 as a reference picture, and is supplied to the warping unit 681 and disparity prediction unit 683 via the low-resolution reference image generating unit 679.

Supplied to the warping unit 681 are the maximum value dmax and minimum value dmin of the shooting disparity vector d (the shooting disparity vector d1 of the viewpoint A), base length L, and focal distance f serving as the disparity related information from the demultiplexing unit 650.

The warping unit 681 obtains (reads out) the picture of the decoded viewpoint A disparity information image after resolution reduction processing from the DPB 315 via the low-resolution reference image generating unit 679.

The warping unit 681 then subjects, in the same way as with the warping unit 574 in FIG. 20, the picture of the decoded viewpoint A disparity information image after resolution reduction processing obtained from the DPB 315 to warping using the disparity related information as appropriate, thereby generating the picture of the warped viewpoint A disparity information image. The warping unit 681 supplies the picture of the warped viewpoint A disparity information image thereof to the warped picture buffer 682.

The warped picture buffer 682 temporarily stores the picture of the warped viewpoint A disparity information image from the warping unit 681.

Note that, with the present embodiment, aside from the DPB 315, though there is provided the warped picture buffer 682 configured to store the picture of a warped viewpoint A disparity information image, the DPB 315 and warped picture buffer 682 may be shared with one buffer.

The disparity prediction unit 683 recognizes whether or not the current block has been encoded with a prediction image generated by disparity prediction (inter prediction) based on the header information from the variable length decoding unit 672.

In the event that the current block has been encoded with a prediction image generated by disparity prediction, the disparity prediction unit 683 recognizes (obtains) a reference index for prediction, that is, a reference index allocated to the reference picture used for generation of a prediction image of the current block based on the header information from the variable length decoding unit 672.

The disparity prediction unit 683 selects, of the picture of a decoded viewpoint A disparity information image after resolution reduction processing serving as a candidate picture supplied from the low-resolution reference image generating unit 679, and the picture of a warped viewpoint A disparity information image serving as a candidate picture stored in the warped picture buffer 682, a candidate picture to which a reference index for prediction has been allocated as a reference picture.

Further, the disparity prediction unit 683 recognizes a computed disparity vector serving as a shift vector used for generation of a prediction image of the current block based on the header information from the variable length decoding unit 672, and generates a prediction image by performing disparity prediction in accordance with the computed disparity vector thereof in the same way as with the disparity prediction unit 577 in FIG. 20.

Specifically, the disparity prediction unit 683 obtains, of a candidate picture, a block (corresponding block) in a position moved (shifted) from the position of the current block in accordance with the computed disparity vector of the current block thereof, as a prediction image.

The disparity prediction unit 683 then supplies the prediction image to the prediction image selecting unit 684.

Note that, in FIG. 30, in order to simplify description, in the same way as with the case of the encoder 522 in FIG. 20, the disparity prediction unit 683 configured to perform disparity prediction of inter prediction is provided to the decoder 652, but in the event that the encoder 522 in FIG. 20 also performs time prediction in addition to disparity prediction, at the decoder 652 as well, in the same way as with the encoder 522, (generation of a prediction image according to) disparity prediction and time prediction are performed.

Figure 31:
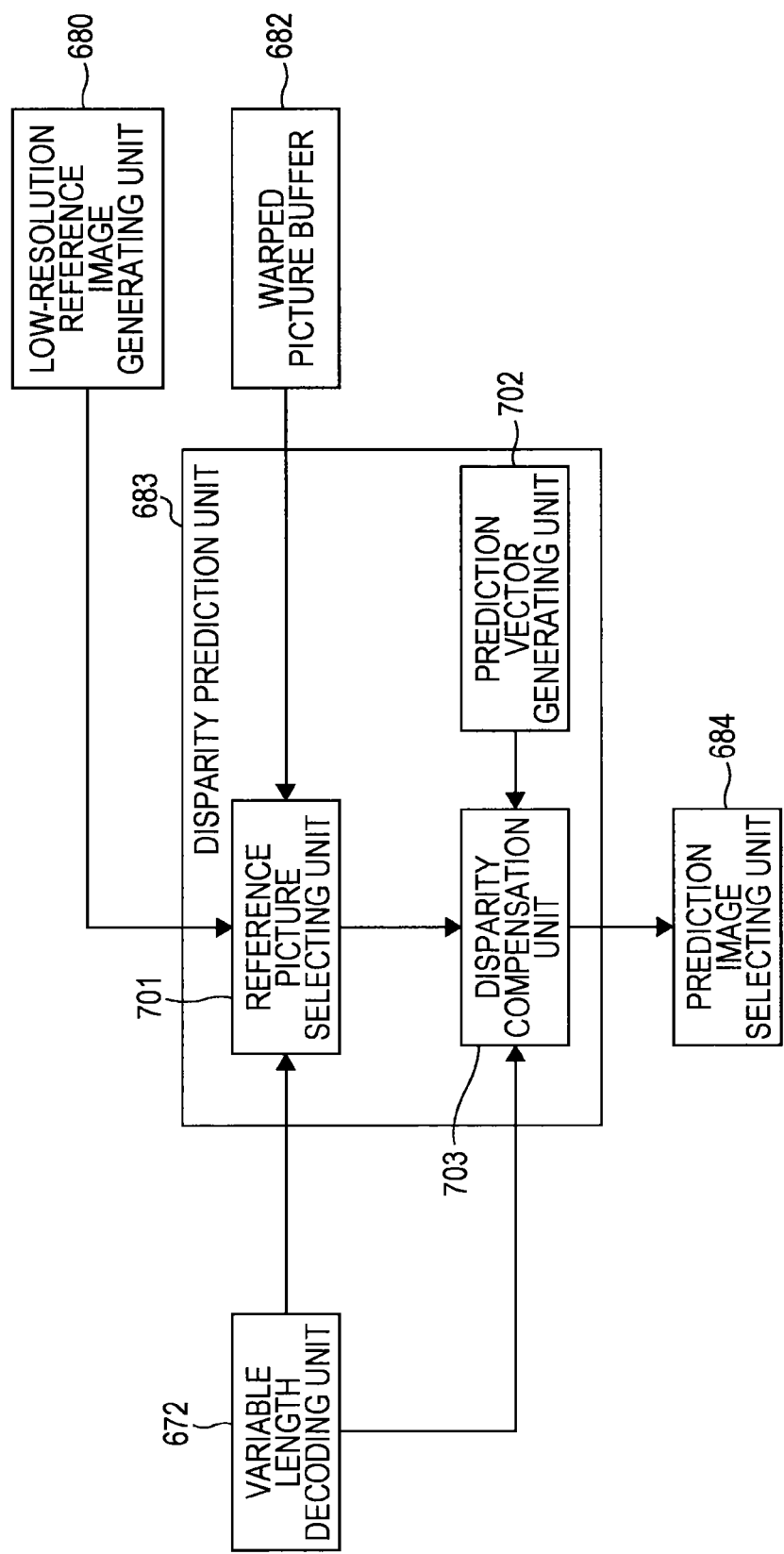
FIG. 31 is a block diagram illustrating a configuration example of a disparity prediction unit in FIG. 30.

FIG. 31 is a block diagram illustrating a configuration example of the disparity prediction unit 683 in FIG. 30.

In FIG. 31, the disparity prediction unit 683 includes a reference picture selecting unit 701, a prediction vector generating unit 702, and a disparity compensation unit 703.

Supplied to the reference picture selecting unit 701 are the picture of a decoded viewpoint A disparity information image subjected to resolution reduction processing by the low-resolution reference image generating unit 679, and a warped viewpoint B disparity information image picture stored in the warped picture buffer 682.

Further, supplied to the reference picture selecting unit 701 is a reference index for prediction of the current block included in the header information from the variable length decoding unit 672.

The reference picture selecting unit 701 takes the picture of a decoded viewpoint A disparity information image subjected to resolution reduction processing by the low-resolution reference image generating unit 679, and a warped viewpoint B disparity information image picture stored in the warped picture buffer 682 as candidates (candidate pictures) of a reference picture, selects, of the picture of a decoded viewpoint A disparity information image and a warped viewpoint B disparity information image picture thereof, a picture to which the reference index for prediction from the variable length decoding unit 672 has been allocated, as a reference picture, and supplies to the disparity compensation unit 703 along with the reference index for prediction from the variable length decoding unit 672.

The prediction vector generating unit 702 generates a prediction vector in the same way as with the prediction vector generating unit 596 in FIG. 22, and supplies to the disparity compensation unit 703.

Supplied to the disparity compensation unit 703 are the reference picture to which the reference index for prediction has been allocated from the reference picture selecting unit 701, the prediction vector from the prediction vector generating unit 702, and the optimal inter prediction mode and disparity vector information included in the header information.

The disparity compensation unit 703 decodes a shift vector serving as the computed disparity vector of the current block by adding a residual vector which is the disparity vector information from the variable length decoding unit 672, and the prediction vector from the prediction vector generating unit 702.

Further, the disparity compensation unit 703 performs shift compensation (disparity compensation) of the reference picture from the reference picture selecting unit 701 in accordance with the optimal inter prediction mode using the computed disparity vector of the current block in the same way as with the MVC format, thereby generating a prediction image of the current block.

That is to say, the disparity compensation unit 703 obtains, of the reference picture, a corresponding block which is a block in a position shifted from the position of the current block just by the computed disparity vector as a prediction image, for example.

The disparity compensation unit 703 then supplies the prediction image to the prediction image selecting unit 684.

Note that, with regard to a skip macroblock, neither residual nor shift vector information are encoded. Accordingly, in the event that the current block is a skip macroblock, the prediction vector is employed as a shift vector of the skip macroblock without change, and a copy of the block (corresponding block) in a position shifted from the position of the skip macroblock of the reference picture just by the shift vector is taken as a decoding result of the skip macroblock.

Description of Processing of Decoder 652

Figure 32:
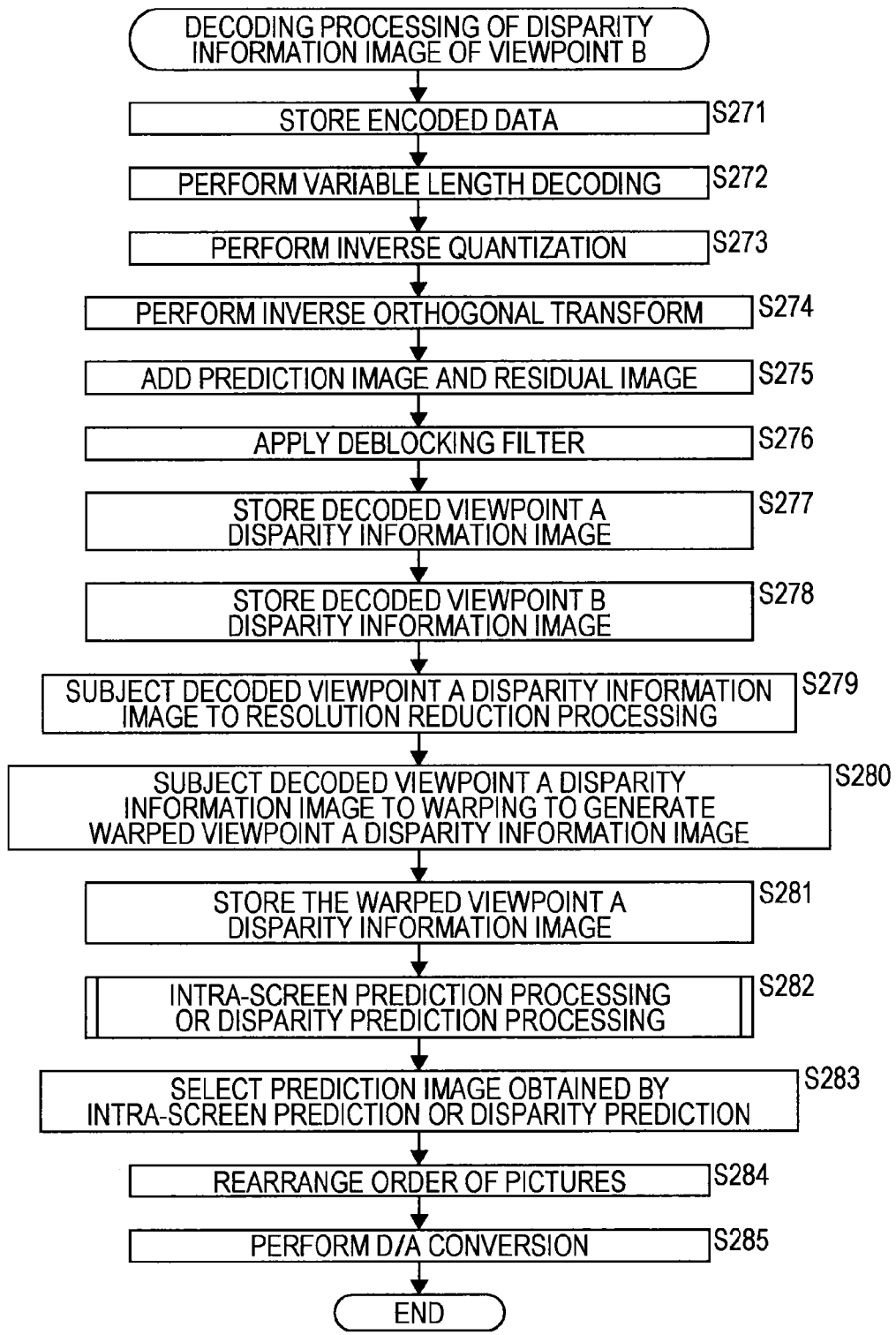
FIG. 32 is a flowchart for describing decoding processing to be performed by a decoder in FIG. 30.

FIG. 32 is a flowchart for describing decoding processing for decoding encoded data of the disparity information image of the viewpoint B that the decoder 652 in FIG. 30 performs.

Processing in steps S271 to S279 is the same as processing in step S111 to S119 in FIG. 14 except that an object to be processed is not a color image but a disparity information image, and accordingly, description will be omitted.

After the processing in step S279, in step S280 the warping unit 681 subjects the picture of the decoded viewpoint A disparity information image after resolution reduction processing from the low-resolution reference image generating unit 679 to warping using the disparity related information as appropriate, thereby generating the picture of the warped viewpoint A disparity information image. The warping unit 681 then supplies the picture of the warped viewpoint A disparity information image to the warped picture buffer 682, and the processing proceeds to step S281.

In step S281, the warped picture buffer 682 stores the picture of the warped viewpoint A disparity information image from the warping unit 681, and the processing proceeds to step S282.

In step S282, the intra-screen prediction unit 680 and disparity prediction unit 683 recognizes whether the next current block (macroblock to be decoded next) has been encoded with a prediction image generated by which prediction method of intra prediction (intra-screen prediction) and disparity prediction (inter prediction) based on the header information supplied from the variable length decoding unit 672.

In the event that the next current block has been encoded with a prediction image generated by intra-screen prediction, the intra-screen prediction unit 680 performs intra prediction processing (intra-screen prediction processing), and supplies a prediction image obtained as a result thereof to the prediction image selecting unit 684. The processing then proceeds from step S282 to step S283.

Also, in the event that the next current block has been encoded with a prediction image generated by disparity prediction (inter prediction), the disparity prediction unit 683 performs disparity prediction processing (inter prediction processing).

Specifically, the disparity prediction unit 683 selects, regarding the next current block, of the picture of a decoded viewpoint A disparity information image after resolution reduction processing, and the picture of a warped viewpoint B disparity information image stored in the warped picture buffer 682, a picture to which the reference index for prediction of the next current block has been allocated included in the header information from the variable length decoding unit 672 as a reference picture.

Further, the disparity prediction unit 683 generates a prediction image by performing disparity prediction (disparity compensation) using the optimal inter prediction mode and disparity vector information included in the header information from the variable length decoding unit 672, and supplies the prediction image thereof to the prediction image selecting unit 684. The processing then proceeds from step S282 to step S283.

In step S283, the prediction image selecting unit 684 selects, of the intra-screen prediction unit 680 and disparity prediction unit 683, from one from which a prediction image has been supplied, the prediction image thereof, and supplies to the computing unit 675, and the processing proceeds to step S284.

Here, the prediction image that the prediction image selecting unit 684 selects in step S283 will be used for the processing in step S275 to be performed at the time of decoding of the next current block.

In step S284, the screen rearranging buffer 677 rearranges the order of pictures so as to obtain the original order by temporarily storing and reading out the picture of the decoded disparity information image from the deblocking filter 676, supplies to the D/A converting unit 678, and the processing proceeds to step S285.

In step S285, the D/A converting unit 348 subjects, in the event that there is a need to output the picture from the screen rearranging buffer 677 as analog signals, the picture thereof to D/A conversion and outputs.

At the decoder 652, the processing in the above steps S271 to S285 is repeatedly performed as appropriate.

Figure 33:
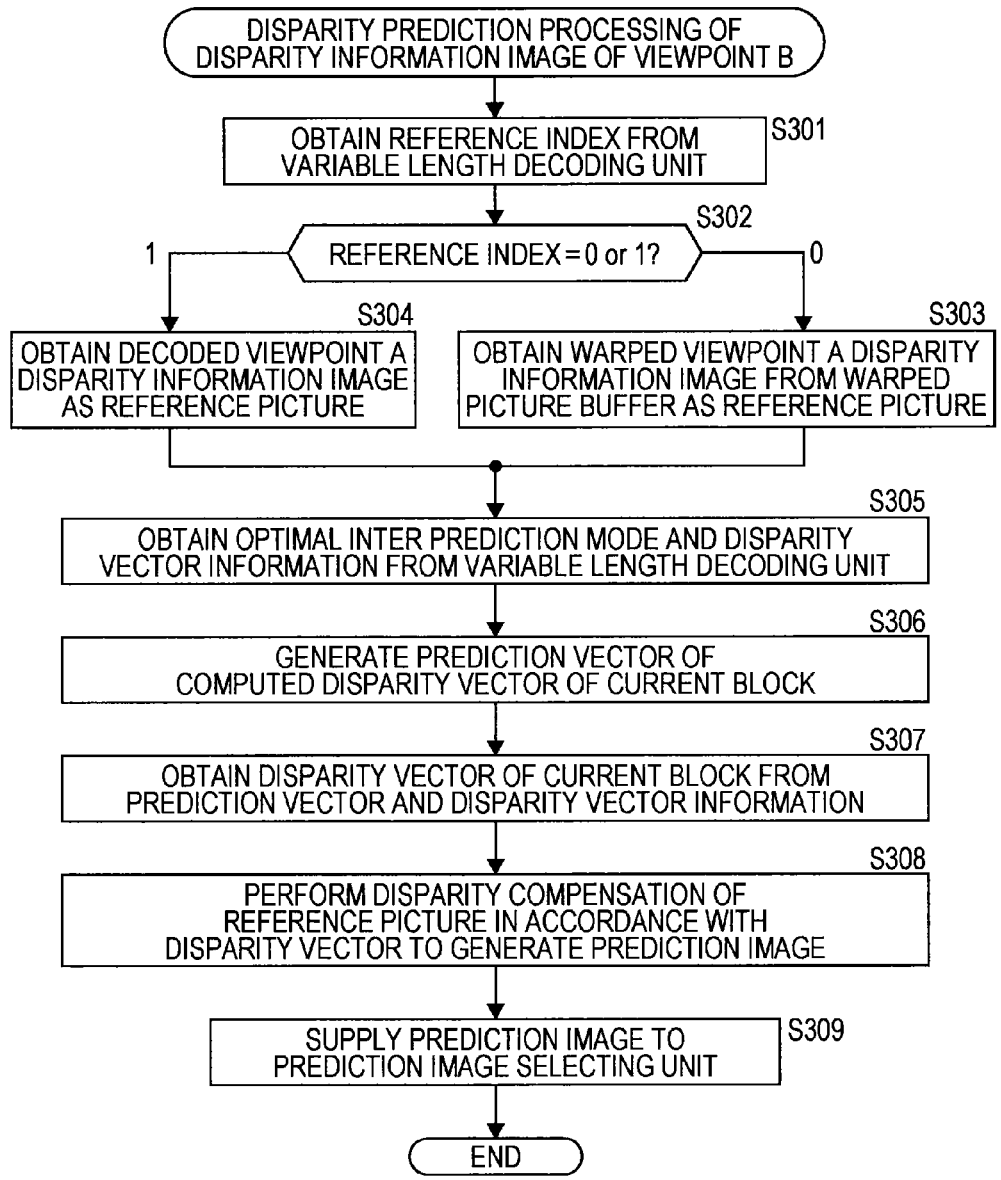
FIG. 33 is a flowchart for describing disparity prediction processing in FIG. 32.

FIG. 33 is a flowchart for describing disparity prediction processing that the disparity prediction unit 683 in FIG. 31 performs in step S282 in FIG. 32.

In step S301, the reference picture selecting unit 701 of the disparity prediction unit 683 obtains the reference index for prediction of the (next) current block included in the header information from the variable length decoding unit 672, and the processing proceeds to step S302.

In step S302, the reference picture selecting unit 701 determines the value of the reference index for prediction.

In the event that determination is made in step S302 that the reference index for prediction is 0, the processing proceeds to step S303, where the reference picture selecting unit 701 obtains of the picture of a decoded viewpoint A disparity information image after resolution reduction processing and the picture of a warped viewpoint B disparity information image which are candidate pictures, the picture of the warped viewpoint B disparity information image to which the reference index having a value of 0 has been allocated, from the warped picture buffer 682.

The reference picture selecting unit 701 supplies the picture of the warped viewpoint B disparity information image to the disparity compensation unit 703 as a reference picture, and the processing proceeds from step S303 to step S305.

Also, in the event that determination is made in step S302 that the reference index for prediction is 1, the processing proceeds to step S304, where the reference picture selecting unit 701 obtains of the picture of a decoded viewpoint A disparity information image after resolution reduction processing and the picture of a warped viewpoint B disparity information image which are candidate pictures, the picture of the decoded viewpoint A disparity information image after resolution reduction processing to which the reference index having a value of 1 has been allocated, from the DPB 315 via the low-resolution reference image generating unit 679.

The reference picture selecting unit 701 supplies the picture of the decoded viewpoint A disparity information image after resolution reduction processing to the disparity compensation unit 703 as a reference picture, and the processing proceeds from step S304 to step S305.

In step S305, the disparity compensation unit 703 obtains the optimal inter prediction mode and disparity vector information (residual vector) included in the header information from the variable length decoding unit 672, and the processing proceeds to step S306.

In step S306, the prediction vector generating unit 702 generates a prediction vector, and supplies to the disparity compensation unit 703, and the processing proceeds to step S307.

In step S307, the disparity compensation unit 703 decodes a shift vector serving as the computed disparity vector of the current block by adding the residual vector which is disparity vector information from the variable length decoding unit 672, and the prediction vector from the prediction vector generating unit 702, and the processing proceeds from step S307 to step S308.

In step S308, the disparity compensation unit 703 performs shift compensation (disparity compensation) of the reference picture from the reference picture selecting unit 701 using the computed disparity vector of the current block in accordance with the optimal inter prediction mode, thereby generating a prediction image of the current block, and the processing proceeds to step S309.

In step S309, the disparity compensation unit 703 supplies the prediction image to the prediction image selecting unit 684, and the processing returns.

Configuration Example of Decoder 651

Figure 34:
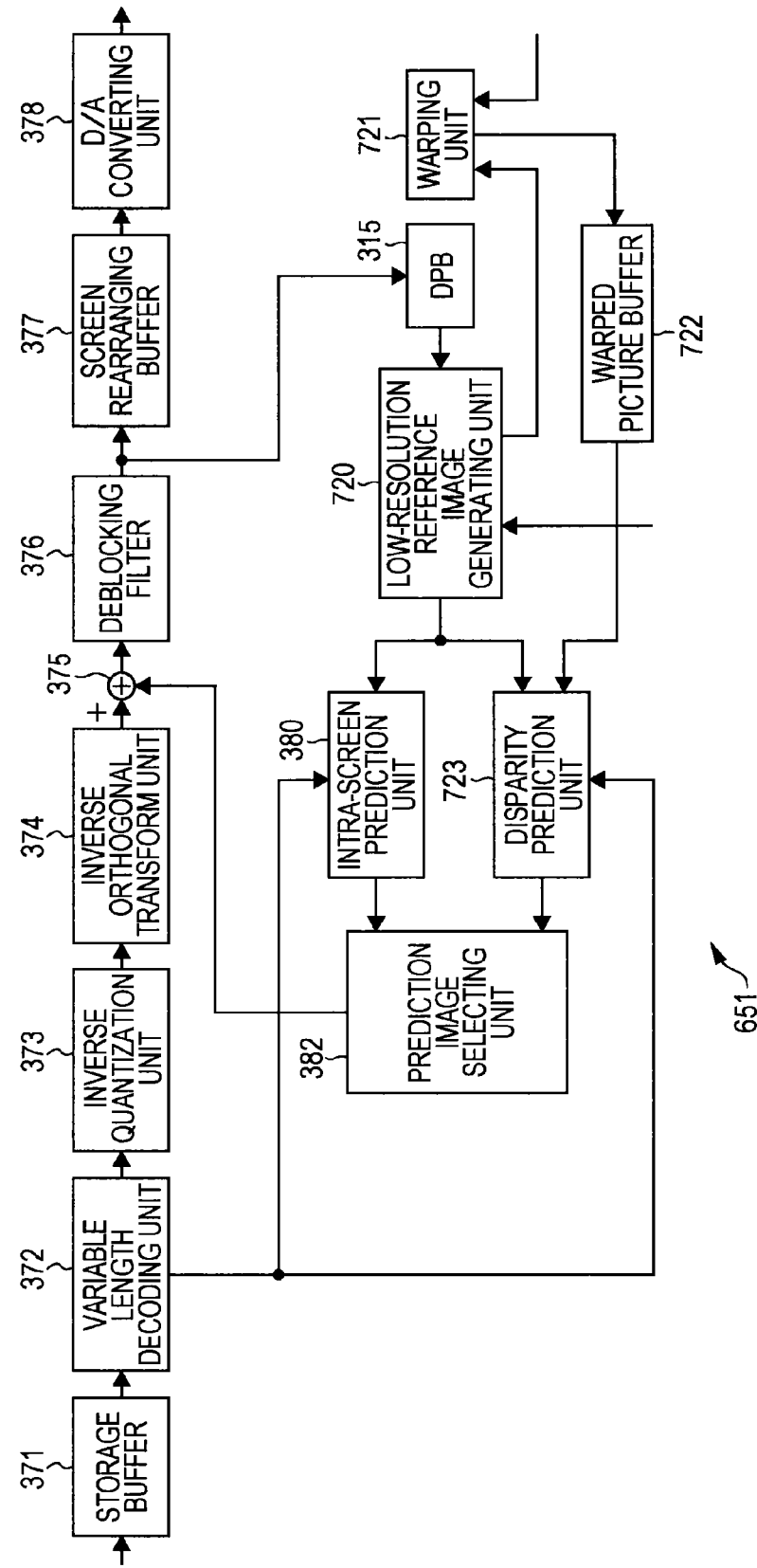
FIG. 34 is a block diagram illustrating a configuration example of the decoder in FIG. 29.

FIG. 34 is a block diagram illustrating a configuration example of the decoder 651 in FIG. 29.

Of the configuration illustrated in FIG. 34, the same configuration as the configuration in FIG. 12 is denoted with the same reference numeral. Redundant description will be omitted as appropriate.

The configuration of the decoder 652 in FIG. 34 differs from the configuration in FIG. 12 principally in that a low-resolution reference image generating unit 720 is provided instead of the low-resolution reference image generating unit 379, and in that a warping unit 721, a warped picture buffer 722, and a disparity prediction unit 723 are newly provided.

Note that, in FIG. 34, from the deblocking filter 376, the picture of a decoded image, that is, a decoded viewpoint B color image which is a color image of the viewpoint B decoded at the decoder 651 is supplied to and stored in the DPB 315 as a candidate picture which can become a reference picture.

Also, supplied to and stored in the DPB 315 are the picture of the color image of the viewpoint A decoded at the decoder 311 (decoded viewpoint A color image), the picture of the disparity information image of the viewpoint A decoded at the decoder 313 (decoded viewpoint A disparity information image), and the picture of the disparity information image of the viewpoint B decoded at the decoder 652 (decoded viewpoint B disparity information image).

However, at the decoder 651, in addition to the decoded image from the deblocking filter 376, the pictures of the decoded viewpoint A color image obtained at the decoder 311, and the decoded viewpoint A disparity information image obtained at the decoder 313 are subjected to resolution reduction processing, and are used for decoding of a color image of the viewpoint B which is an object to be decoded.

Specifically, the pictures of the viewpoint images A (decoded viewpoint A color image and decoded viewpoint A disparity information image) decoded as candidate pictures are read out from the DPB 315. The low-resolution reference image generating unit 720 subjects the pictures of the viewpoint images A read out from the DPB 315 to predetermined filter processing as resolution reduction processing based on the viewpoint A low-resolution conversion information supplied from the reception unit 316. Thus, the low-resolution reference image generating unit 720 sets the resolutions of the pictures of the viewpoint images A to the same as the resolution of a color image of the viewpoint image B. The low-resolution reference image generating unit 720 supplies the decoded viewpoint A color image after resolution reduction processing to the warping unit 721 and disparity prediction unit 723, and supplies the decoded viewpoint A disparity information image after resolution reduction processing to the warping unit 721.

Note that the decoded viewpoint A disparity information image after resolution reduction processing is used for generating the picture of a warped viewpoint A color image by subjecting the picture of a decoded viewpoint A color image to warping at the warping unit 721 in the same way as with the warping unit 611 in FIG. 25.

Also, the low-resolution reference image generating unit 720 supplies a portion of a decoded image of the current picture read out from the DPB 315 to the intra-screen prediction unit 380 without change in the same way as with the low-resolution reference image generating unit 379 in FIG. 12.

The warping unit 721 through the disparity prediction unit 723 perform the same processing as with the warping unit 681 through the disparity prediction unit 683 of the decoder 652 in FIG. 30 respectively except that processing is performed with a color image as a target instead of a disparity information image.

Configuration Example of Disparity Prediction Unit 723

Figure 35:
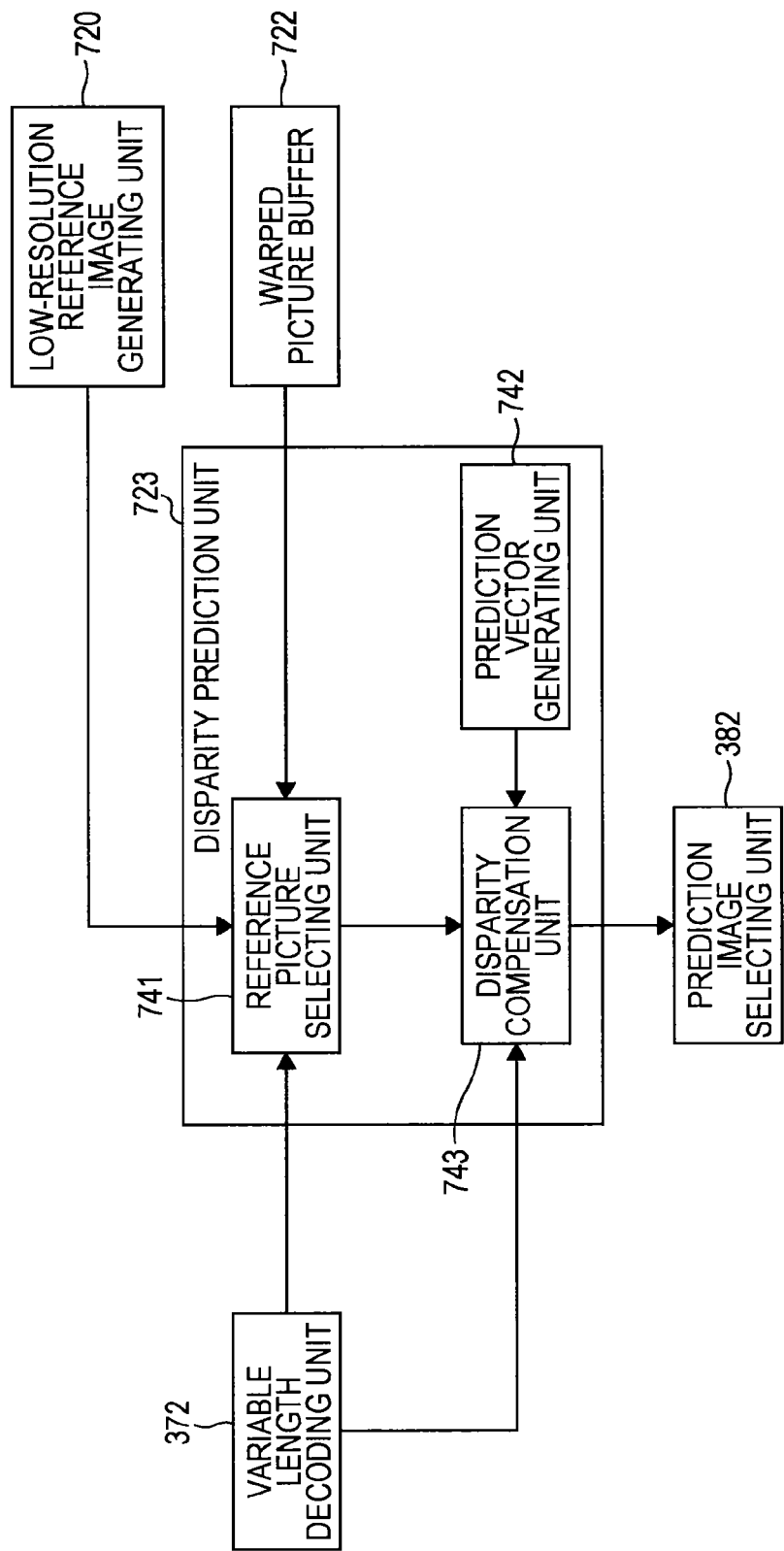
FIG. 35 is a block diagram illustrating a configuration example of a disparity prediction unit in FIG. 34.

FIG. 35 is a block diagram illustrating a configuration example of the disparity prediction unit 723 in FIG. 34.

In FIG. 35, the disparity prediction unit 723 includes a reference picture selecting unit 741, a prediction vector generating unit 742, and a disparity compensation unit 743.

The reference picture selecting unit 741 through the disparity compensation unit 743 perform the same processing as with the reference picture selecting unit 701 through the disparity compensation unit 703 of the disparity prediction unit 683 in FIG. 31 respectively except that processing is performed with a color image as a target instead of a disparity information image.

Description of Processing of Decoder 651

Figure 36:
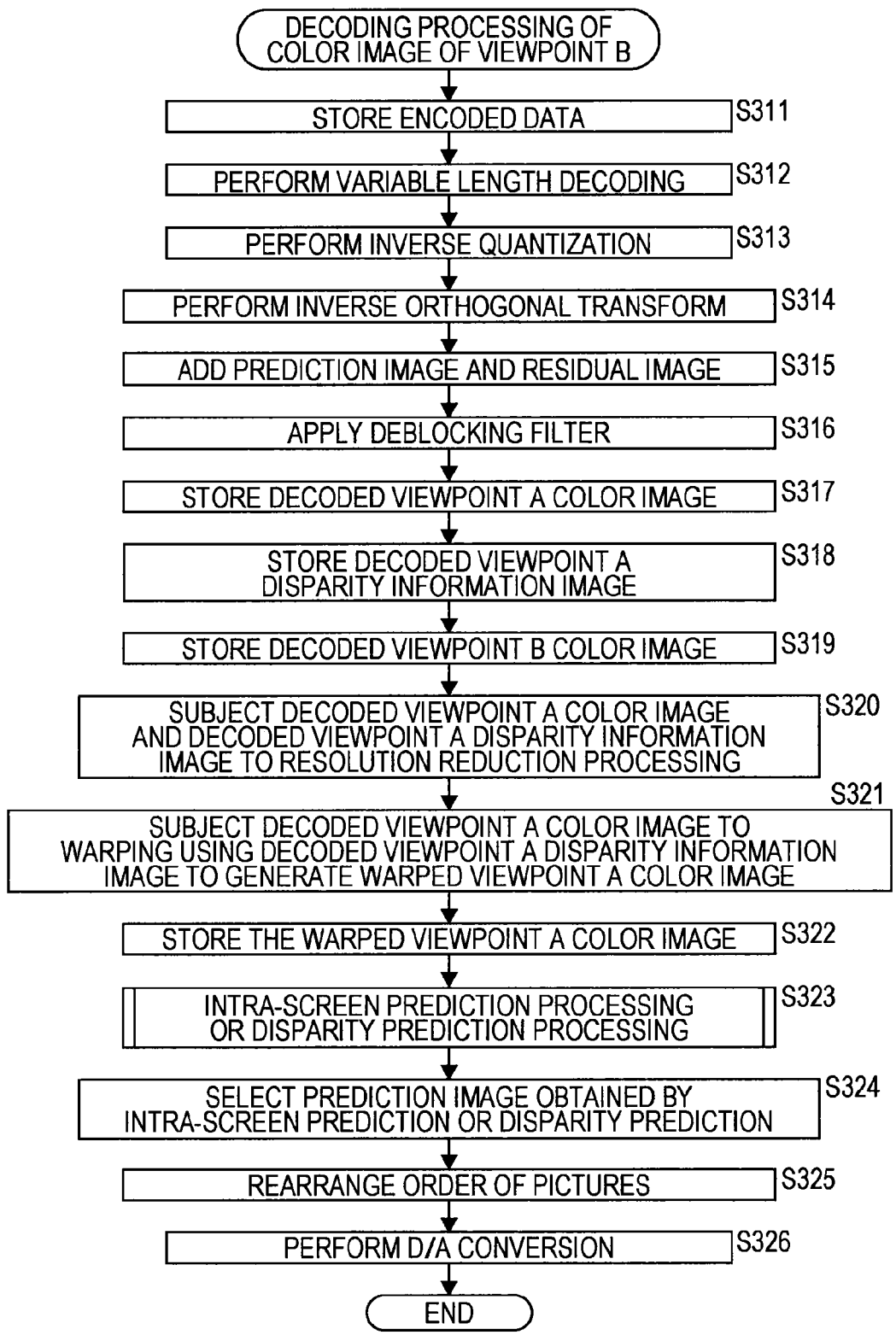
FIG. 36 is a flowchart for describing decoding processing to be performed by a decoder in FIG. 34.

FIG. 36 is a flowchart for describing decoding processing for decoding encoded data of a color image of the viewpoint B that the decoder 651 in FIG. 34 performs.

With the decoder 651 in FIG. 34, in steps S311 to S316, the same processing is performed as with steps S271 to S276 in FIG. 32 with a color image as a target instead of a disparity information image respectively, and accordingly, a decoded viewpoint B color image obtained by filtering at the deblocking filter 376 is supplied to the DPB 315, and the processing proceeds to step S317.

In step S317, the DPB 315 waits for a decoded viewpoint A color image being supplied from the decoder 311 configured to decode a color image of the viewpoint A, and stores the decoded viewpoint A color image thereof, and the processing proceeds to step S318.

In step S318, the DPB 315 waits for a decoded viewpoint A disparity information image being supplied from the decoder 313 configured to decode the disparity information image of the viewpoint A, and stores the decoded viewpoint A disparity information image thereof, and the processing proceeds to step S319.

In step S319, the DPB 315 stores the decoded viewpoint B color image from the deblocking filter 376, and the processing proceeds to step S320.

In step S320, the low-resolution reference image generating unit 720 subjects the pictures of the decoded viewpoint A color image and decoded viewpoint A disparity information image to be read out from the DPB 315 to resolution reduction processing. The low-resolution reference image generating unit 720 then supplies the decoded viewpoint A color image and decoded viewpoint A disparity information image after resolution reduction processing to the warping unit 721. Also, the low-resolution reference image generating unit 720 supplies the decoded viewpoint A color image to the disparity prediction unit 723. The processing then proceeds from step S320 to step S321.

In step S321, the warping unit 721 subjects the picture of the decoded viewpoint A color image after resolution reduction processing to warping using the picture of the decoded viewpoint A disparity information image after resolution reduction processing from the low-resolution reference image generating unit 720, thereby generating the picture of a warped viewpoint A color image. The warping unit 721 then supplies the picture of the warped viewpoint A color image to the warped picture buffer 722, and the processing proceeds to step S322.

Hereinafter, in steps S322 to S326, at the decoder 651, the same processing is performed as with steps S281 to S285 in FIG. 32 respectively with a color image as a target instead of a disparity information image.

Figure 37:
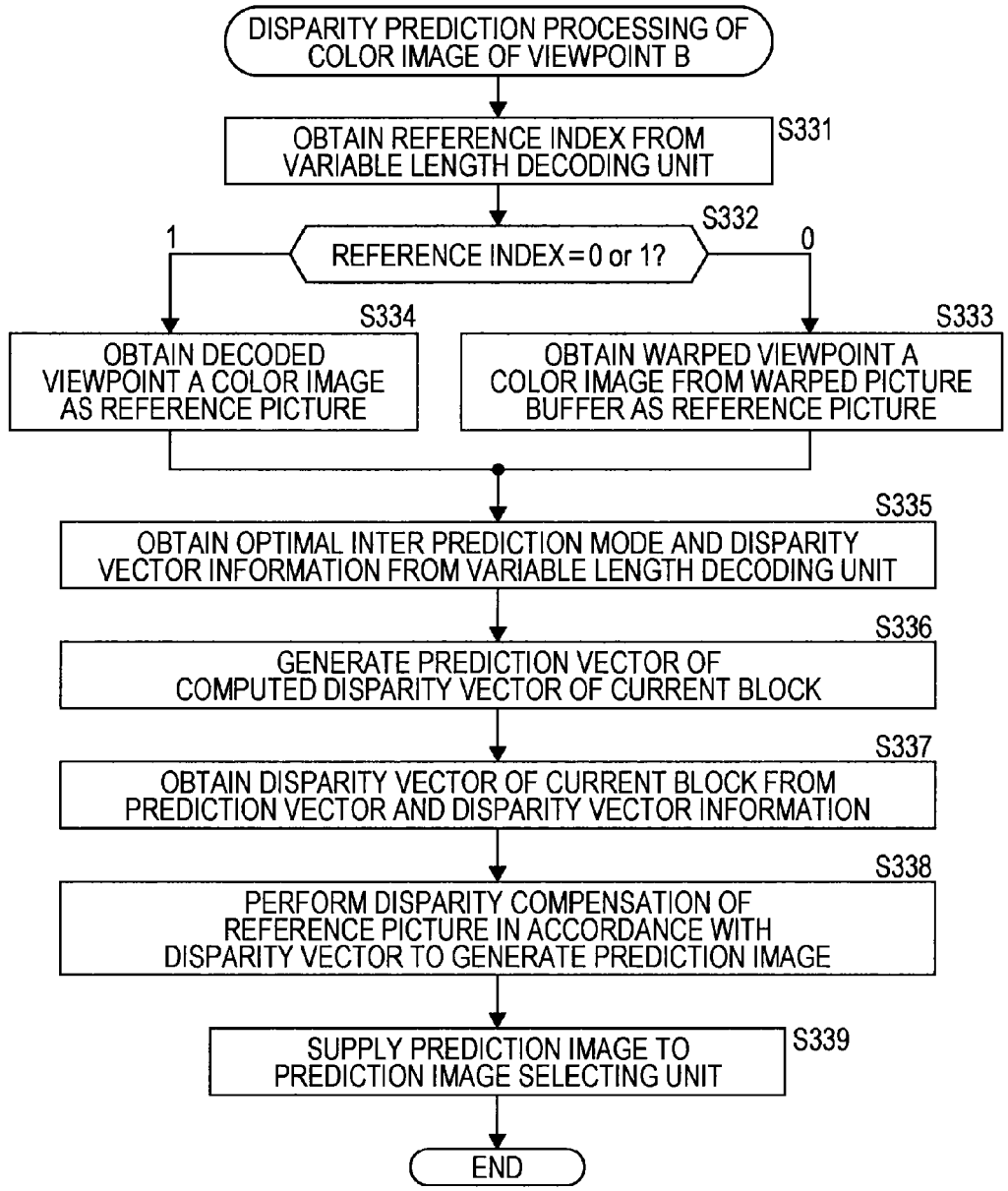
FIG. 37 is a flowchart for describing disparity prediction processing in FIG. 36.

FIG. 37 is a flowchart for describing disparity prediction processing that the disparity prediction unit 723 in FIG. 35 performs (in step S323 in FIG. 36).

With the disparity prediction unit 723 in FIG. 35, in steps S331 to S339, the same processing in steps S301 to S309 in FIG. 33 respectively with a color image as a target instead of a disparity information image.

As described above, the image processing system 500 decodes encoded data of the viewpoint image B encoded and reduced in resolution as compared to the resolution of the viewpoint image A with reference to the viewpoint image A after resolution reduction processing of the same resolution as with the viewpoint image B and warping. Accordingly, the encoded data of the viewpoint image B encoded and reduced in resolution as compared to the resolution of the viewpoint image A can be decoded by a method employing the MVC format or the like.

Note that, with the second embodiment, a viewpoint other than the viewpoint A serving as the base point is the viewpoint B alone, but the number of viewpoints other than the base point may be two or more.

Figure 38:
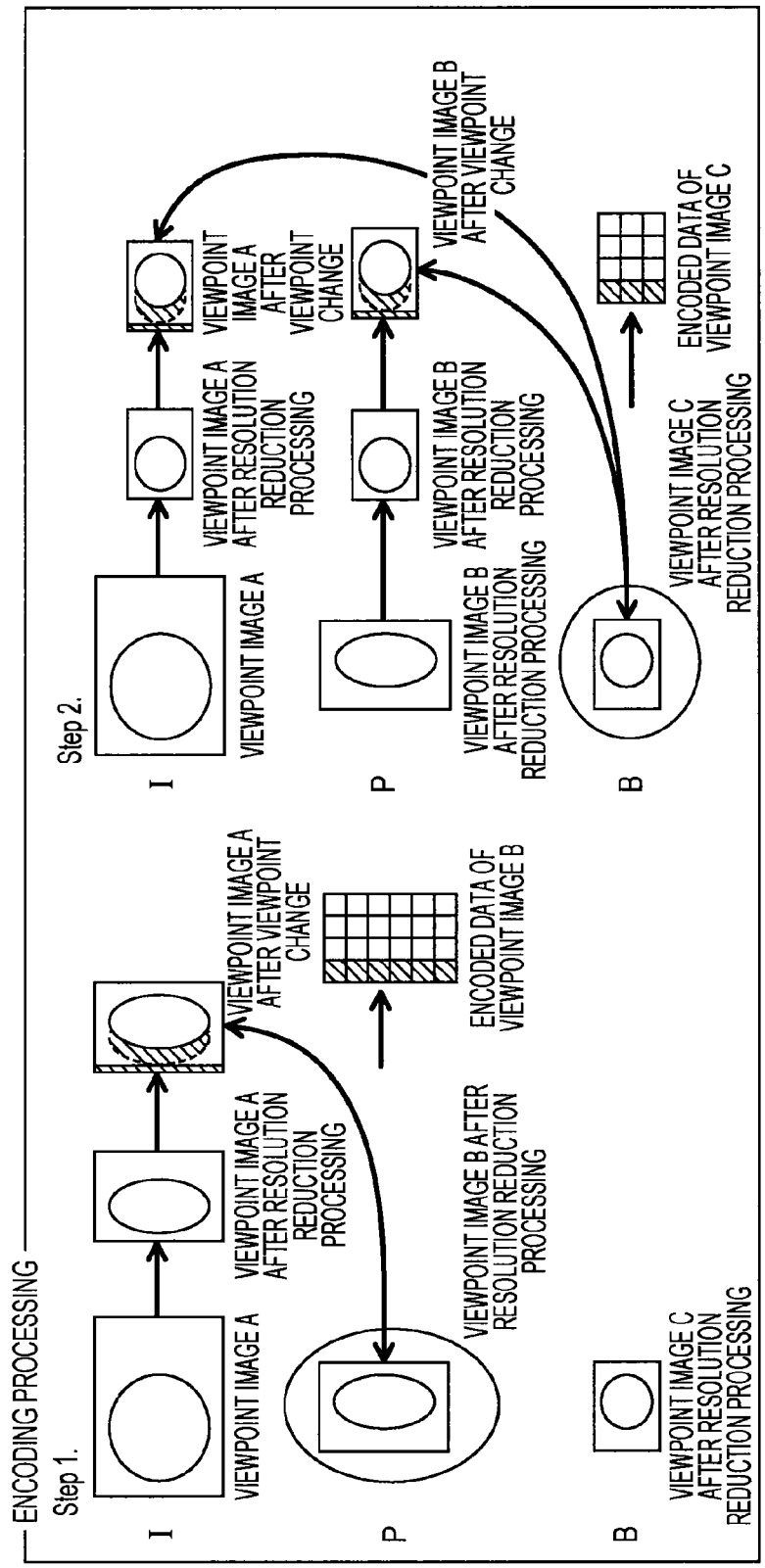
FIG. 38 is a diagram for describing overview of encoding in the event that the number of viewpoints other than a base point is two.

Overview of Encoding and Decoding when the Number of Viewpoints Other than the Base Point is Two FIG. 38 is a diagram for describing overview of encoding at the multi-viewpoint image encoding device 501 in the event that the number of viewpoints other than the base point is two.

Note that, hereinafter, a viewpoint other than the viewpoint B which is a viewpoint other than the viewpoint A serving as the base point will be referred to as viewpoint C, and a viewpoint image of the viewpoint C will be referred to as viewpoint image C. Also, resolution of the viewpoint image C to be input to the image processing system 500 as an object to be encoded is the same as the resolutions of the viewpoint image A and viewpoint image B to be input along with the viewpoint image C. Also, the viewpoint image C is subjected to resolution reduction processing by the image conversion processing device 11, and the resolution of the viewpoint image C is set to lower resolution than that of the resolution image B after resolution reduction processing.

As illustrated in the left side of FIG. 38, at the multi-viewpoint image encoding device 501, first, the viewpoint image A is subjected to resolution reduction processing, and the resolution of the viewpoint image A is set to the same resolution as that of the viewpoint image B after resolution reduction processing. The viewpoint image A after resolution reduction processing is then subjected to warping, and the viewpoint is changed to the viewpoint B. At the time of encoding of the viewpoint image B after resolution reduction processing, the viewpoint image A after viewpoint change is referenced, for example. Encoded data of the viewpoint image B after resolution reduction processing obtained as a result of encoding is transferred to the multi-viewpoint image decoding device 502 along with the viewpoint A low-resolution conversion information at the time of encoding thereof.

Next, as illustrated in the right side of FIG. 38, at the multi-viewpoint image encoding device 501, the viewpoint image A and viewpoint image B are subjected to resolution reduction processing, and the resolutions of the viewpoint image A and viewpoint image B are set to the same resolution as with the viewpoint image C after resolution reduction processing. The viewpoint image A and viewpoint image B after resolution reduction processing are then subjected to warping, and the viewpoints are changed to the viewpoint C. At the time of encoding of the viewpoint image C after resolution reduction processing, the viewpoint image A and viewpoint image B after viewpoint change are referenced, for example. Encoded data of the viewpoint image C after resolution reduction processing obtained as a result of encoding is transferred to the multi-viewpoint image decoding device 502 along with the viewpoint A low-resolution conversion information and viewpoint B low-resolution conversion information at the time of encoding thereof. Note that the viewpoint B low-resolution conversion information is information that represents the type of resolution reduction processing such as the number of taps of the filter processing to be performed as resolution reduction processing of the viewpoint image B, or the like.

Figure 39:
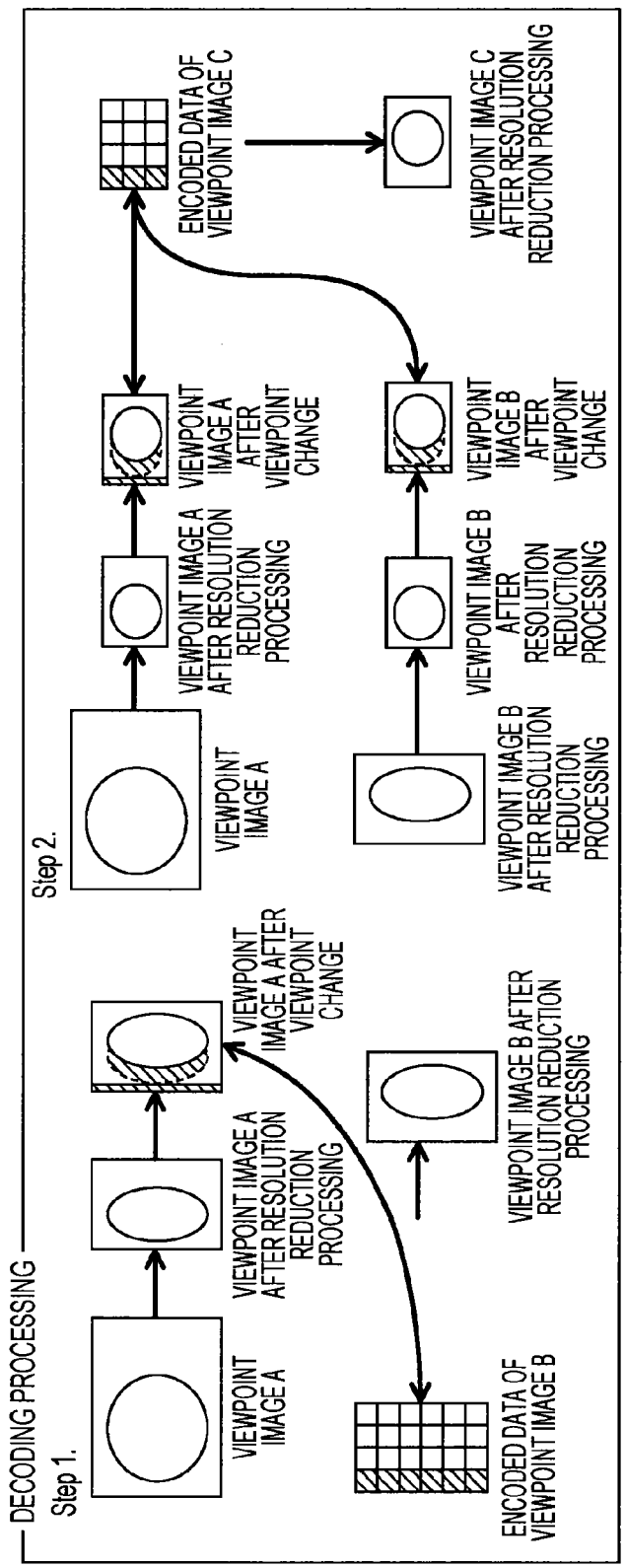
FIG. 39 is a diagram for describing overview of decoding in the event that the number of viewpoints other than a base point is two.

FIG. 39 is a diagram for describing overview of decoding at the multi-viewpoint image decoding device 502 in the event that the number of viewpoints other than the base point is two.

As illustrated in the left side of FIG. 39, at the multi-viewpoint image decoding device 502, first, the viewpoint image A encoded by the multi-viewpoint image encoding device 501 and decoded by the multi-viewpoint image decoding device 502 is subjected to resolution reduction processing based on the viewpoint A low-resolution conversion information at the time of encoding of the viewpoint image B. Thus, the resolution of the viewpoint image A is set to the same resolution as with the viewpoint image B after resolution reduction processing. The viewpoint image A after resolution reduction processing is then subjected to warping, and the viewpoint is changed to the viewpoint B. At the time of decoding of the encoded data of the viewpoint image B after resolution reduction processing to be supplied from the multi-viewpoint image encoding device 501, the viewpoint image A after viewpoint change is referenced. As a result of decoding, the viewpoint image B after resolution reduction processing is generated.

Next, as illustrated in the right side of FIG. 39, at the multi-viewpoint image decoding device 502, the decoded viewpoint image A is subjected to resolution reduction processing based on the viewpoint A low-resolution conversion information at the time of encoding of the viewpoint image C. Also, the decoded viewpoint image B is subjected to resolution reduction processing based on the viewpoint B low-resolution conversion information at the time of encoding of the viewpoint image C. Thus, the resolutions of the viewpoint image A and viewpoint image B are set to the same resolution as with the viewpoint image C after resolution reduction processing. The viewpoint image A and viewpoint image B after resolution reduction processing are then subjected to warping, and the viewpoints are changed to the viewpoint C. At the time of decoding of the encoded data of the viewpoint image C after resolution reduction processing to be supplied from the multi-viewpoint image encoding device 501, the viewpoint image A and viewpoint image B after resolution reduction processing are referenced. As a result of decoding, the viewpoint image C after resolution reduction processing is generated.

Third Embodiment

Configuration Example of Image Processing System

Figure 40:
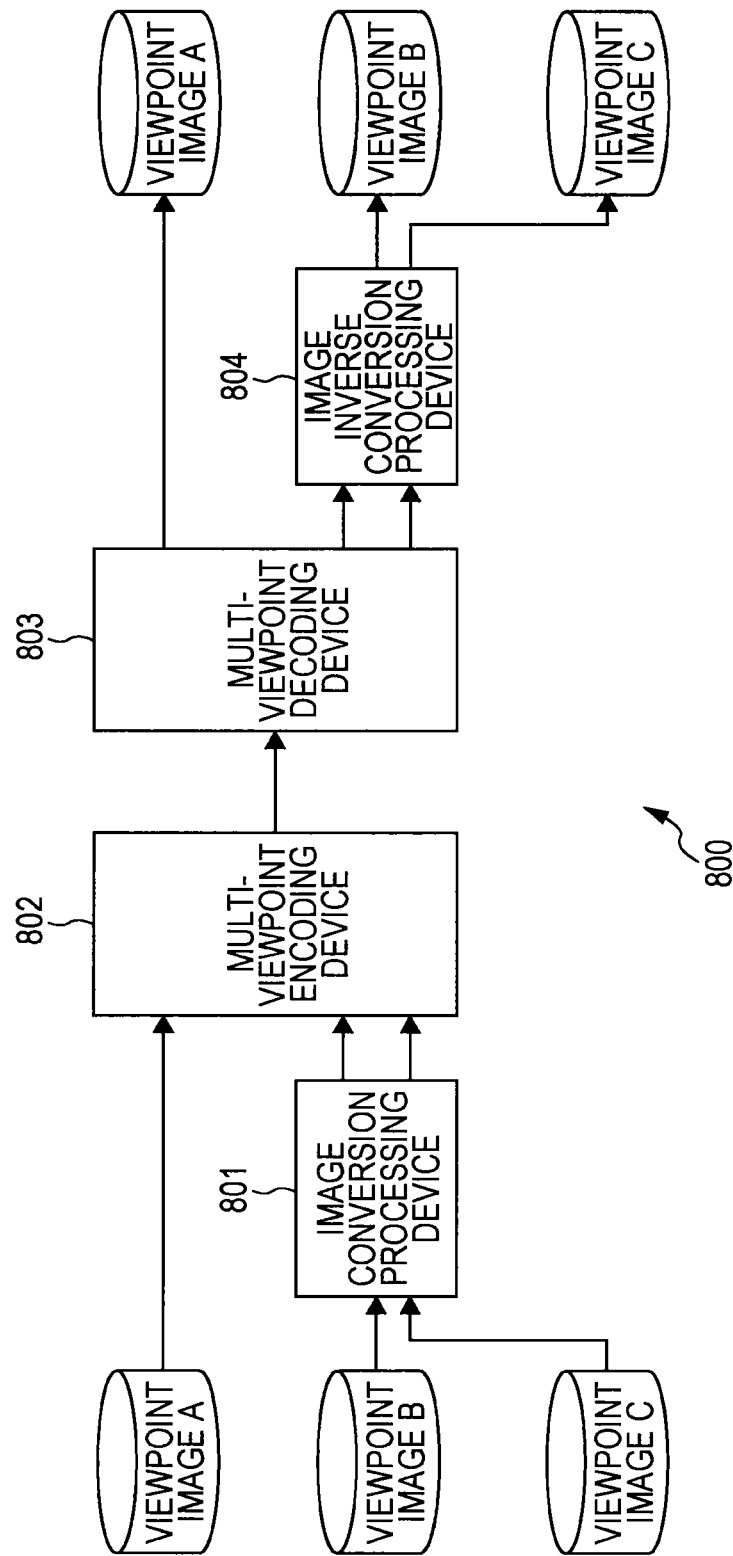
FIG. 40 is a block diagram illustrating a configuration example of a third embodiment of the image processing system to which the present technology has been applied.

FIG. 40 is a block diagram illustrating a configuration example of a third embodiment of the image processing system to which the present technology has been applied.

In FIG. 40, An image processing system 800 is configured of an image conversion processing device 801, a multi-viewpoint image encoding device 802, a multi-viewpoint image decoding device 803, and an image inverse conversion processing device 804. The image processing system 800 generates a viewpoint BC multiplexed image by subjecting the viewpoint image B and viewpoint image C having the same resolution as with the viewpoint image A to resolution reduction processing, and multiplexing these, and encodes and decodes the viewpoint BC multiplexed image.

Specifically, the image conversion processing device 801 of the image processing system 800 subjects the viewpoint image B and viewpoint image C to be externally input as objects to be encoded to resolution reduction processing, thereby setting the resolutions of the viewpoint image B and viewpoint image C to a half. The image conversion processing device 801 then multiplexes the viewpoint image B and viewpoint image C using a predetermined multiplexing method to generate a viewpoint BC multiplexed image having the same resolution as with the viewpoint images A to C to be input to the image processing system 800. The image conversion processing device 801 supplies the viewpoint BC multiplexed image to the multi-viewpoint image encoding device 802.

Note that examples of the multiplexing method include a side-by-side method wherein two images to be multiplexed are disposed in the left and right of a multiplexed image, and a top-and-bottom method wherein two images to be multiplexed are disposed upward and downward.

Also, the image conversion processing device 801 generates information relating to multiplexing such as a multiplexing method of a viewpoint BC multiplexed image, or the like as multiplexed information, and supplies to the multi-viewpoint image encoding device 802.

Note that the image conversion processing device 801 may directly transmit the multiplexed information to the image inverse conversion processing device 804 instead of supplying to the multi-viewpoint image encoding device 802. Alternatively, the image conversion processing device 801 may perform processing based on a multiplexing method set beforehand between the image conversion processing device 801 and image inverse conversion processing device 804 without generating the multiplexed information.

The multi-viewpoint encoding device 802 obtains the viewpoint image A. Also, the multi-viewpoint image encoding device 802 encodes the viewpoint image A and the viewpoint BC multiplexed image supplied from the image conversion processing device 801. At this time, the multi-viewpoint encoding device 802 subjects the viewpoint image A to resolution reduction processing, thereby setting the resolution of the viewpoint image A to a half, and replicates two viewpoint images A of which the number is the number of viewpoints other than the base point. The multi-viewpoint encoding device 802 then multiplexes the two replicated viewpoints images A after resolution reduction processing using the multiplexing method for the viewpoint BC multiplexed image based on the multiplexed information supplied from the image conversion processing device 801. At the time of encoding the viewpoint BC multiplexed image, the multi-viewpoint image encoding device 802 then references the viewpoint A multiplexed image obtained as a result of multiplexing.

The multi-viewpoint image encoding device 802 multiplexes the encoded data of the viewpoint image A and viewpoint BC multiplexed image obtained as a result of encoding, and the multiplexed information to generate a bitstream. The multi-viewpoint image encoding device 802 then transfers the generated bitstream to the multi-viewpoint image decoding device 803.

The multi-viewpoint image decoding device 803 receives the bitstream transferred from the multi-viewpoint image encoding device 802. The multi-viewpoint image decoding device 803 extracts the multiplexed information from the received bitstream.

Also, the multi-viewpoint image decoding device 803 decodes the encoded data of the viewpoint image A and viewpoint BC multiplexed image of the bitstream. At this time, the multi-viewpoint image decoding device 803 subjects the decoded viewpoint image A to resolution reduction processing, thereby setting the resolution of the viewpoint image A to a half, and replicates two viewpoint images A of which the number is the number of viewpoints other than the base point. The multi-viewpoint image decoding device 803 then multiplexes the two replicated viewpoints images A after resolution reduction processing using the multiplexing method for the viewpoint BC multiplexed image based on the multiplexed information, thereby generating a viewpoint A multiplexed image. The multi-viewpoint image decoding device 803 then references the viewpoint A multiplexed image at the time of decoding the encoded data of the viewpoint BC multiplexed image. The multi-viewpoint image decoding device 803 outputs the viewpoint image A obtained as a result of decoding, and supplies the viewpoint BC multiplexed image and multiplexed information to the image inverse conversion processing device 804.

The image inverse conversion processing device 804 separates the viewpoint BC multiplexed image based on the multiplexed information supplied from the multi-viewpoint image decoding device 803 to generate the viewpoint image B and viewpoint image C after resolution reduction processing. The image inverse conversion processing device 804 subjects the viewpoint image B and viewpoint image C to resolution increase processing to set the resolutions of the viewpoint image B and viewpoint image C to double. Thus, the image inverse conversion processing device 804 generates the viewpoint image B and viewpoint image C having the same resolution as with the viewpoint image A, that is, resolution at the time of being externally input as objects to be encoded as the viewpoint image B and viewpoint image C after resolution reduction processing. The image inverse conversion processing device 804 outputs the generated viewpoint image B and viewpoint image C.

Overview of Encoding and Decoding of Multi-Viewpoint BC Multiplexed Image

Figure 41:
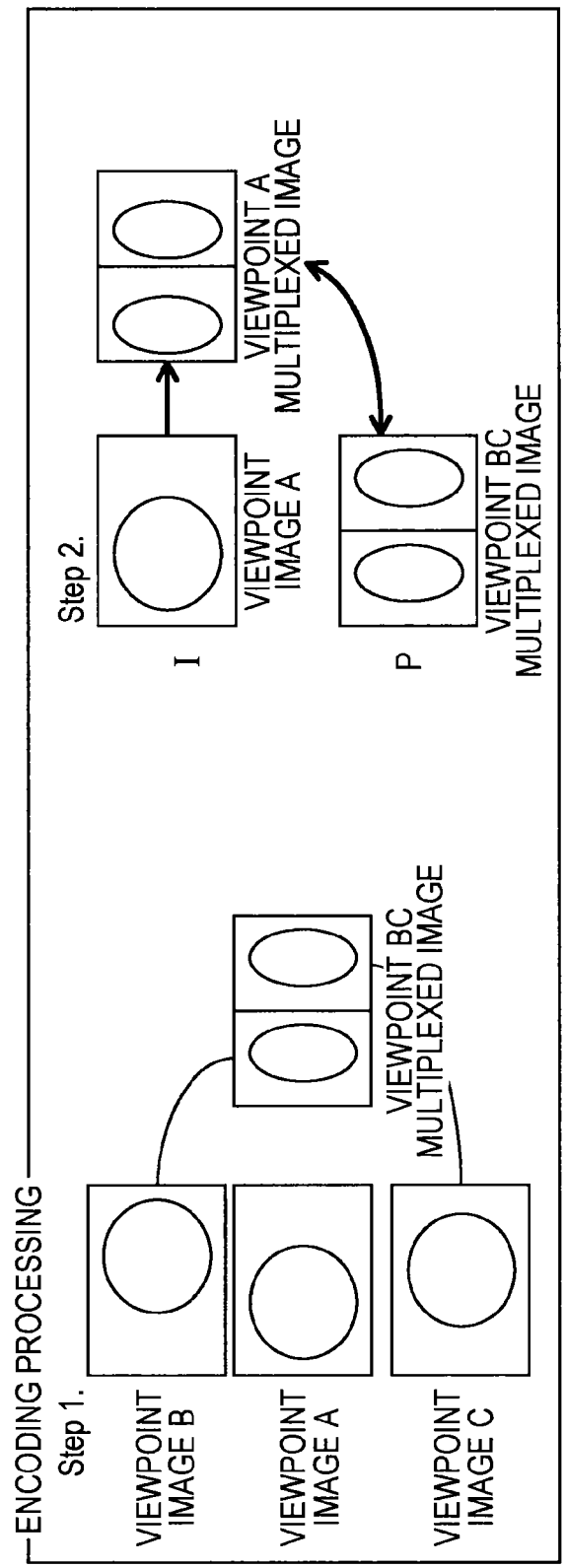
FIG. 41 is a diagram for describing overview of encoding of a viewpoint BC multiplexed image.

FIG. 41 is a diagram for describing overview of encoding of the viewpoint BC multiplexed image by the multi-viewpoint image encoding device 802 in FIG. 40.

As illustrated in the left side of FIG. 41, with the image conversion processing device 801 of the image processing system 800, the viewpoint image B and viewpoint image C are subjected to resolution reduction processing, and the resolutions of the viewpoint image B and viewpoint image C are set to a half, and then the viewpoint image B and viewpoint image C are multiplexed by a predetermined multiplexing method. Note that, with the example in FIG. 41, the multiplexing method is the side-by-side method, the viewpoint image B after resolution reduction processing is disposed in a left half of the viewpoint BC multiplexed image, and the viewpoint image C after resolution reduction processing is disposed in a right half of the viewpoint BC multiplexed image.

Next, with the multi-viewpoint image encoding device 802, the viewpoint image A is subjected to resolution reduction processing, the resolution of the viewpoint image A is set to a half, and is then replicated to two viewpoint images A, which are multiplexed by the multiplexing method for the viewpoint BC multiplexed image. The viewpoint A multiplexed image is then referenced at the time of encoding of the viewpoint BC multiplexed image.

Accordingly, the viewpoint BC multiplexed image which is an objet to be encoded has the same resolution as the resolution of the viewpoint A multiplexed image to be referenced at the time of encoding of the viewpoint BC multiplexed image, and encoding can be performed by a method employing the MVC format or the like. Also, the viewpoint BC multiplexed image which is an objet to be encoded, and the viewpoint A multiplexed image to be referenced at the time of encoding of the viewpoint BC multiplexed image thereof have the same multiplexing method, and accordingly, encoding efficiency can be improved.

The encoded data of the viewpoint BC multiplexed image obtained as a result of encoding is transferred to the multi-viewpoint image decoding device 803 along with the multiplexed information.

Figure 42:
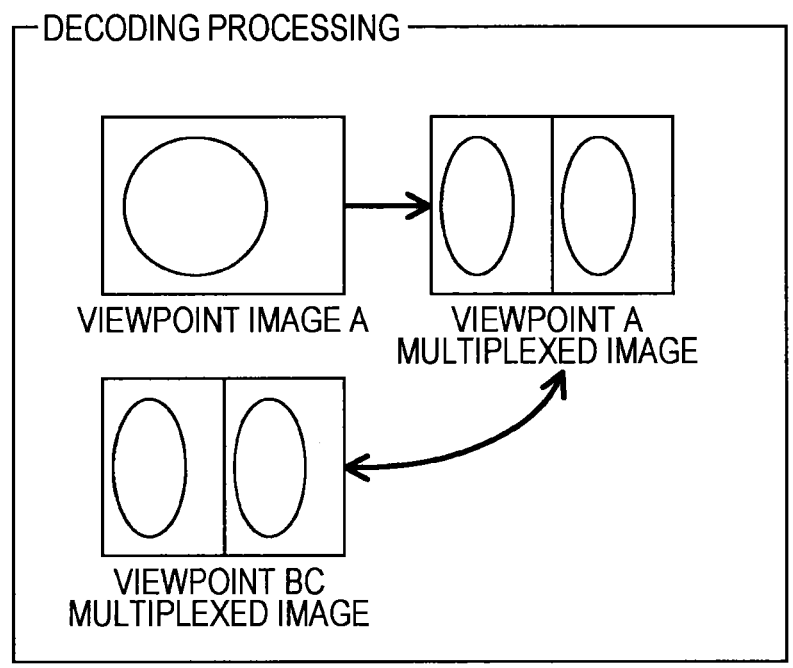
FIG. 42 is a diagram for describing overview of decoding of a viewpoint BC multiplexed image.

FIG. 42 is a diagram for describing overview of decoding of the viewpoint BC multiplexed image by the multi-viewpoint image decoding device 803.

As illustrated in FIG. 42, at the multi-viewpoint image decoding device 803, the viewpoint image A encoded by the multi-viewpoint image encoding device 802 and decoded by the multi-viewpoint image decoding device 803 is subjected to resolution reduction processing, the resolution of the viewpoint image A is set to a half, and then the viewpoint image A is replicated to two. Thereafter, the two replicated viewpoint images A after resolution reduction processing are multiplexed by the multiplexing method for the viewpoint BC multiplexed image (side-by-side method in the example in FIG. 42). The viewpoint A multiplexed image is referenced at the time of decoding of the encoded data of the viewpoint BC multiplexed image.

Accordingly, the viewpoint BC multiplexed image which is an object to be decoded, and the viewpoint A multiplexed image to be referenced at the time of decoding of the viewpoint BC multiplexed image thereof have the same resolution, and decoding can be performed by a method employing the MVC format or the like.

Description of Processing of Image Processing System

Figure 43:
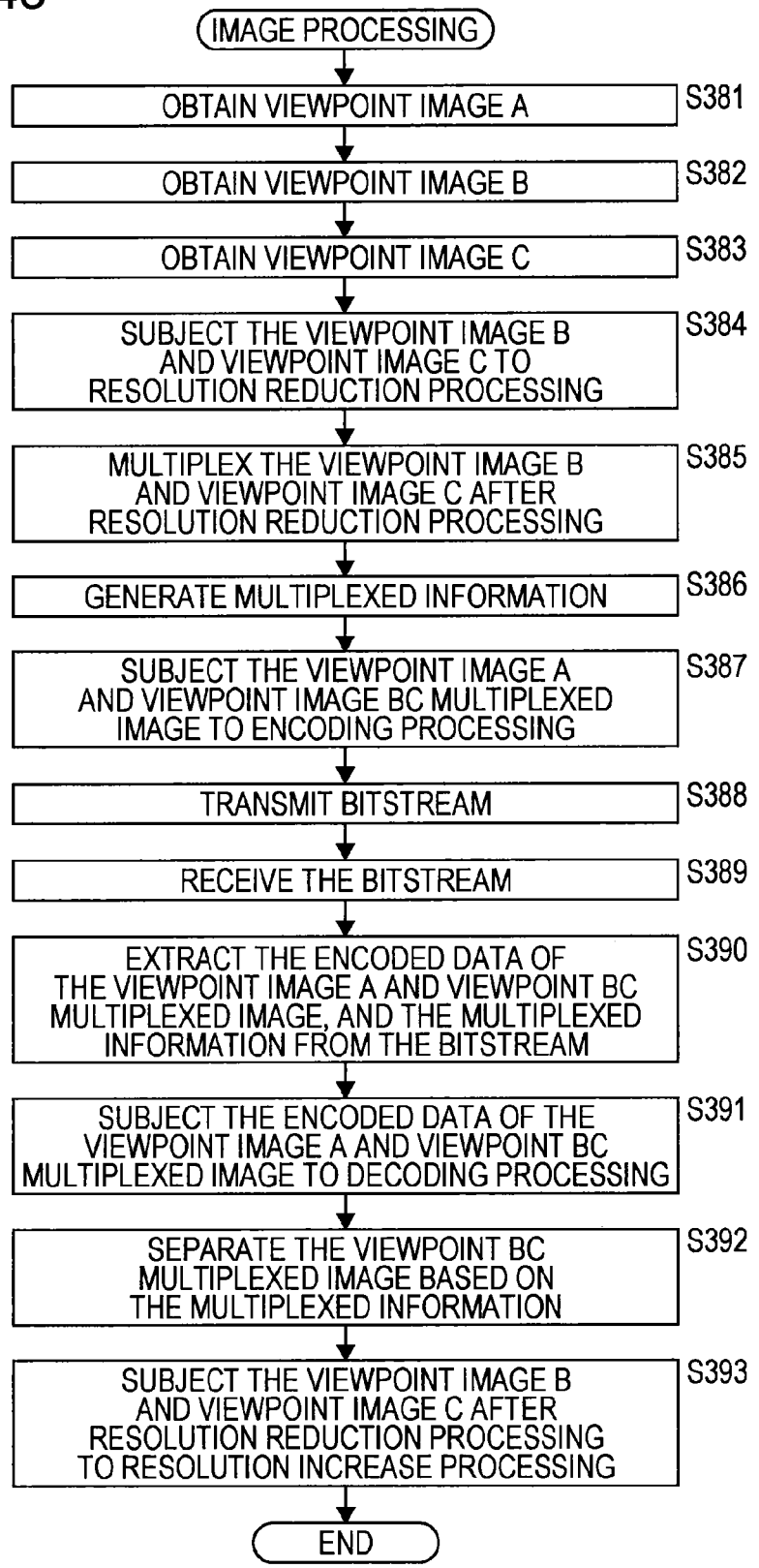
FIG. 43 is a flowchart for describing image processing to be performed by the image processing system in FIG. 40.

FIG. 43 is a flowchart for describing image processing for encoding and decoding the viewpoint image A through the viewpoint image C that the image processing system 800 in FIG. 40 performs.

In step S381, the multi-viewpoint image encoding device 802 of the image processing system 800 obtains a viewpoint image A to be externally input as an object to be encoded, and the processing proceeds to step S382.

In step S382, the image conversion processing device 801 obtains a viewpoint image B to be externally input as an object to be encoded, and the processing proceeds to step S383.

In step S383, the image conversion processing device 801 obtains a viewpoint image C to be externally input as an object to be encoded, and the processing proceeds to step S384.

In step S384, the image conversion processing device 801 subjects the obtained viewpoint image B and viewpoint image C to resolution reduction processing, thereby setting the resolutions of the viewpoint image B and viewpoint image C to a half.

In step S385, the image conversion processing device 801 multiplexes the viewpoint image B and viewpoint image C after resolution reduction processing using a predetermined multiplexing method to generate a multiplexed image having the same resolution as with the viewpoint images A to C to be input to the image processing system 800. The image conversion processing device 801 supplies the multiplexed image thereof to the multi-viewpoint image encoding device 802 as a viewpoint BC multiplexed image.

In step S386, the image conversion processing device 801 generates multiplexed information, and supplies to the multi-viewpoint image encoding device 802.

In step S387, the multi-viewpoint image encoding device 802 subjects the viewpoint image A and the viewpoint BC multiplexed image supplied from the image conversion processing device 801 to encoding processing.

Specifically, the multi-viewpoint image encoding device 802 encodes the viewpoint image A. Also, the multi-viewpoint image encoding device 802 sets the resolution of the viewpoint image A to a half by subjecting the viewpoint image A to resolution reduction processing, and replicates two viewpoint images A. The multi-viewpoint image encoding device 802 then multiplexes the two replicated viewpoint images A after resolution reduction processing using the multiplexing method for the viewpoint BC multiplexed image based on the multiplexed information supplied from the image conversion processing device 801. The multi-viewpoint image encoding device 802 then references the viewpoint A multiplexed image obtained as a result of multiplexing to encode the viewpoint image BC multiplexed image. The multi-viewpoint image encoding device 802 then multiplexes encoded data of the viewpoint image A and viewpoint BC multiplexed image obtained as a result of encoding, and the multiplexed information to generate a bitstream, and the processing proceeds to step S388.

In step S388, the multi-viewpoint image encoding device 802 transfers the bitstream to the multi-viewpoint image decoding device 803, and the processing proceeds to step S389.

In step S389, the multi-viewpoint image decoding device 803 receives the bitstream transferred from the multi-viewpoint image encoding device 802, and the processing proceeds to step S390.

In step S390, the multi-viewpoint image decoding device 803 extracts the encoded data of the viewpoint image A and viewpoint BC multiplexed image, and multiplexed information from the received bitstream, and the processing proceeds to step S391.

In step S391, the multi-viewpoint image decoding device 803 subjects the encoded data of the viewpoint image A and viewpoint BC multiplexed image to decoding processing.

Specifically, the multi-viewpoint image decoding device 803 sets the resolution of the viewpoint image A to a half by subjecting the decoded viewpoint image A to resolution reduction processing, and replicates two viewpoint images A. The multi-viewpoint image decoding device 803 then multiplexes the two replicated viewpoint images A after resolution reduction processing using the multiplexing method for the viewpoint BC multiplexed image based on the multiplexed information. The multi-viewpoint image decoding device 803 then references the viewpoint A multiplexed image obtained as a result of multiplexing to decode the encoded data of the viewpoint BC multiplexed image. The multi-viewpoint image decoding device 803 outputs the viewpoint image A obtained as a result of decoding, and supplies the viewpoint BC multiplexed image and multiplexed information to the image inverse conversion processing device 804. The processing then proceeds to step S392.

In step S392, the image inverse conversion processing device 804 separates, based on the multiplexed information supplied from the multi-viewpoint image decoding device 803, the viewpoint BC multiplexed image, and generates the viewpoint image B and viewpoint image C after resolution reduction processing. The processing then proceeds to step S393.

In step S393, the image inverse conversion processing device 804 subjects the viewpoint image B and viewpoint image C after resolution reduction processing to resolution increase processing to set the resolutions of the viewpoint image B and viewpoint image C to double. Thus, the image inverse conversion processing device 804 generates and outputs the viewpoint image B and viewpoint image C having resolution at the time of being externally input as an object to be encoded. The processing then ends.

Configuration Example of Multi-Viewpoint Image Encoding Device

Figure 44:
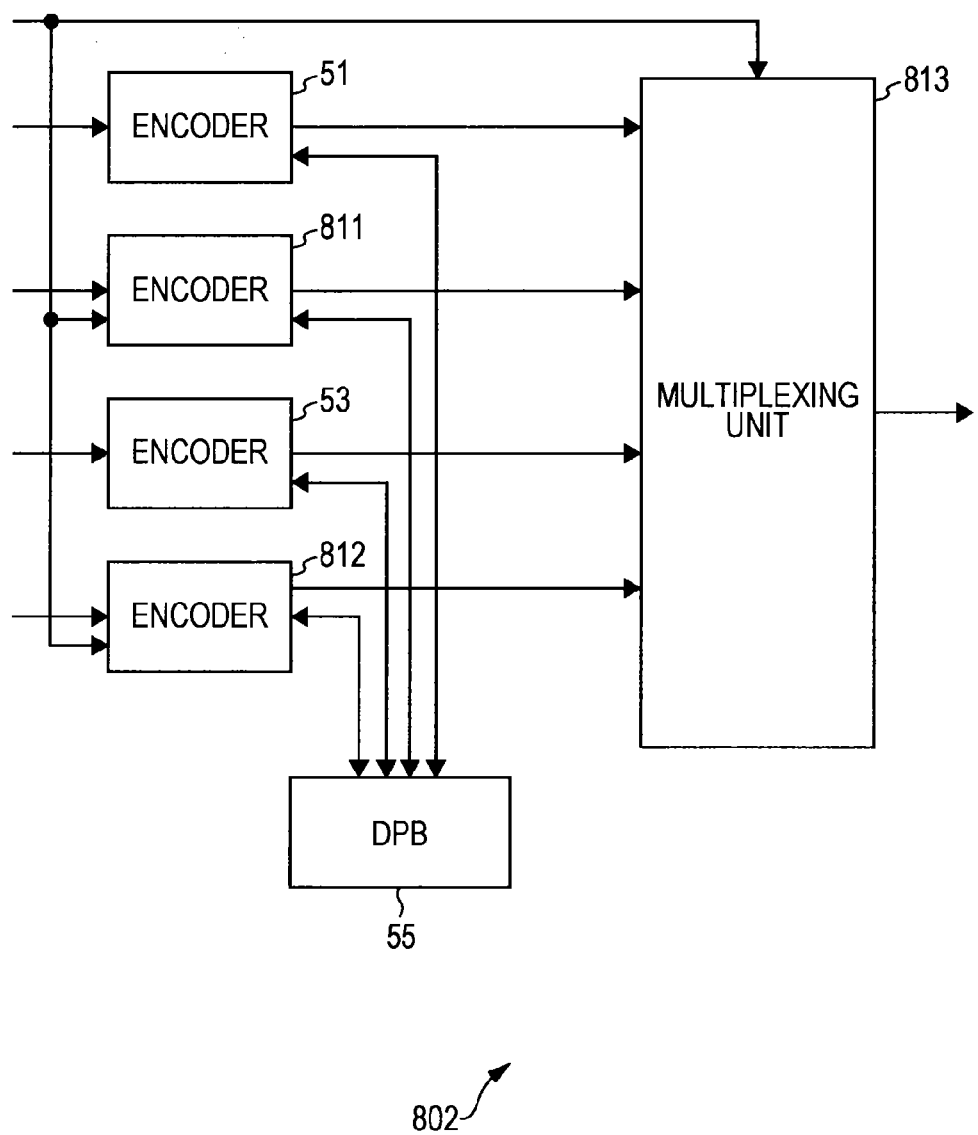
FIG. 44 is a block diagram illustrating a configuration example of a multi-viewpoint image encoding device in FIG. 40.

FIG. 44 is a block diagram illustrating a configuration example of the multi-viewpoint image encoding device 802 in FIG. 40.

Of configuration illustrated in FIG. 44, the same configuration as the configuration in FIG. 5 is denoted with the same reference numeral. Redundant description will be omitted as appropriate.

The configuration of the multi-viewpoint image encoding device 802 in FIG. 44 differs from the configuration in FIG. 5 principally in that an encoder 811 and an encoder 812 are provided instead of the encoder 52 and encoder 54, and in that the transmission unit 57 is not provided.

The multi-viewpoint image encoding device 802 in FIG. 44 is an encoding device configured to encode images of multiple viewpoints using the MVC format for example.

The multi-viewpoint image encoding device 802 encodes the viewpoint image A of the base point as a base view in the MVC format, and encodes the viewpoint BC multiplexed image as a dependent view in the MVC format.

Specifically, the encoder 811 of the multi-viewpoint image encoding device 802 encodes a viewpoint BC color image which is a color image of the viewpoint BC multiplexed image supplied along with the multiplexed information based on the multiplexed information supplied from the image conversion processing device 801 in FIG. 40. The encoder 811 supplies encoded data of the viewpoint BC color image obtained as a result of encoding to the multiplexing unit 813.

The encoder 812 encodes a viewpoint BC disparity information image with is a disparity information image of the viewpoint BC multiplexed image supplied from the image conversion processing device 801 based on the multiplexed information supplied from the image conversion processing device 801. The encoder 812 supplies encoded data of the viewpoint BC disparity information image obtained as a result of encoding to the multiplexing unit 813.

The multiplexing unit 813 multiplexes encoded data of each of the encoder 51, encoder 811, encoder 53, and encoder 812, and the multiplexed information supplied from the image conversion processing device 801 to generate a bitstream. The multiplexing unit 813 transfers the bitstream to the multi-viewpoint image decoding device 803 in FIG. 40.

Configuration Example of Encoder 811

Figure 45:
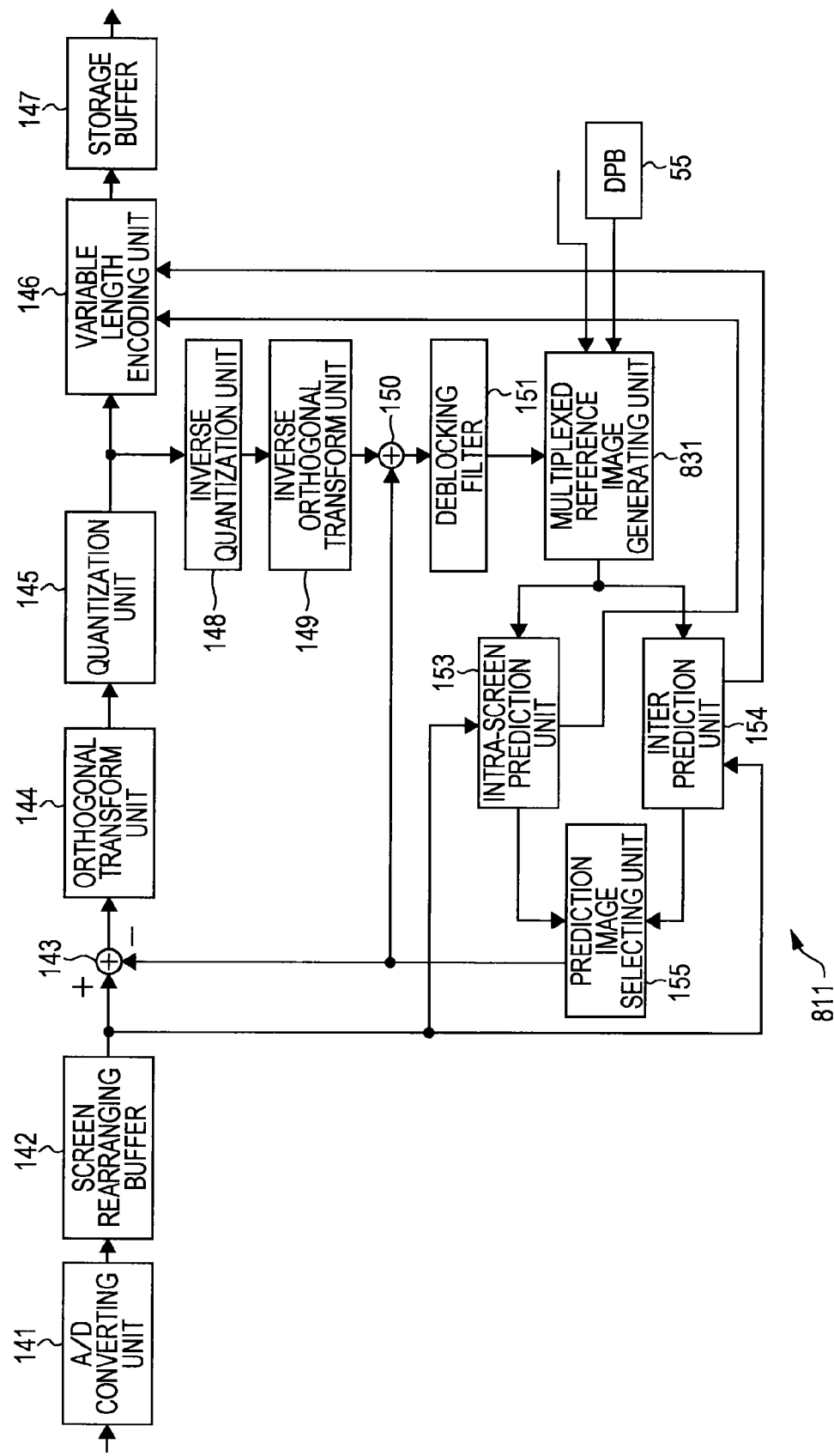
FIG. 45 is a block diagram illustrating a configuration example of an encoder in FIG. 44.

FIG. 45 is a block diagram illustrating a configuration example of the encoder 811 in FIG. 44.

Note that the encoder 812 in FIG. 44 is configured in the same way as with the encoder 811, and performs encoding of images in accordance with the MVC format, for example.

Of configuration illustrated in FIG. 45, the same configuration as the configuration in FIG. 7 is denoted with the same reference numeral. Redundant description will be omitted as appropriate.

The configuration of the encoder 811 in FIG. 45 differs from the configuration in FIG. 7 principally in that a multiplexed reference image generating unit 831 is provided instead of the low-resolution reference image generating unit 152.

The multiplexed reference image generating unit 831 of the encoder 811 subjects the picture of the decoded viewpoint A color image read out from the DPB 55 as a candidate picture to resolution reduction processing, thereby setting the resolution of the decoded viewpoint A color image to a half, and replicates two decoded viewpoint A color images.

Also, the multiplexed reference image generating unit 831 serves as a multiplexing unit. Specifically, the multiplexed reference image generating unit 831 multiplexes, based on the multiplexed information supplied from the image conversion processing device 801 in FIG. 40, the pictures of the two replicated decoded viewpoint A color images after resolution reduction processing using the multiplexing method for the viewpoint BC multiplexed image to generate a viewpoint A multiplexed color image which is a color image of the viewpoint A multiplexed image. Thus, the resolution of the viewpoint A multiplexed color image agrees with the resolution of the viewpoint BC color image serving as an object to be encoded. The multiplexed reference image generating unit 831 then supplies the viewpoint A multiplexed color image to the inter prediction unit 154 as a candidate picture.

Also, the multiplexed reference image generating unit 831 supplies, in the same way as with the low-resolution reference image generating unit 152 in FIG. 7, a portion already subjected to local decoding of the decoded image of the current picture read out from the DPB 55 to the intra-screen prediction unit 153 without change.

Further, the multiplexed reference image generating unit 831 supplies, in the same way as with the low-resolution reference image generating unit 152, a picture different from the current picture of a color image of the viewpoint B read out from the DPB 55 as a candidate picture and subjected to local decoding to the inter prediction unit 154 without change.

Description of Processing of Encoder 811

Figure 46:
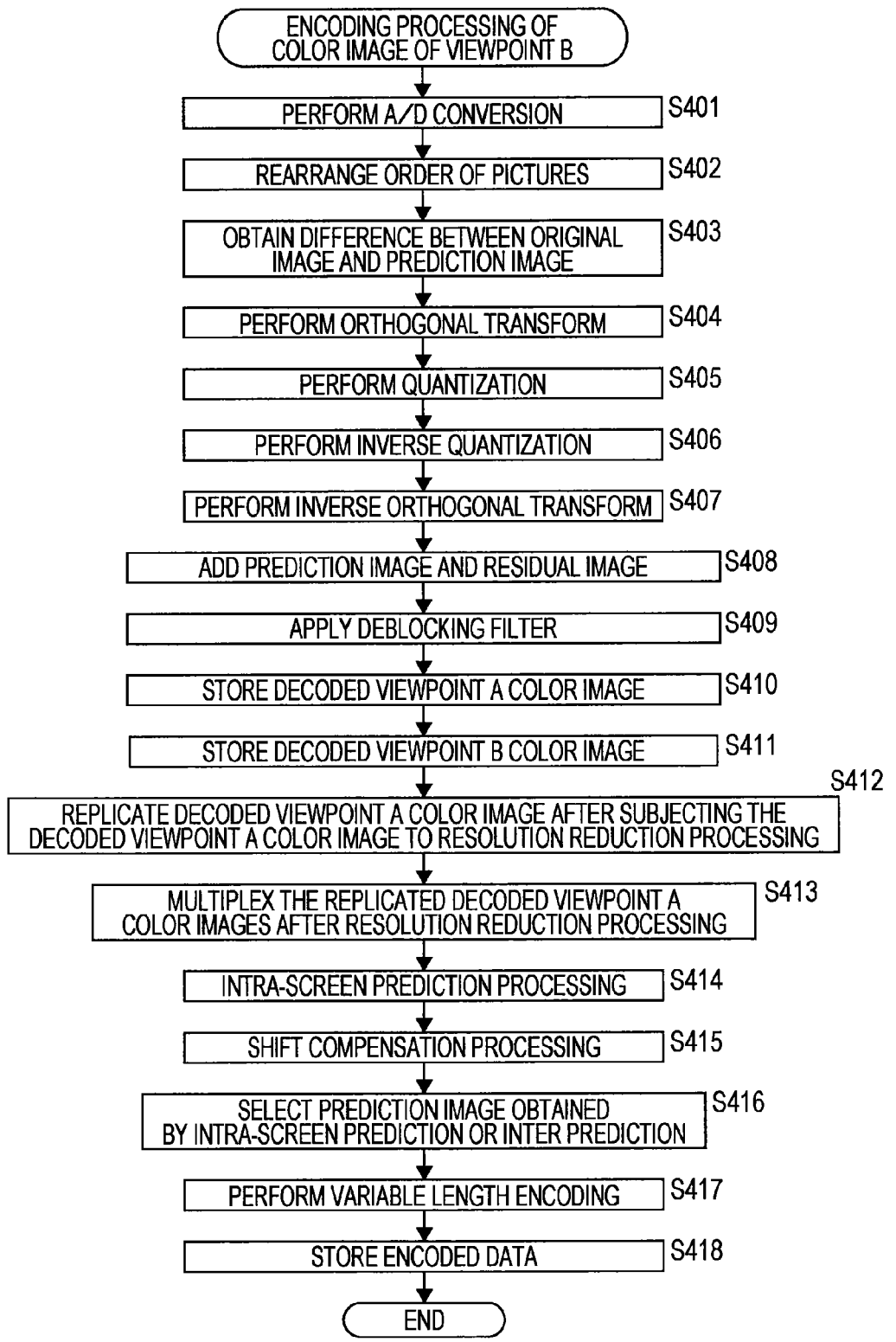
FIG. 46 is a flowchart for describing encoding processing to be performed by the encoder in FIG. 45.

FIG. 46 is a flowchart for describing encoding processing for encoding the viewpoint BC color image that the encoder 811 in FIG. 45 performs in step S387 in FIG. 43.

Processing in steps S401 to S411 is the same as the processing in steps S11 to S21 in FIG. 9, and accordingly, description will be omitted.

After the processing in step S411, in step S412 the multiplexed reference image generating unit 831 of the encoder 811 subjects the picture of the decoded viewpoint A color image read out from the DPB 55 as a candidate picture to resolution reduction processing, thereby setting the resolution to a half, and replicates two decoded viewpoint A color images.

The processing then proceeds to step S413.

In step S413, the multiplexed reference image generating unit 831 multiplexes, based on the multiplexed information supplied from the image conversion processing device 801 in FIG. 40, the two replicated decoded viewpoint A color images after resolution reduction processing using the multiplexing method for the viewpoint BC multiplexed image to generate a viewpoint A multiplexed color image. Thus, the resolution of the viewpoint A multiplexed color image agrees with the resolution of the viewpoint BC color image serving as an object to be encoded. The multiplexed reference image generating unit 831 then supplies the viewpoint A multiplexed color image to the inter prediction unit 154 as a candidate picture.

Also, the multiplexed reference image generating unit 831 supplies a portion already subjected to local decoding of the decoded image of the current picture read out from the DPB 55 to the intra-screen prediction unit 153 without change. Further, the multiplexed reference image generating unit 831 supplies a picture different from the current picture of a color image of the viewpoint B read out from the DPB 55 as a candidate picture and subjected to local decoding to the inter prediction unit 154 without change. The processing then proceeds to step S414.

Processing in steps S414 to S418 is the same as the processing in steps S24 to S28 in FIG. 9, and accordingly, description will be omitted.

At the encoder 811, the processing in the above steps S401 to S418 is repeatedly performed as appropriate.

As described above, the image processing system 800 performs encoding by lowering the resolutions of the viewpoint image B and viewpoint image C as compared to the resolution of the viewpoint image A, and accordingly, the amount of an object to be encoded can be reduced as compared to a case where the viewpoint image A to viewpoint image C having the same resolution are encoded. As a result thereof, the data amount of encoded data can be reduced. Also, the image processing system 800 references the viewpoint A multiplexed image having the same resolution as with the viewpoint BC multiplexed image at the time of encoding of the viewpoint BC multiplexed image, and accordingly, encoding can be performed by a method employing the MVC format or the like. Further, the image processing system 800 employs the same multiplexing method regarding the viewpoint BC multiplexed image serving as an object to be encoded and the viewpoint A multiplexed image to be referenced, and accordingly, encoding efficiency can be improved.

Configuration Example of Multi-Viewpoint Image Decoding Device

Figure 47:
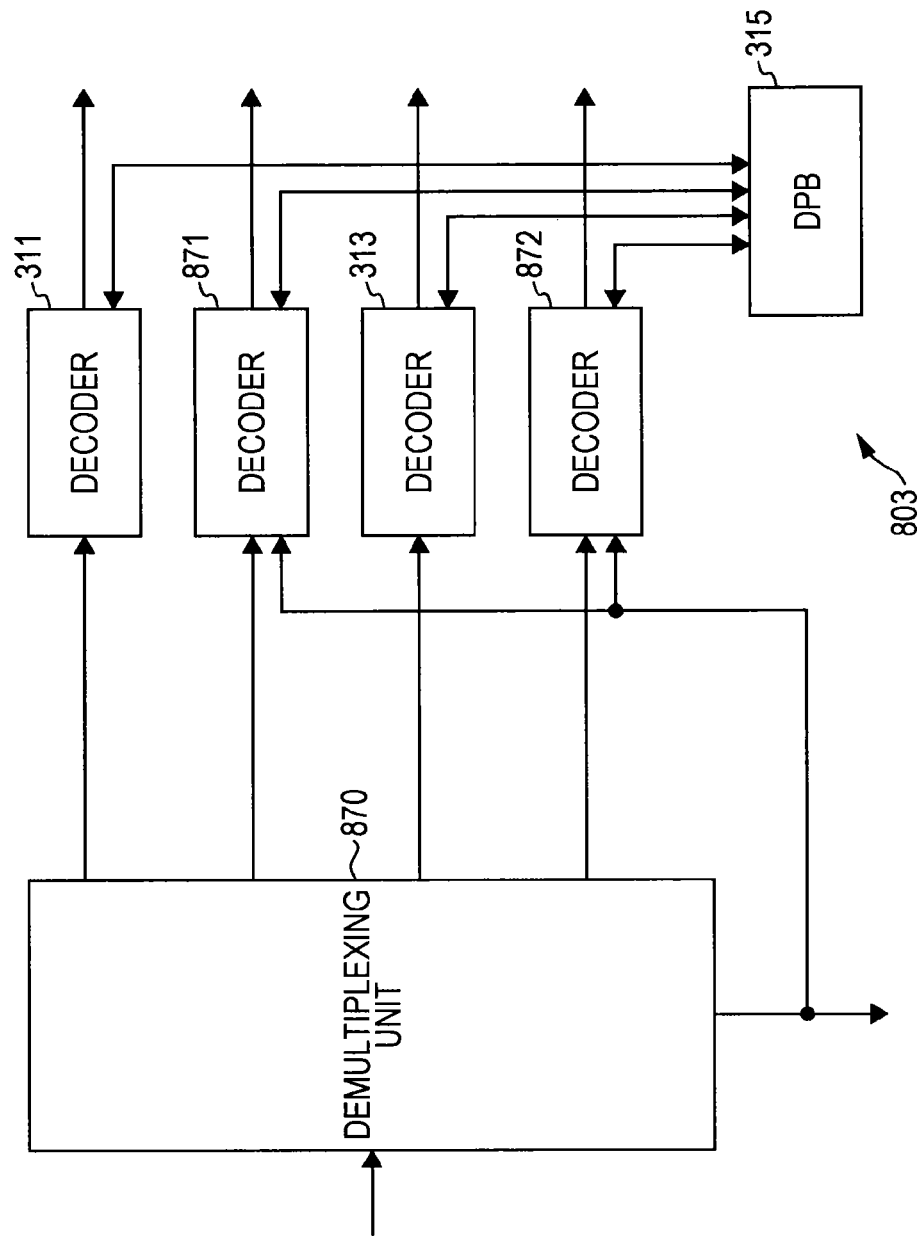
FIG. 47 is a block diagram illustrating a configuration example of a multi-viewpoint image decoding device in FIG. 40.

FIG. 47 is a block diagram illustrating a configuration example of the multi-viewpoint image decoding device 803 in FIG. 40.

Of configuration illustrated in FIG. 47, the same configuration as the configuration in FIG. 10 is denoted with the same reference numeral. Redundant description will be omitted as appropriate.

The configuration of the multi-viewpoint image decoding device 803 in FIG. 47 differs from the configuration in FIG. 10 principally in that a demultiplexing unit 870, a decoder 871, and a decoder 872 are provided instead of the demultiplexing unit 310, decoder 312, and decoder 314, and in that the reception unit 316 is not provided.

The multi-viewpoint image decoding device 803 in FIG. 47 is a decoding device configured to decode data obtained by encoding images of multiple viewpoints using the MVC format for example.

The demultiplexing unit 870 serves as a reception unit, and receives the bitstream transferred from the multi-viewpoint image encoding device 802 in FIG. 40. The demultiplexing unit 870 separates, from the received bitstream, encoded data of a color image of the viewpoint A, encoded data of color images of the viewpoints BC, encoded data of a disparity information image of the viewpoint A, encoded data of disparity information images of the viewpoints BC, and multiplexed information.

The demultiplexing unit 870 supplies the encoded data of the color image of the viewpoint A to the decoder 311, encoded data of the viewpoint BC color images to the decoder 871, encoded data of the disparity information image of the viewpoint A to the decoder 313, and encoded data of the viewpoint BC disparity information images to the decoder 872, respectively. Also, the demultiplexing unit 870 supplies the multiplexed information to the decoder 871, decoder 872, and image inverse conversion processing device 804 in FIG. 40.

The decoder 871 decodes the encoded data of the viewpoint BC color images using the multiplexed information supplied from the demultiplexing unit 870, and supplies viewpoint BC color images obtained as a result thereof to the DPB 315 and image inverse conversion processing device 804.

The decoder 872 decodes the encoded data of the viewpoint BC disparity information images using the multiplexed information supplied from the demultiplexing unit 870, and supplies viewpoint BC disparity information images obtained as a result thereof to the DPB 315 and image inverse conversion processing device 804.

Configuration Example of Decoder 871

Figure 48:
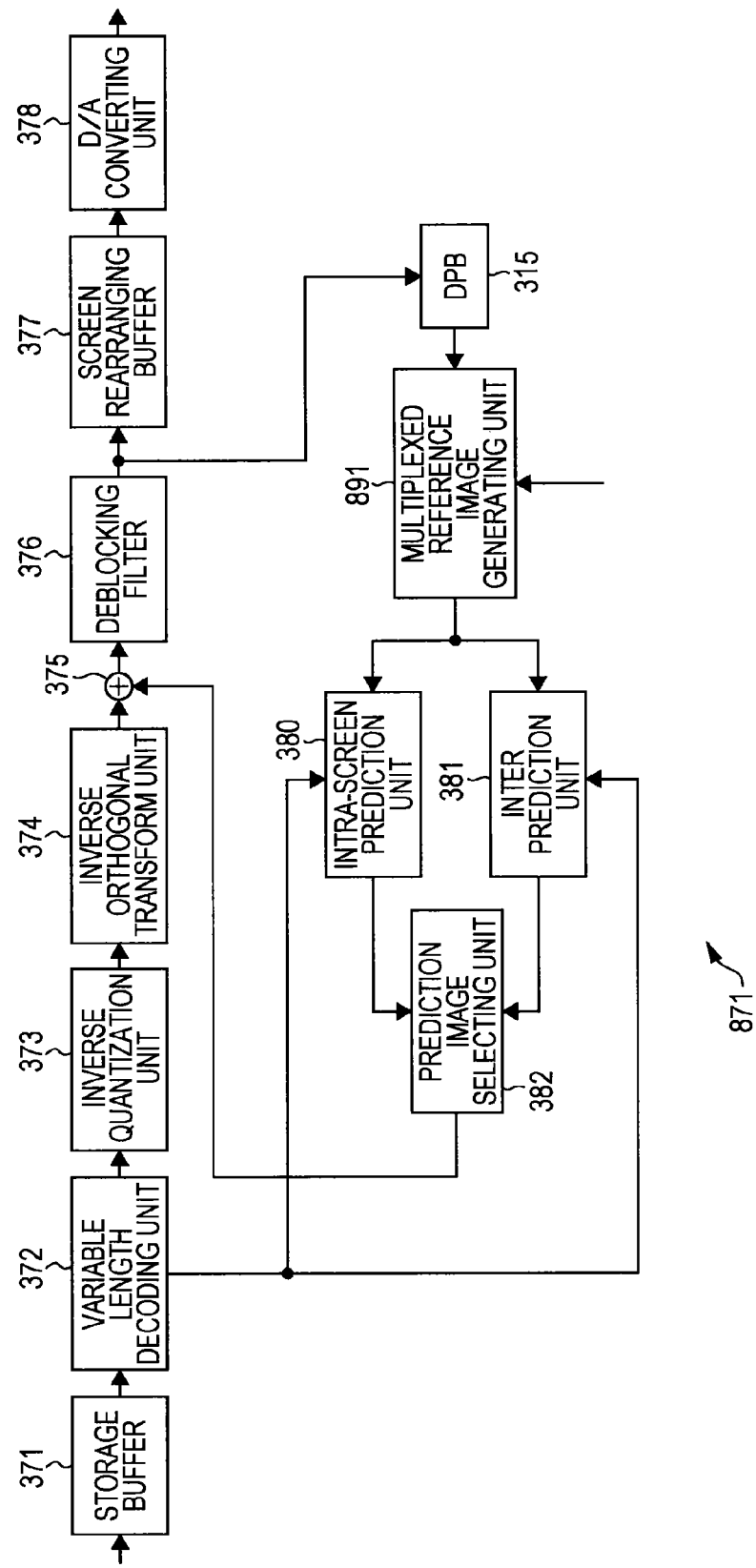
FIG. 48 is a block diagram illustrating a configuration example of a decoder in FIG. 47.

FIG. 48 is a block diagram illustrating a configuration example of the decoder 871 in FIG. 47.

Note that the decoder 872 in FIG. 47 is also configured in the same way as the decoder 871, and performs decoding of images in accordance with the MVC format, for example.

Of configuration illustrated in FIG. 48, the same configuration as the configuration in FIG. 12 is denoted with the same reference numeral. Redundant description will be omitted as appropriate.

The configuration of the decoder 871 in FIG. 48 differs from the configuration in FIG. 12 principally in that a multiplexed reference image generating unit 891 is provided instead of the low-resolution reference image generating unit 379.

The multiplexed reference image generating unit 891 supplies, in the same way as the low-resolution reference image generating unit 379 in FIG. 12, a portion of a decoded image of the current picture read out from the DPB 315 as a prediction image of the current block to the intra-screen prediction unit 380 without change.

Also, the multiplexed reference image generating unit 891 subjects the picture of the decoded viewpoint A color image read out from the DPB 315 as a reference picture to resolution reduction processing to set the resolution of the decoded viewpoint A color image to a half, and replicates two decoded viewpoint A color images. Also, the multiplexed reference image generating unit 891 serves as a multiplexing unit, and multiplexes the two replicated decoded viewpoint A color images after resolution reduction processing using the multiplexing method for the viewpoint BC multiplexed image based on the multiplexed information supplied from the demultiplexing unit 870 in FIG. 47. The multiplexed reference image generating unit 891 supplies the viewpoint A multiplexed color image obtained as a result of multiplexing to the inter prediction unit 381.

Further, the multiplexed reference image generating unit 891 supplies, in the same way as the low-resolution reference image generating unit 379, a picture different from the current picture of the decoded viewpoint B color image read out from the DPB 315 as a reference picture to the inter prediction unit 381 without change.

Description of Processing of Decoder 871

Figure 49:
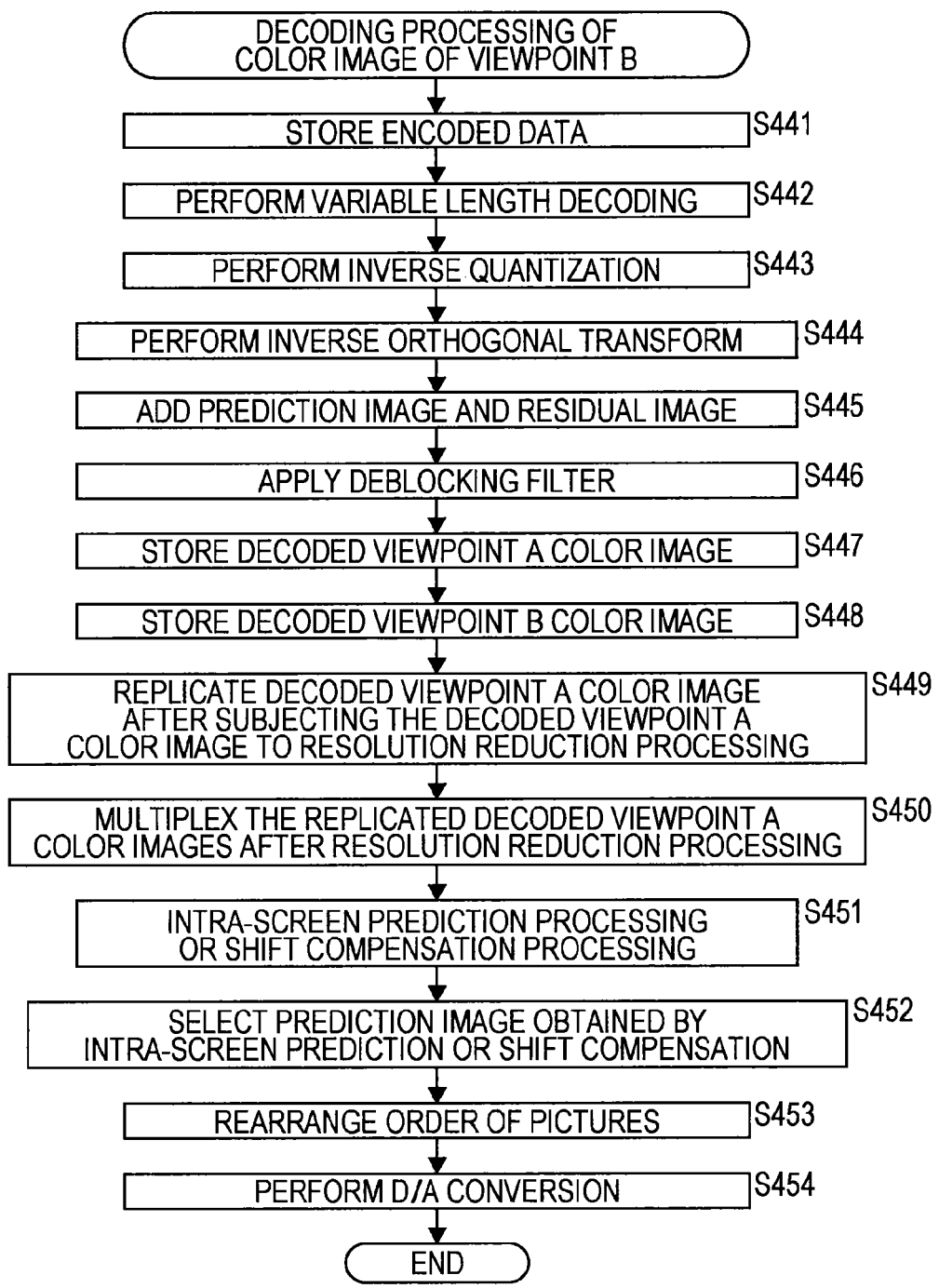
FIG. 49 is a flowchart for describing decoding processing to be performed by the decoder in FIG. 48.

FIG. 49 is a flowchart for describing decoding processing for decoding encoded data of the viewpoint BC color images that the decoder 871 in FIG. 48 performs in step S391 in FIG. 43.

Processing in steps S441 to S448 is the same as the processing in steps S111 to S118 in FIG. 14, and accordingly, description will be omitted.

After the processing in step S448, in step S449 the multiplexed reference image generating unit 891 subjects the picture of the decoded viewpoint A color image read out from the DPB 315 as a candidate picture to resolution reduction processing to set the resolution of the decoded viewpoint A color image to a half, and replicates two decoded viewpoint A color images. The processing then proceeds to step S450.

In step S450, the multiplexed reference image generating unit 891 multiplexes the pictures of the two replicated decoded viewpoint A color images after resolution reduction processing using the multiplexing method for the viewpoint BC multiplexed image based on the multiplexed information supplied from the demultiplexing unit 870. The multiplexed reference image generating unit 891 then supplies a viewpoint A multiplexed color image obtained as a result thereof to the inter prediction unit 381.

Also, the multiplexed reference image generating unit 891 supplies a portion of a decoded image of the current picture read out from the DPB 315 as a prediction image of the current block to the intra-screen prediction unit 380 without change. Further, the multiplexed reference image generating unit 891 supplies a picture different from the current picture of the decoded viewpoint B color image read out from the DPB 315 as a reference picture to the inter prediction unit 381 without change. The processing then proceeds to step S451.

Processing in steps S451 to S454 is the same as the processing in steps S120 to S123 in FIG. 14, and accordingly, description will be omitted.

As described above, the image processing system 800 decodes encoded data of the viewpoint BC multiplexed image configured of the viewpoint image B and viewpoint image C of which the resolutions are lowered than the resolution of the viewpoint image A with reference to the viewpoint A multiplexed image having the same resolution as with the viewpoint BC multiplexed image. Accordingly, the image processing system 800 can decode encoded data of the viewpoint BC multiplexed image using a method employing the MVC format or the like.

Note that, though drawing will be omitted, the second and third embodiments may be combined. Specifically, at the encoder 811 and encoder 812 in FIG. 44, and the decoder 871 and decoder 872 in FIG. 47, the viewpoint A multiplexed image subjected to warping may also be referenced.

Also, with the present embodiment, the viewpoint B low-resolution information and multiplexed information have been added to (described in) encoded data, and the viewpoint A low-resolution information has been transferred aside from the encoded data, but the transfer method is not restricted to this.

For example, the viewpoint A low-resolution information, viewpoint B low-resolution information, and multiplexed information may be transferred (recorded) independently of image data (or bitstream), or may be transferred after being combined.

However, with the present embodiment, "combined" will be defined as follows. "combined" indicates a state in which image data (or bitstream), viewpoint A low-resolution information, viewpoint B low-resolution information, and multiplexed information are mutually linked. The image data, viewpoint A low-resolution information, viewpoint B low-resolution information, and multiplexed information to be combined may be multiplexed and transferred by the same transfer path, or may be transferred by different transfer paths. Also, the image data (or bitstream), viewpoint A low-resolution information, viewpoint B low-resolution information, and multiplexed information to be combined may be recorded in the same recording medium, or may mutually be recorded in different recording media (or different recording areas within the same recording medium). Note that increments to link the image data (or bitstream), viewpoint A low-resolution information, viewpoint B low-resolution information, and multiplexed information may be encoding processing increments (single frame, multiple frames, or the like).

Also, the viewpoint A low-resolution information, viewpoint B low-resolution information, and multiplexed information may be transferred after being encoded.

Fourth Embodiment

Description of Computer to which the Present Technology has been Applied

The above-described series of processing may be executed by hardware, or may be executed by software. In the event of executing the series of processing by software, a program making up the software thereof is installed in a general-purpose computer.

Figure 51:
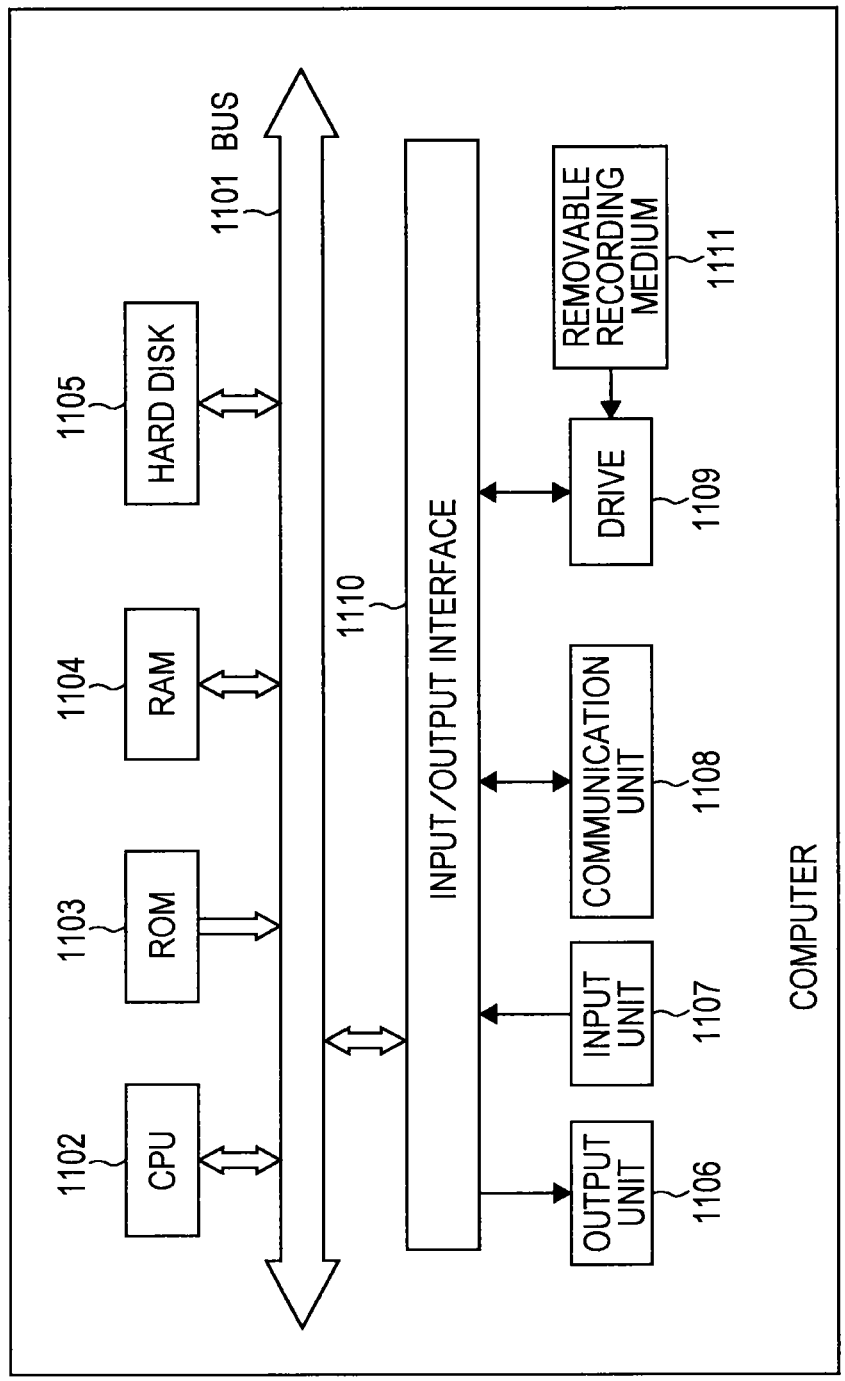
FIG. 51 is a diagram illustrating a configuration example of an embodiment of a computer.

Accordingly, FIG. 51 illustrates a configuration example of an embodiment of a computer to which a program to execute the above-described series of the processing is installed.

The program can be recorded beforehand in a hard disk 1105 or ROM 1103 serving as a recording medium built into the computer.

Alternatively, the program may be stored (recorded) in a removable recording medium 1111. Such a removable recording medium 1111 can be provided as so-called packaged software. Examples of the removable recording medium 1111 here include a flexible disk, CD-ROM (Compact Disc Read Only Memory), MO (Magneto Optical) disk, DVD (Digital Versatile Disc), magnetic disk, semiconductor memory, and so forth.

Note that besides from being installed in the computer from a removable recording medium 1111 such as described above, the program can be downloaded to the computer via a communication network or broadcast network, and installed in a built-in hard disk 1105. That is, the program can be wirelessly transferred to the computer from a download site via satellite for digital satellite broadcasting, or transferred to the computer over cable via a network such as a LAN (Local Area Network) or the Internet, for example.

The computer has a CPU (Central Processing Unit) 1102 built in, with an input/output interface 1110 connected to the CPU 1102 via a bus 1101.

Upon an instruction being input via the input/output interface 1110, by a user operating an input unit 1107 or the like, the CPU 1102 accordingly executes a program stored in ROM (Read Only Memory) 1103. Alternatively, the CPU 1102 loads a program stored in the hard disk 1105 to RAM (Random Access Memory) 1104 and executes this.

Accordingly, the CPU 1102 performs processing following the above-described flowcharts, or processing performed by the configuration of the block diagrams described above. The CPU 1102 then outputs the processing results from an output unit 1106, or transmits from a communication unit 1108, or further records in the hard disk 1105, or the like, via the input/output interface 1110, for example, as appropriate.

Note that the input unit 1107 is configured of a keyboard, mouse, microphone, and so forth. Also, the output unit 1106 is configured of an LCD (Liquid Crystal Display) and speaker or the like.

Now, with the Present Specification, processing which the computer performs following the program does not necessarily have to be performed in the time sequence following the order described in the flowcharts. That is to say, the processing which the computer performs following the program includes processing executed in parallel or individually (e.g., parallel processing or object-oriented processing).

Also, the program may be processed by one computer (processor), or may be processed in a decentralized manner by multiple computers. Further, the program may be transferred to and executed by a remote computer.

The present technology may be applied to an image processing system used in communicating via network media such as satellite broadcast, cable TV (television), the Internet, and cellular phones or the like, or in processing on recording media such as optical or magnetic disks, flash memory, or the like.

Also note that at least part of the above-described image processing system may be applied to optionally selected electronic devices. The following is a description of examples thereof.

Fifth Embodiment

Configuration Example of Television Device

Figure 52:
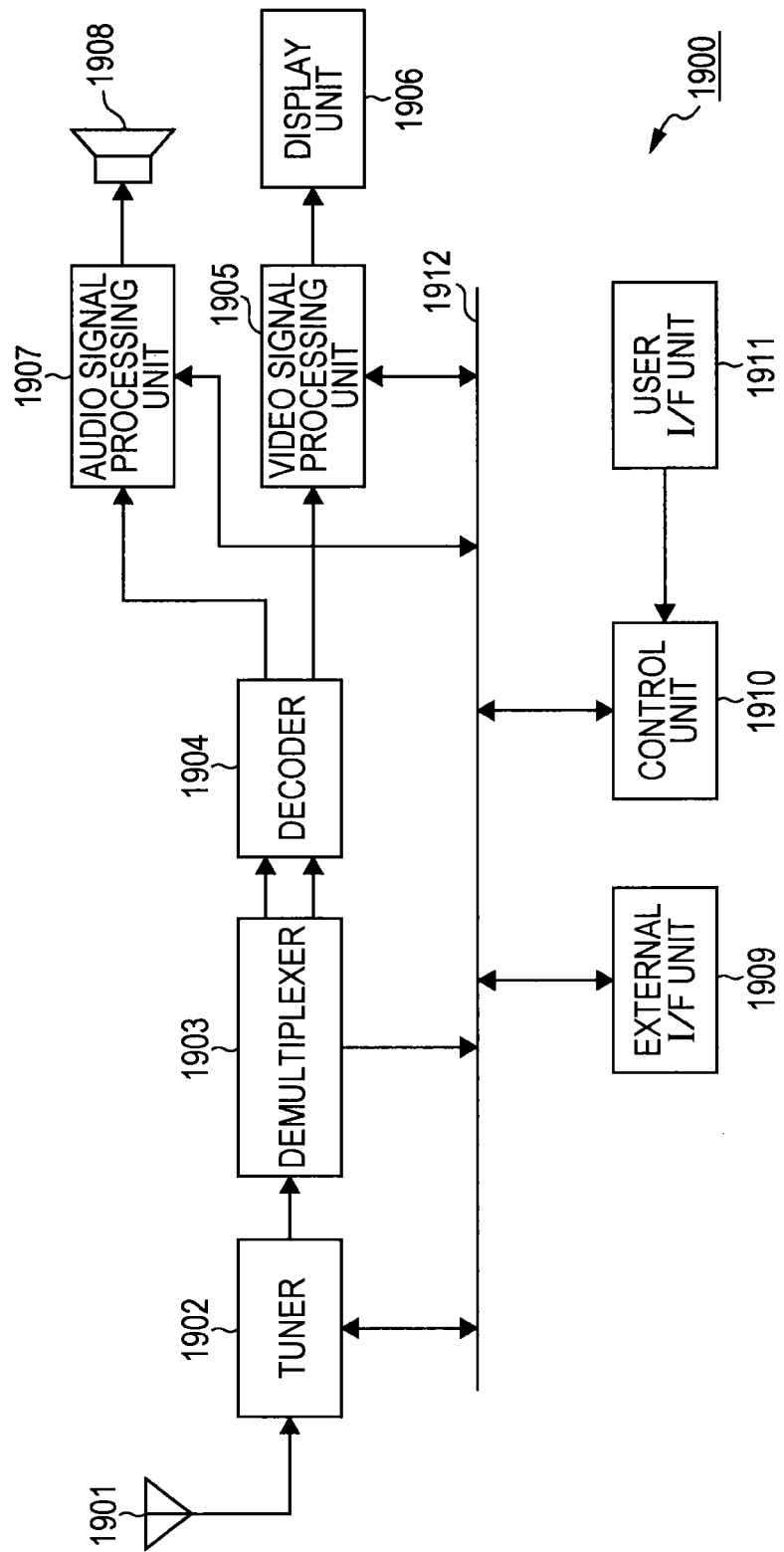
FIG. 52 is a diagram illustrating a schematic configuration example of a television device to which the present technology has been applied.

FIG. 52 exemplifies a schematic configuration of a television device to which the present technology has been applied. The television device 1900 is configured of an antenna 1901, a tuner 1902, a demultiplexer 1903, a decoder 1904, a video signal processing unit 1905, a display unit 1906, an audio signal processing unit 1907, a speaker 1908, and an external interface unit 1909. The television device 1900 further has a control unit 1910, a user interface unit 1911, and so forth.

The tuner 1902 tunes to a desired channel from the broadcast signal received via the antenna 1901, and performs demodulation, and outputs an obtained encoded bitstream to the demultiplexer 1903.

The demultiplexer 1903 extracts packets of video and audio which are a program to be viewed, from the encoded bitstream, and outputs the extracted packet data to the decoder 1904. Also, the demultiplexer 1903 supplies packets of data such as EPG (Electronic Program Guide) to the control unit 1910. Note that the demultiplexer or the like may perform descrambling when scrambled.

The decoder 1904 performs packet decoding processing, and outputs video data generated by decoding processing to the video signal processing unit 1905, and audio data to the audio signal processing unit 1907.

The video signal processing unit 1905 performs noise reduction and video processing according to user settings on the video data. The video signal processing unit 1905 generates video data of programs to display on the display unit 1906, image data according to processing based on applications supplied via a network, and so forth. Also, the video signal processing unit 1905 generates video data for displaying a menu screen or the like for selecting items or the like, and superimpose these on the video data of a program. The video signal processing unit 1905 performs generates driving signals based on the video data generated in this way, and drives the display unit 1906.

The display unit 1906 is driven by driving signals supplied from the video signal processing unit 1905, and drives a display device (e.g., liquid crystal display device or the like) to display video of the program and so forth.

The audio signal processing unit 1907 subjects audio data to predetermined processing such as noise removal and the like, performs D/A conversion processing and amplification processing on the processed audio data, and performs audio output by supplying to the speaker 1908.

The external interface unit 1909 is an interface to connect to external devices or a network, and performs transmission/reception of data such as video data, audio data, and so forth.

The user interface unit 1911 is connected to the control unit 1910. The user interface unit 1911 is configured of operating switches, a remote control signal reception unit, and so forth, and supplies operating signals corresponding to user operations to the control unit 1910.

The control unit 1910 is configured of a CPU (Central Processing Unit), and memory and so forth. The memory stores programs to be executed by the CPU, various types of data necessary for the CPU to perform processing, EPG data, data acquired through a network, and so forth. Programs stored in the memory are read and executed by the CPU at a predetermined timing, such as starting up the television device 1900. The CPU controls each part so as to realize the operation of the television device 1900 according to user operations, by executing programs.

Note that the television device 1900 is provided with a bus 1912 for connecting the tuner 1902, demultiplexer 1903, video signal processing unit 1905, audio signal processing unit 1907, external interface unit 1909, and so forth, with the control unit 1910.

With the television device thus configured, the decoder 1904 is provided with a function serving as a decoding device (decoding method) according to the present technology. Therefore, encoded data encoded so as to reduce the data amount of encoded data of images of multiple viewpoints can be decoded.

Sixth Embodiment

Configuration Example of Cellular Telephone

Figure 53:
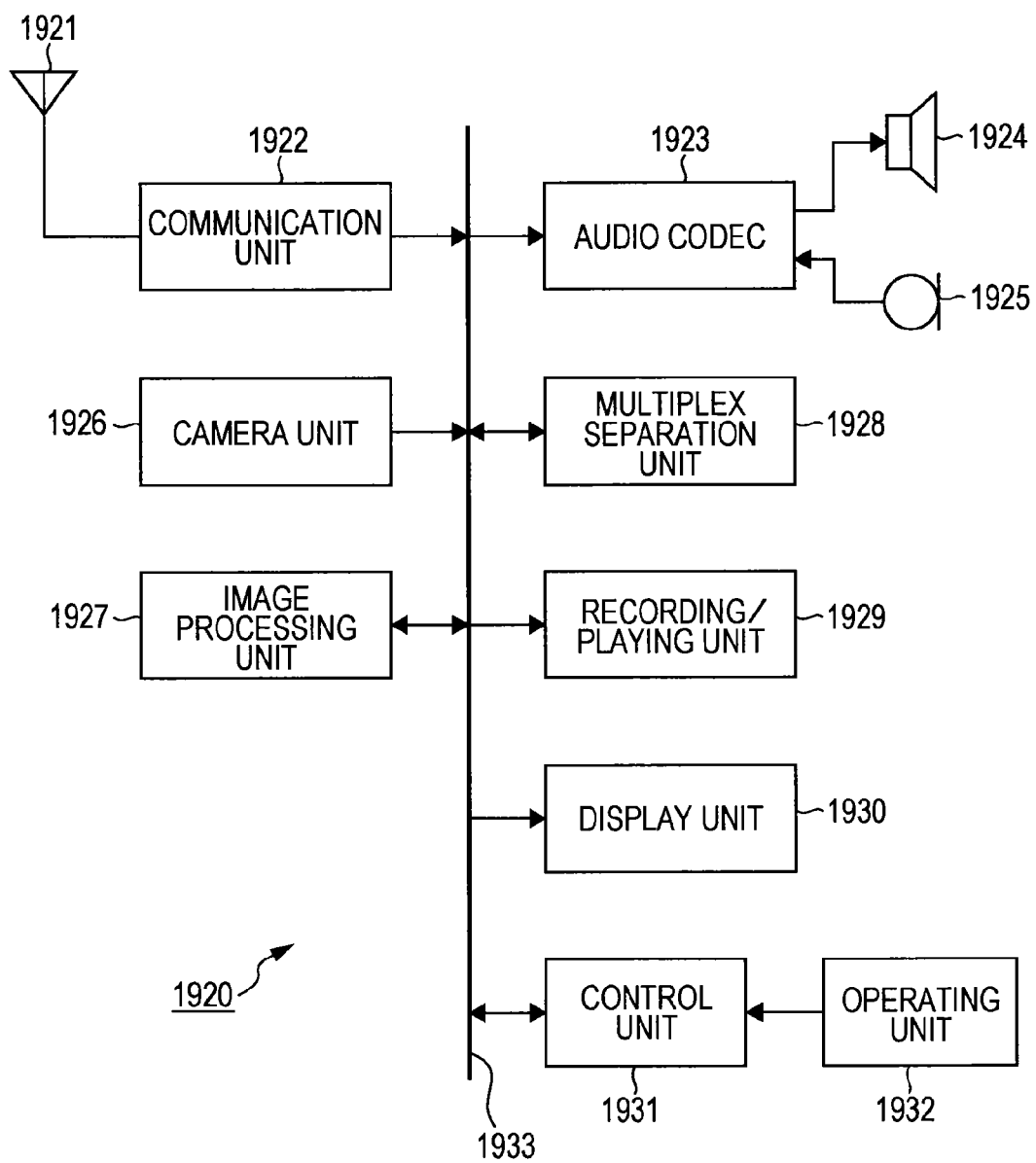
FIG. 53 is a diagram illustrating a schematic configuration example of a cellular telephone to which the present technology has been applied.

FIG. 53 exemplifies a schematic configuration of a cellular telephone to which the present technology has been applied. The cellular telephone 1920 is configured of a communication unit 1922, an audio codec 1923, a camera unit 1926, an image processing unit 1927, a multiplex separation unit 1928, a recording/playing unit 1929, a display unit 1930, and a control unit 1931. These are mutually connected via a bus 1933.

Also, an antenna 1921 is connected to the communication unit 1922, and a speaker 1924 and a microphone 1925 are connected to the audio codec 1923. Further, an operating unit 1932 is connected to the control unit 1931.

The cellular telephone 1920 performs various operations such as transmission and reception of audio signals, transmission and reception of e-mails or image data, shooting of an image, recording of data, and so forth, in various operation modes including a voice call mode, a data communication mode, and so forth.

In the voice call mode, the audio signal generated by the microphone 1925 is converted at the audio codec 1923 into audio data and subjected to data compression, and is supplied to the communication unit 1922. The communication unit 1922 performs modulation processing and frequency conversion processing and the like of the audio data to generate transmission signals. The communication unit 1922 also supplies the transmission signals to the antenna 1921 so as to be transmitted to an unshown base station. The communication unit 1922 also performs amplifying, frequency conversion processing, demodulation processing, and so forth, of reception signals received at the antenna 1921, and supplies the obtained audio data to the audio codec 1923. The audio codec 1923 decompresses the audio data and performs conversion to analog audio signals, and outputs to the speaker 1924.

Also, in the data communication mode, in the event of performing e-mail transmission, the control unit 1931 accepts character data input by operations at the operating unit 1932, and displays the input characters on the display unit 1930. Also, the control unit 1931 generates e-mail data based on user instructions at the operating unit 1932 and so forth, and supplies to the communication unit 1922. The communication unit 1922 performs modulation processing and frequency conversion processing and the like of the e-mail data, and transmits the obtained transmission signals from the antenna 1921. Also, the communication unit 1922 performs amplifying and frequency conversion processing and demodulation processing and so forth as to reception signals received at the antenna 1921, and restores the e-mail data. This e-mail data is supplied to the display unit 1930 and the contents of the e-mail are displayed.

Note that the cellular telephone 1920 may store received e-mail data in a storage medium at the recording/playing unit 1929. The storage medium may be any storage medium that is rewritable. For example, the storage medium may be semiconductor memory such as RAM or built-in flash memory, or a hard disk, a magnetic disk, magneto-optical disk, optical disc, USB memory, or a memory card or the like removable media.

In the event of transmitting image data in the data communication mode, image data generated at the camera unit 1926 is supplied to the image processing unit 1927. The image processing unit 1927 performs encoding processing of the image data to generate encoded data.

The multiplex separation unit 1928 multiplexes encoded data generated at the image processing unit 1927 and audio data supplied from the audio codec 1923, according to a predetermined format, supplies to the communication unit 1922. The communication unit 1922 performs modulation processing and frequency conversion processing and so forth of the multiplexed data, and transmits the obtained transmission signals from the antenna 1921. Also, the communication unit 1922 performs amplifying and frequency conversion processing and demodulation processing and so forth as to reception signals received at the antenna 1921, and restores the multiplexed data. This multiplexed data is supplied to the multiplex separation unit 1928. The multiplex separation unit 1928 separates the multiplexed data, and supplies the encoded data to the image processing unit 1927, and the audio data to the audio codec 1923. The image processing unit 1927 performs decoding processing of the encoded data to generate image data. This image data is supplied to the display unit 1930 and the received image is displayed. The audio codec 1923 converts the audio data into analog audio signals and supplies to the speaker 1924 to output the received audio.

With the cellular telephone device thus configured, the image processing unit 1927 is provided with functions serving as the encoding device (encoding method) and decoding device (decoding method) according to the present technology. Therefore, the data amount of encoded data of images of multiple viewpoints can be reduced. Also, encoded data encoded so as to reduce the data amount of encoded data of images of multiple viewpoints can be decoded.

Seventh Embodiment

Configuration Example of Recording/Playing Device

Figure 54:
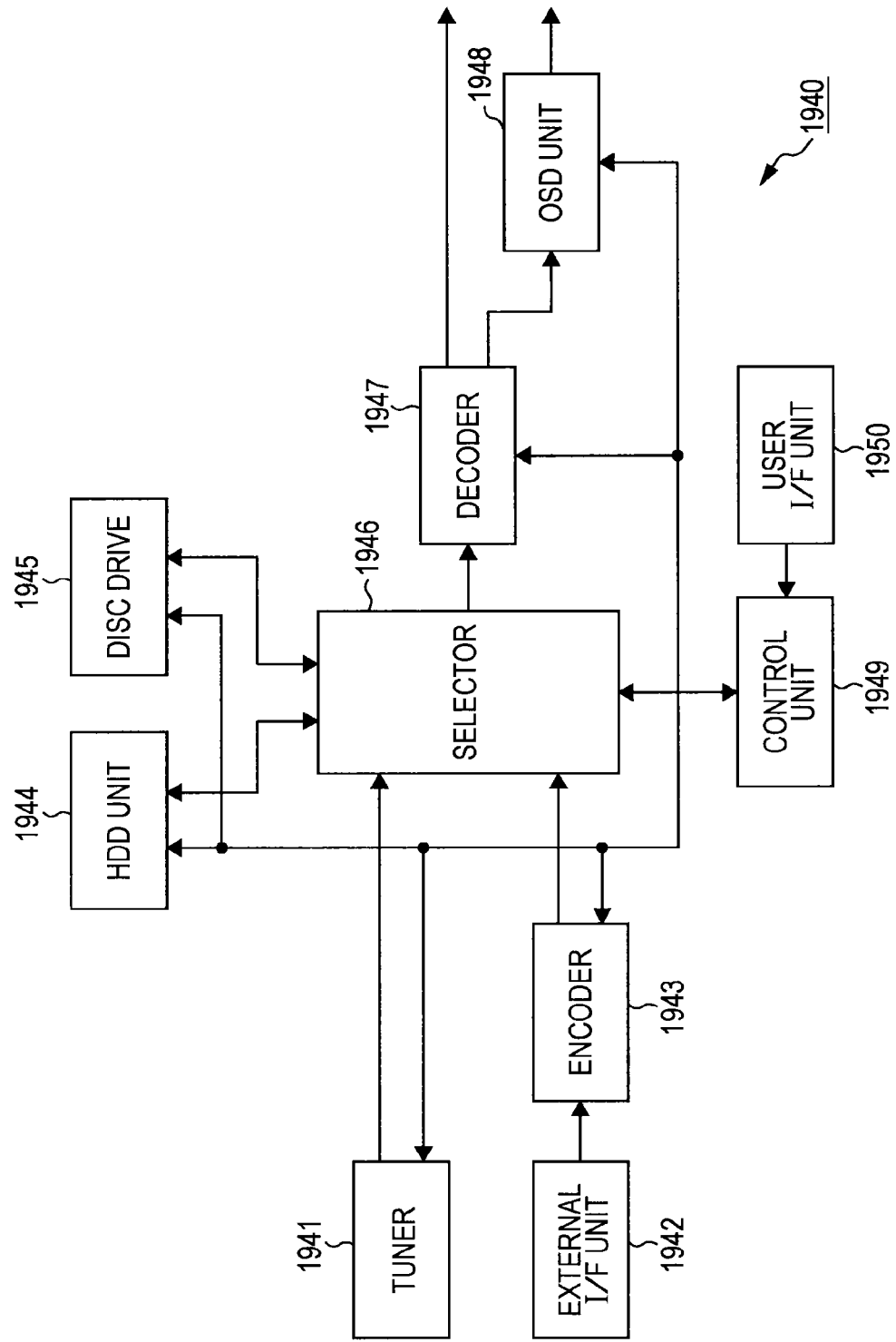
FIG. 54 is a diagram illustrating a schematic configuration example of a recording/playing device to which the present technology has been applied.

FIG. 54 exemplifies a schematic configuration of a recording/playing device to which the present technology has been applied. The recording/playing device 1940 records audio data and video data of a received broadcast program, for example, in a recording medium, and provides the recorded data to the user at a timing instructed by the user. Also, the recording/playing device 1940 may acquire audio data and video data from other devices, for example, and may record these to the recording medium. Further, the recording/playing device 1940 can decode output audio data and video data recorded in the recording medium, so that image display and audio output can be performed at a monitor device or the like.

The recording/playing device 1940 includes a tuner 1941, an external interface unit 1942, an encoder 1943, an HDD (Hard Disk Drive) unit 1944, a disc drive 1945, a selector 1946, a decoder 1947, an OSD (On-Screen Display) unit 1948, a control unit 1949 and an user interface unit 1950.

The tuner 1941 tunes a desired channel from broadcast signals received via an unshown antenna. The tuner 1941 outputs an encoded bitstream obtained by demodulation of the reception signals of the desired channel to the selector 1946.

The external interface unit 1942 is configured of at least one of an IEEE1394 interface, a network interface unit, USB interface, flash memory interface, or the like. The external interface unit 1942 is an interface to connect to external deices and network, memory cards, and so forth, and receives data such as video data and audio data and so forth to be recorded.

When the video data and audio data supplied from the external interface unit 1942 are not encoded, the encoder 1943 performs encoding with a predetermined format, and outputs an encoded bitstream to the selector 1946.

The HDD unit 1944 records content data of video and audio and so forth, various programs, other data, and so forth, an internal hard disk, and also reads these from this hard disk at the time of playing or the like.

The disc drive 1945 performs recording and playing of signals to and from the mounted optical disc. The optical disc is, for example, DVD disc (DVD-Video, DVD-RAM, DVD-R, DVD-RW, DVD+R, DVD+RW or the like) or Blu-ray disc or the like.

The selector 1946 selects an encoded bitstream input either from the tuner 1941 or the encoder 1943 at the time of recording of video and audio, and supplies to the HDD unit 1944 or the disc drive 1945. Also, the selector 1946 supplies the encoded bitstream output from the HDD unit 1944 or the disc drive 1945 to the decoder 1947 at the time of playing of video or audio.

The decoder 1947 performs decoding processing of the encoded bitstream. The decoder 1947 supplies video data generated by performing decoding processing to the OSD unit 1948. Also, the decoder 1947 outputs audio data generated by performing decoding processing.

The OSD unit 1948 generates video data to display menu screens and the like of item selection and so forth, and superimposes on video data output from the decoder 1947, and outputs.

The user interface unit 1950 is connected to the control unit 1949. The user interface unit 1950 is configured of operating switches and a remote control signal reception unit and so forth, and operation signals in accordance with user operations are supplied to the control unit 1949.

The control unit 1949 is configured of a CPU and memory and so forth. The memory stores programs executed by the CPU, and various types of data necessary for the CPU to perform processing. Programs stored in memory are read out by the CPU at a predetermined timing, such as at the time of startup of the recording/playing device 1940, and executed. The CPU controls each part so as to realize the operation of the recording/playing device 1940 in accordance with the user operations, by executing the programs.

With the recording/playing device thus configured, the decoder 1947 is provided with a function serving as the decoding device (decoding method) according to the present technology. Therefore, encoded data encoded so as to reduce the data amount of encoded data of images of multiple viewpoints can be decoded.

Eighth Embodiment

Configuration Example of Imaging Apparatus

Figure 55:
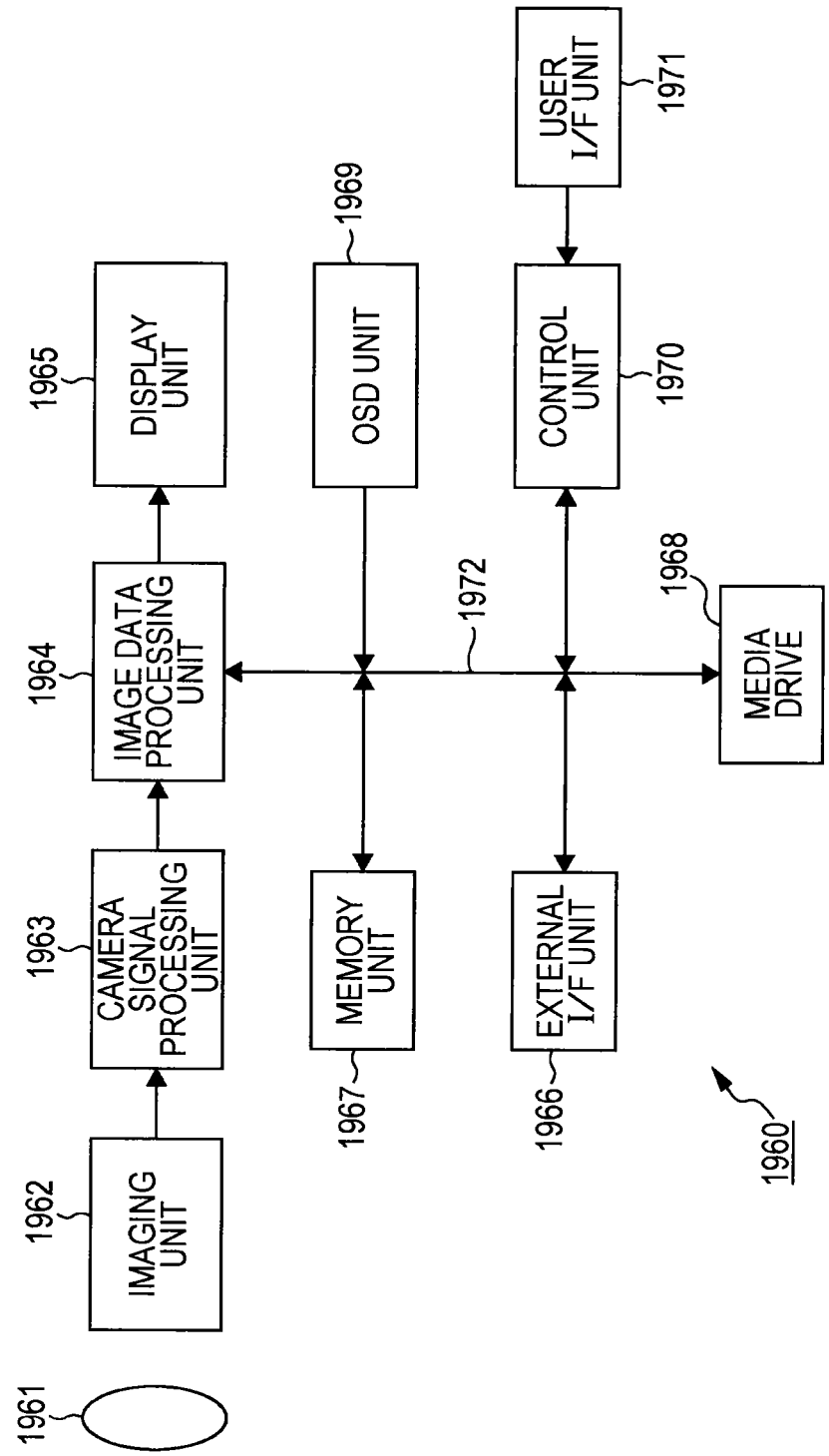
FIG. 55 is a diagram illustrating a schematic configuration example of an imaging apparatus to which the present technology has been applied.

FIG. 55 exemplifies a schematic configuration of an imaging apparatus to which the present technology has been applied. The imaging apparatus 1960 images a subject, and displays an image of the subject on a display unit, or records this as image data to a recording medium.

The imaging apparatus 1960 is configured of an optical block 1961, an imaging unit 1962, a camera signal processing unit 1963, an image data processing unit 1964, a display unit 1965, an external interface unit 1966, a memory unit 1967, a media drive 1968, an OSD unit 1969, and a control unit 1970. Also, a user interface unit 1971 is connected to the control unit 1970. Further, the image data processing unit 1964, external interface unit 1966, memory unit 1967, media drive 1968, OSD unit 1969, control unit 1970, and so forth, are connected via a bus 1972.

The optical block 1961 is configured of a focusing lens and diaphragm mechanism and so forth. The optical block 1961 images an optical image of the subject on an imaging face of the imaging unit 1962. The imaging unit 1962 is configured of an image sensor such as a CCD or a CMOS, generates electric signals according to optical images by photoelectric conversion, and supplies to the camera signal processing unit 1963.

The camera signal processing unit 1963 performs various kinds of camera signal processing such as KNEE correction, gamma correction, color correction, and so forth, on electric signals supplied from the imaging unit 1962. The camera signal processing unit 1963 supplies image data after the camera signal processing to the image data processing unit 1964.

The image data processing unit 1964 performs encoding processing on the image data supplied from the camera signal processing unit 1963. The image data processing unit 1964 supplies the encoded data generated by performing the encoding processing to the external interface unit 1966 or media drive 1968. Also, the image data processing unit 1964 performs decoding processing of encoded data supplied from the external interface unit 1966 or the media drive 1968. The image data processing unit 1964 supplies the image data generated by performing the decoding processing to the display unit 1965. Also, the image data processing unit 1964 performs processing of supplying image data supplied from the camera signal processing unit 1963 to the display unit 1965, or superimposes data for display acquired from the OSD unit 1969 on image data, and supplies to the display unit 1965.

The OSD unit 1969 generates data for display such as a menu screen or icons or the like, formed of symbols, characters, and shapes, and outputs to the image data processing unit 1964.

The external interface unit 1966 is configured, for example, as a USB input/output terminal, and connects to a printer at the time of printing of an image. Also, a drive is connected to the external interface unit 1966 as necessary, removable media such as a magnetic disk or an optical disc is mounted on the drive as appropriate, and a computer program read out from the removable media is installed as necessary. Furthermore, the external interface unit 1966 has a network interface which is connected to a predetermined network such as a LAN or the Internet or the like. The control unit 1970 can read out encoded data from the memory unit 1967 following instructions from the user interface unit 1971, for example, and supply this to another device connected via a network from the external interface unit 1966. Also, the control unit 1970 can acquire encoded data and image data supplied from another device via a network by way of the external interface unit 1966, and supply this to the image data processing unit 1964.

For example, the recording medium driven by the media drive 1968 may be any readable/writable removable media, such as a magnetic disk, a magneto-optical disk, an optical disc, semiconductor memory, or the like. Also, for the recording media, the type of removable media is optional, and may be a tape device, or may be a disk, or may be a memory card. As a matter of course, this may be a contact-free IC card or the like.

Also, the media drive 1968 and recording media may be integrated, and configured of a non-portable storage medium, such as a built-in hard disk drive or SSD (Solid State Drive) or the like, for example.

The control unit 1970 is configured using a CPU and memory and the like. The memory stores programs to be executed by the CPU, and various types of data necessary for the CPU to perform the processing. A program stored in the memory is read out by the CPU at a predetermined timing such as at startup of the imaging apparatus 1960, and is executed. The CPU controls the parts so as to realize the operations of the imaging apparatus 1960 according to the user operations, by executing the program.

With the imaging apparatus thus configured, the image data processing unit 1964 is provided with functions serving as the encoding device (encoding method) and decoding device (decoding method) according to the present technology. Therefore, the data amount of encoded data of images of multiple viewpoints can be reduced. Also, encoded data encoded so as to reduce the data amount of encoded data of images of multiple viewpoints can be decoded.

Note that embodiments of the present technology are not restricted to the above-described embodiments, and that various modifications can be made without departing from the essence of the present technology.

Note that the present technology may also be configured as follows.

(1) An encoding device including:

a first viewpoint resolution reduction processing unit configured to subject, in the event of encoding an image of a second viewpoint different from the first viewpoint, having lower resolution than the resolution of an image of a first viewpoint, the image of the first viewpoint to resolution reduction processing to reduce resolution so that the resolution of the image of the first viewpoint agrees with the resolution of the image of the second viewpoint;

a prediction unit configured to generate a prediction image of the image of the second viewpoint with reference to the image of the first viewpoint after resolution reduction processing by the first viewpoint resolution reduction processing unit; and an encoding unit configured to encode the image of the second viewpoint using the prediction image generated by the prediction unit.

(2) The encoding device according to (1), further including:

a multiplexing unit configured to replicate, in the event of encoding a multiplexed image which is an image multiplexed from a plurality of images of the different second viewpoints, the image of the first viewpoint after resolution reduction processing by the first viewpoint resolution reduction processing unit only times equivalent to the number of the images of the second viewpoints making up the multiplexed image, and to multiplex the replicated images;

wherein the prediction unit generates prediction images of the images of the second viewpoints with reference to the image of the first viewpoint multiplexed by the multiplexing unit.

(3) The encoding device according to (1), further including:

a detecting unit configured to detect resolution of the image of the second viewpoint;

wherein the first viewpoint resolution reduction processing unit subjects the image of the first viewpoint to resolution reduction processing based on resolution determined by the detecting unit.

(4) The encoding device according to (1) or (3), further including:

a warping unit configured to generate a warped image which is an image obtained by converting the image of the first viewpoint after resolution reducing processing into an image obtained at the second viewpoint by subjecting the image of the first viewpoint after resolution reducing processing by the first viewpoint resolution reduction processing unit to warping;

wherein the prediction unit generates the prediction image with reference to the warped image generated by the warping unit.

(5) The encoding device according to (4), further including:

a transmission unit configured to transmit encoded data of the image of the second viewpoint obtained as a result of encoding by the encoding unit, and information that represents that the warped image has been referenced for generation of the prediction image.

(6) The encoding device according to any of (1) to (5), further including:

a determining unit configured to determine whether to output the encoded data of the image of the second viewpoint based on the data amount of the encoded data of the image of the second viewpoint obtained as a result of encoding by the encoding unit, or encoding cost necessary for encoding of the image of the second viewpoint by the encoding unit;

wherein in the event that the determining unit has determined to output the encoded data of the image of the second viewpoint, the encoding unit outputs the encoded data of the image of the second viewpoint.

(7) The encoding device according to (1) or any of (3) to (6), further including:

a low-resolution conversion information generating unit configured to generate low-resolution conversion information that represents the type of the resolution reduction processing by the first viewpoint resolution reduction processing unit; and a transmission unit configured to transmit encoded data of the image of the second viewpoint obtained as a result of encoding by the encoding unit, and the low-resolution conversion information generated by the low-resolution conversion information generating unit.

(8) The encoding device according to (1) or any of (3) to (6), further including:

a second viewpoint resolution reduction processing unit configured to perform resolution reduction processing on the image of the second viewpoint having the same resolution as the image of the first viewpoint so that the resolution of the image of the second viewpoint is lower than the resolution of the image of the first viewpoint;

a low-resolution conversion information generating unit configured to generate low-resolution conversion information that represents the type of the resolution reduction processing by the second viewpoint resolution reduction processing unit; and a transmission unit configured to transmit encoded data of the image of the second viewpoint obtained as a result of encoding by the encoding unit, and the low-resolution conversion information generated by the low-resolution conversion information generating unit.

(9) An encoding method to be executed by an encoding device, including:

a first viewpoint resolution reducing step arranged to subject, in the event of encoding an image of a second viewpoint different from the first viewpoint, having lower resolution than the resolution of an image of a first viewpoint, the image of the first viewpoint to resolution reduction processing to reduce resolution so as to agree with the resolution of the image of the second viewpoint;

a prediction step arranged to generate a prediction image of the image of the second viewpoint with reference to the image of the first viewpoint after resolution reduction processing by the processing of the first viewpoint resolution reducing step; and an encoding step arranged to encode the image of the second viewpoint using the prediction image generated by the processing of the prediction step.

(10) A decoding device including:

a first viewpoint resolution reduction processing unit configured to subject, in the event of decoding encoded data of an image of a second viewpoint different from the first viewpoint, having lower resolution than the resolution of an image of a first viewpoint, the image of the first viewpoint to resolution reduction processing to reduce resolution so that the resolution of the image of the first viewpoint agrees with the resolution of the image of the second viewpoint;

a prediction unit configured to generate a prediction image of the image of the second viewpoint with reference to the image of the first viewpoint after resolution reduction processing by the first viewpoint resolution reduction processing unit; and a decoding unit configured to decode encoded data of the image of the second viewpoint using the prediction image predicted by the prediction unit.

(11) The decoding device according to (10), further including:

a multiplexing unit configured to replicate, in the event of decoding encoded data of a multiplexed image which is an image multiplexed from a plurality of images of the different second viewpoints, the image of the first viewpoint after resolution reduction processing by the first viewpoint resolution reduction processing unit only times equivalent to the number of the images of the second viewpoints making up the multiplexed image, and to multiplex the replicated images;

wherein the prediction unit generates prediction images of the images of the second viewpoints with reference to the image of the first viewpoint multiplexed by the multiplexing unit.

(12) The decoding device according to (10), further including:

a warping unit configured to generate a warped image which is an image obtained by converting the image of the first viewpoint after resolution reducing processing into an image obtained at the second viewpoint by subjecting the image of the first viewpoint after resolution reducing processing by the first viewpoint resolution reduction processing unit to warping;

wherein the prediction unit generates the prediction image with reference to the warped image generated by the warping unit.

(13) The decoding device according to (12), further including:

a reception unit configured to receive encoded data of the image of the second viewpoint, and information that represents that the warped image has been referenced for generation of a prediction image at the time of encoding of the image of the second viewpoint.

(14) The decoding device according to any of (10) to (13), wherein the decoding unit decodes, in the event that there is encoded data of a current block which is a block to be decoded of the image of the second viewpoint, the encoded data of the current block using the prediction image predicted by the prediction unit, and generates, in the event that there is no encoded data of the current block, a decoding result of the current block based on encoded data of a block adjacent to the current block.

(15) The decoding device according to (10) or any of (12) to (14), further including:

a reception unit configured to receive encoded data of the image of the second viewpoint, and low-resolution conversion information that represents the type of resolution reduction processing of the image of the first viewpoint to be performed at the time of encoding of the image of the second viewpoint;

wherein the first viewpoint resolution reduction processing unit performs the resolution reduction processing on the image of the first viewpoint based on the low-resolution conversion information received by the reception unit.

(16) The decoding device according to (10) or any of (12) to (14), further including:
a reception unit configured to receive encoded data of the image of the second viewpoint, and low-resolution conversion information that represents the type of resolution reduction processing performed on the image of the second viewpoint having the same resolution as with the image of the first viewpoint before encoding of the image of the second viewpoint so that the resolution of the image of the second viewpoint is lower than the resolution of the image of the first viewpoint; and
a resolution increasing unit configured to perform resolution increase processing to increase resolution on the image of the second viewpoint obtained as a result of decoding by the decoding unit so that the resolution of the image of the second viewpoint agrees with the resolution of the image of the first viewpoint.

(17) A decoding method to be executed by a decoding device, including:
a first viewpoint resolution reducing step arranged to subject, in the event of decoding encoded data of an image of a second viewpoint different from the first viewpoint, having lower resolution than the resolution of an image of a first viewpoint, the image of the first viewpoint to resolution reduction processing to reduce resolution so as to agree with the resolution of the image of the second viewpoint, based on the low-resolution conversion information received by the reception unit;
a prediction step arranged to generate a prediction image of the image of the second viewpoint with reference to the image of the first viewpoint after resolution reduction processing by the processing of the first viewpoint resolution reducing step; and
a decoding step arranged to decode encoded data of the image of the second viewpoint using the prediction image predicted by the processing of the prediction step.

REFERENCE SIGNS LIST 11 image conversion processing device
12 multi-viewpoint image encoding device
13 multi-viewpoint image decoding device
14 image inverse conversion processing device
31 low-resolution conversion processing unit
32 low-resolution conversion information generating unit
143 computing unit
147 storage buffer
152 low-resolution reference image generating unit
154 inter prediction unit
171 low-resolution conversion information processing unit
172 low-resolution conversion information generating unit
316 reception unit
371 storage buffer
375 computing unit
379 low-resolution reference image generating unit
381 inter prediction unit
574 warping unit
577 disparity prediction unit
650 demultiplexing unit
721 warping unit
891 multiplexed reference image generating unit

The invention claimed is:
1. An encoding device comprising:
a first viewpoint resolution reduction processing unit configured to subject, in the event of encoding an image of a second viewpoint different from the first viewpoint, having lower resolution than the resolution of an image of a first viewpoint, the image of the first viewpoint to resolution reduction processing to reduce resolution so that the resolution of the image of the first viewpoint agrees with the resolution of the image of the second viewpoint;
a prediction unit configured to generate a prediction image of the image of the second viewpoint with reference to the image of the first viewpoint after resolution reduction processing by the first viewpoint resolution reduction processing unit;
an encoding unit configured to encode the image of the second viewpoint using the prediction image generated by the prediction unit; and
a multiplexing unit configured to replicate, in the event of encoding a multiplexed image which is an image multiplexed from a plurality of images of the different second viewpoints, the image of the first viewpoint after resolution reduction processing by the first viewpoint resolution reduction processing unit only times equivalent to the number of the images of the second viewpoints making up the multiplexed image, and to multiplex the replicated images; wherein the prediction unit generates prediction images of the images of the second viewpoints with reference to the image of the first viewpoint multiplexed by the multiplexing unit.

2. The encoding device according to claim 1, further comprising:
a detecting unit configured to detect resolution of the image of the second viewpoint;
wherein the first viewpoint resolution reduction processing unit subjects the image of the first viewpoint to resolution reduction processing based on resolution determined by the detecting unit.

3. The encoding device according to claim 1, further comprising:
a warping unit configured to generate a warped image which is an image obtained by converting the image of the first viewpoint after resolution reducing processing into an image obtained at the second viewpoint by subjecting the image of the first viewpoint after resolution reducing processing by the first viewpoint resolution reduction processing unit to warping;
wherein the prediction unit generates the prediction image with reference to the warped image generated by the warping unit.

4. The encoding device according to claim 3, further comprising:
a transmission unit configured to transmit encoded data of the image of the second viewpoint obtained as a result of encoding by the encoding unit, and information that represents that the warped image has been referenced for generation of the prediction image.

5. The encoding device according to claim 1, further comprising:
a determining unit configured to determine whether to output the encoded data of the image of the second viewpoint based on the data amount of the encoded data of the image of the second viewpoint obtained as a result of encoding by the encoding unit, or encoding cost necessary for encoding of the image of the second viewpoint by the encoding unit;
wherein in the event that the determining unit has determined to output the encoded data of the image of the second viewpoint, the encoding unit outputs the encoded data of the image of the second viewpoint.

6. The encoding device according to claim 1, further comprising:
- a low-resolution conversion information generating unit configured to generate low-resolution conversion information that represents the type of the resolution reduction processing by the first viewpoint resolution reduction processing unit; and
- a transmission unit configured to transmit encoded data of the image of the second viewpoint obtained as a result of encoding by the encoding unit, and the low-resolution conversion information generated by the low-resolution conversion information generating unit.

7. The encoding device according to claim 1, further comprising:
- a second viewpoint resolution reduction processing unit configured to perform resolution reduction processing on the image of the second viewpoint having the same resolution as the image of the first viewpoint so that the resolution of the image of the second viewpoint is lower than the resolution of the image of the first viewpoint;
- a low-resolution conversion information generating unit configured to generate low-resolution conversion information that represents the type of the resolution reduction processing by the second viewpoint resolution reduction processing unit; and
- a transmission unit configured to transmit encoded data of the image of the second viewpoint obtained as a result of encoding by the encoding unit, and the low-resolution conversion information generated by the low-resolution conversion information generating unit.

8. An encoding method to be executed by an encoding device, comprising:
- a first viewpoint resolution reducing step arranged to subject, in the event of encoding an image of a second viewpoint different from the first viewpoint, having lower resolution than the resolution of an image of a first viewpoint, the image of the first viewpoint to resolution reduction processing to reduce resolution so as to agree with the resolution of the image of the second viewpoint;
- a prediction step arranged to generate a prediction image of the image of the second viewpoint with reference to the image of the first viewpoint after resolution reduction processing by the processing of the first viewpoint resolution reducing step; and
- an encoding step arranged to encode the image of the second viewpoint using the prediction image generated by the processing of the prediction step.

9. A decoding device comprising:
- a first viewpoint resolution reduction processing unit configured to subject, in the event of decoding encoded data of an image of a second viewpoint different from the first viewpoint, having lower resolution than the resolution of an image of a first viewpoint, the image of the first viewpoint to resolution reduction processing to reduce resolution so that the resolution of the image of the first viewpoint agrees with the resolution of the image of the second viewpoint;
- a prediction unit configured to generate a prediction image of the image of the second viewpoint with reference to the image of the first viewpoint after resolution reduction processing by the first viewpoint resolution reduction processing unit; a decoding unit configured to decode encoded data of the image of the second viewpoint using the prediction image predicted by the prediction unit; and
- a multiplexing unit configured to replicate, in the event of decoding encoded data of a multiplexed image which is an image multiplexed from a plurality of images of the different second viewpoints, the image of the first viewpoint after resolution reduction processing by the first viewpoint resolution reduction processing unit only times equivalent to the number of the images of the second viewpoints making up the multiplexed image, and to multiplex the replicated images; wherein the prediction unit generates prediction images of the images of the second viewpoints with reference to the image of the first viewpoint multiplexed by the multiplexing unit.

10. The decoding device according to claim 9, further comprising:
- a warping unit configured to generate a warped image which is an image obtained by converting the image of the first viewpoint after resolution reducing processing into an image obtained at the second viewpoint by subjecting the image of the first viewpoint after resolution reducing processing by the first viewpoint resolution reduction processing unit to warping;
- wherein the prediction unit generates the prediction image with reference to the warped image generated by the warping unit.

11. The decoding device according to claim 10, further comprising:
- a reception unit configured to receive encoded data of the image of the second viewpoint, and information that represents that the warped image has been referenced for generation of a prediction image at the time of encoding of the image of the second viewpoint.

12. The decoding device according to claim 9, wherein the decoding unit decodes, in the event that there is encoded data of a current block which is a block to be decoded of the image of the second viewpoint, the encoded data of the current block using the prediction image predicted by the prediction unit, and generates, in the event that there is no encoded data of the current block, a decoding result of the current block based on encoded data of a block adjacent to the current block.

13. The decoding device according to claim 9, further comprising:
- a reception unit configured to receive encoded data of the image of the second viewpoint, and low-resolution conversion information that represents the type of resolution reduction processing of the image of the first viewpoint to be performed at the time of encoding of the image of the second viewpoint;
- wherein the first viewpoint resolution reduction processing unit performs the resolution reduction processing on the image of the first viewpoint based on the low-resolution conversion information received by the reception unit.

14. The decoding device according to claim 9, further comprising:
- a reception unit configured to receive encoded data of the image of the second viewpoint, and low-resolution conversion information that represents the type of resolution reduction processing performed on the image of the second viewpoint having the same resolution as with the image of the first viewpoint before encoding of the image of the second viewpoint so that the resolution of the image of the second viewpoint is lower than the resolution of the image of the first viewpoint; and
- a resolution increasing unit configured to perform resolution increase processing to increase resolution on the image of the second viewpoint obtained as a result of decoding by the decoding unit so that the resolution of the image of the second viewpoint agrees with the resolution of the image of the first viewpoint, based on the low-resolution conversion information received by the reception unit.

15. A decoding method to be executed by a decoding device, comprising:
    a first viewpoint resolution reducing step arranged to subject, in the event of decoding encoded data of an image of a second viewpoint different from the first viewpoint, having lower resolution than the resolution of an image of a first viewpoint, the image of the first viewpoint to resolution reduction processing to reduce resolution so as to agree with the resolution of the image of the second viewpoint;
    a prediction step arranged to generate a prediction image of the image of the second viewpoint with reference to the image of the first viewpoint after resolution reduction processing by the processing of the first viewpoint resolution reducing step; and
    a decoding step arranged to decode encoded data of the image of the second viewpoint using the prediction image predicted by the processing of the prediction step.

* * * * *